(12) United States Patent
 Brothers

(10) Patent No.: US 8,587,851 B2
(45) Date of Patent: Nov. 19, 2013

(54) TARGET COLOR RECIPES

(75) Inventor: Kent M. Brothers, N. Vancouver (CA)

(73) Assignee: Eastman Kodak Company, Rochester, NY (US)

( * ) Notice: Subject to any disclaimer, the term of this patent is extended or adjusted under 35 U.S.C. 154(b) by 273 days.

(21) Appl. No.: 13/068,931

(22) Filed: May 24, 2011

(65) Prior Publication Data

US 2012/0300228 A1     Nov. 29, 2012

(51) Int. Cl.
 *G03F 3/08* (2006.01)
 *H04N 1/48* (2006.01)

(52) U.S. Cl.
 USPC .............................. 358/518; 358/1.9; 358/521

(58) Field of Classification Search
 None
 See application file for complete search history.

(56) References Cited

U.S. PATENT DOCUMENTS

| | | | |
|---|---|---|---|
| 5,493,321 A * | 2/1996 | Zwadlo | 347/131 |
| 6,919,972 B2 | 7/2005 | Kumada et al. | |
| 7,271,935 B2 * | 9/2007 | Coons et al. | 358/2.1 |
| 7,605,950 B2 * | 10/2009 | Goma et al. | 358/3.26 |
| 2008/0043271 A1 | 2/2008 | Gil et al. | |
| 2008/0130022 A1 | 6/2008 | Dalal et al. | |
| 2009/0251712 A1 | 10/2009 | Wang et al. | |
| 2009/0296113 A1 | 12/2009 | Mestha et al. | |
| 2010/0189348 A1 | 7/2010 | Dalal et al. | |
| 2010/0284615 A1 * | 11/2010 | Dalal et al. | 382/167 |
| 2012/0133960 A1 * | 5/2012 | Henderson | 358/1.9 |
| 2012/0133961 A1 * | 5/2012 | Henderson | 358/1.9 |

* cited by examiner

*Primary Examiner* — Barbara Reinier
(74) *Attorney, Agent, or Firm* — Nelson Adrian Blish

(57) ABSTRACT

An apparatus for generating target color recipes includes a controller (202) using test chart data (100) including first and second sets of test patches to generate a flexible color model (214) for accurately predicting color response throughout the printer colorant space. The first set of test patches includes mostly patches distributed throughout colorant space. The second set of patches includes mostly patches in selected colorant space areas and with limitations on the number of chromatic colorants with non-zero tints. The controller generates recipes for target colors using the model generated after one measurement iteration.

13 Claims, 8 Drawing Sheets
(7 of 8 Drawing Sheet(s) Filed in Color)

TARGET COLOR RECIPES

FIELD OF THE INVENTION

The present invention pertains to color printing and in particular to developing process colorant recipes for printing spot colors.

BACKGROUND OF THE INVENTION

Printing devices are typically configured with a set of colorants, e.g. inks, pigments, and the like. The term "process colorants" usually refers to a set of colorants including three chromatic colorants (e.g. cyan, magenta, and yellow) and an achromatic colorant (e.g. black) because a wide range of target colors can be obtained by printing combinations of these colorants, each with varying tonality.

Some printing devices can be configured with additional colorants for various reasons. In some situations, process colorants with lighter or darker densities can be added to improve the colorant tonal granularity and/or the printer gamut and/or smoothness in tonal transitions. In other situations, additional process colorants (e.g. orange, green, and blue) can be added to increase the printer gamut. In still other situations, spot colorants can be added to achieve a specific effect, such as to exactly match a target color or to provide a desired effect (e.g. gloss).

Use of additional spot colorants to match a target color is particularly widespread in the printing of commercial product packaging where brand color accuracy is crucial. However, the use of spot colorants increases the complexity and costs associated with printing equipment and processes. It is desirable to minimize the use of spot colorants but there are some barriers to the use of process colorant recipes for target colors.

For some target colors, the printer gamut may not be large enough to enable the target color to be printed. This can usually be overcome by changing the process colorant formulations (e.g. more vivid colorants) or by adding process colorants to extend the printer gamut (e.g. Hexachrome® colorant set).

For target colors that lie within the printer gamut, prior art methods and systems for characterizing a printing device color response can be a barrier to determining accurate target color recipes. One problem relates to the granularity of test data used for characterization of the printer. In general, characterization chart patches are relatively sparsely distributed throughout colorant space. A primary reason for this is to reduce the number of samples that must be measured.

Once test patches have been measured a color model is typically created so that a device-independent color (e.g. CIELAB coordinate) can be predicted for an arbitrary combination of colorant tint values, and similarly a colorant combination can be predicted to achieve a target color. Use of parametric models and interpolation between measured values is known in the art for mapping between colorant and color coordinates that do not have a measurement basis. However, color modeling techniques can produce poor target color recipes due to the coarseness of the test data and nonlinear characteristics of a printer's color response.

Standard charts are widely employed in commercial printing. Two exemplary standards include the IT8 standard specified by the American National Standards Institute and the ECI2002 standard specified by the European Color Initiative. Many of the test patches defined by the newer versions of both standards have identical colorant combinations.

The IT8 standard provides a range of recommendations. For example, the IT8.7/3 recommendation defines the use of 182 color patches (basic set) and 982 color patches (extended set) to characterize a printer. The newer IT8.7/4 recommendation defines the use of 1617 color patches (with some replicates) to provide a more fine-grained characterization. The 1588 unique IT8.7/4 patches can be categorized as: single colorant patches (84), two colorant combination patches (288), three colorant combinations (818), and four colorant combinations (398). Single colorant patches provide the finest granularity of sampling with 21 somewhat uniform tonality steps.

Two colorant patches can be further categorized into purely chromatic patches (204) and those including black colorant (84). Approximately 8 tone steps (8 steps*8 steps*3 combinations=192) are used for each colorant in the purely chromatic patches. Approximately 5 tone steps (5*5*3=75) are used for each colorant in the two colorant patches including black colorant. The actual number of tone steps for a colorant varies somewhat dependent on the colorant and the position of the associated colorant combination within the colorant space of the printer. For example, some additional tone steps are added in the highlights for some colorants.

Three colorant patches have distribution granularity similar to two colorant patches with 527 purely chromatic patches and 84 patches that include black colorant. Approximately 8 tone steps (8*8*8=512) are used for each colorant in purely chromatic patches. Approximately 5 tone steps (5*5*5*3=375) are used for each colorant in the three colorant patches including black colorant.

Four colorant patches use approximately 4-5 tone steps (4*4*5*5=400) for each colorant. Thus, it is clear to see that the granularity of colorant combination patches for the newer standard test charts is quite large and the color model data derived from measuring these patches can be a problem when determining target color recipes.

Having two few samples in nonlinear regions of a printer's gamut can increase the error in color accuracy prediction. Further, different regions of a printer's gamut can have very different nonlinear characteristics making the use of parametric models difficult to provide the desired accuracy with coarse characterization data.

Some prior art systems overcome these limitations by developing separate localized models in the region corresponding to a desired target color. One example includes U.S. Publication No. 2008/0130022 (Dalal et al.). Dalal et al. teaches developing a set of color models, one for general use throughout the gamut and one for each region of interest such as near a target color. An initial target color recipe is printed and measured. Dalal et al. teaches developing a local model in the vicinity of the color measured for the initial recipe with the model using a weighting of the neighboring color measurements to compensate for local nonlinearities. This method can be very time consuming and complex when a significant number of target colors is desired (e.g. some Pantone® libraries specify between 1000 and 3000 colors).

Other examples include U.S. Publication No. 2009/0296113 (Mestha et al.) and U.S. Publication No. 2008/0043271 (Gil et al.). Mestha et al. teaches a similar approach where the error of a color reproduced for an initial target recipe is reduced by selecting a linear gain matrix that models the local color response of the printer. U.S. Pat. No. 6,919,972 (Kumada et al.) teaches a similar approach with target color interpolation improved by localized weighting of neighboring measured data.

Some prior art teaches improving the accuracy of target color recipes by utilizing a larger set of test patches. For example, an extremely fine grained characterization of the printer gamut would enable traditional modeling techniques to overcome many of the nonlinear color response prediction errors. However, this is widely viewed as impractical because of increased measurement and computing resources requirements. A similar example includes U.S. Publication No. 2010/0189348 (Dalal et al.), which teaches using two sets of characterization measurements separated by time (and presumably by drift in response) to adjust an initial target color recipe based on the two sets of characterization data.

Other prior art systems teach different approaches. One example is U.S. Publication No. 2009/0251712 (Wang et al.). Wang et al. teaches using a minimal number of patches (less than 20) for each of a set of sub-gamuts (e.g. CMY, MYK, CYK, and CMK) to build a linear sensitivity model of each sub-gamut's color to changes in the corresponding colorant coordinates. Wang et al. does not appear to teach how such a collection of sub-gamut sensitivity models can be used to identify a target color recipe.

A need exists, therefore, to reduce the time and resources required for characterizing a printer and developing accurate target color recipes for that printer.

SUMMARY OF THE INVENTION

Briefly, according to one embodiment of the present invention an apparatus for identifying target color recipes for a printer comprises: a receiver for identifying a set of target colors to be printed; the printer configured with a plurality of process colorants; a test chart generator operative to specify test patches, with each test patch identifying a combination of process colorant tint values; a color measurement device operative to measure device-independent color coordinates of printed test patches; and a controller operative to generate a test chart including first and second sets of test patches, operate the printer to produce a printed test chart, measure the color of printed test patches, generate a model of the printer color response in one iteration of measuring test patch colors, and create colorant combination recipes for the set of target colorants based on target color coordinates and the color model.

According to one aspect of the invention, the controller selects the first set of test patches to provide a first degree of characterization of the printer with the patches distributed throughout substantially the entire printer gamut. Furthermore, the controller selects the second set of patches to provide a second degree of characterization of the printer with the patches distributed in selected areas of the printer gamut.

By selecting a modest quantity of test patches with specific characteristics and ensuring that the color model has sufficient flexibility to accurately predict nonlinear color responses, the target color recipes can be accurately predicted with a single characterization and without having initial target color recipes.

These and other aspects of the present invention are illustrated in the detailed description of the invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1A:
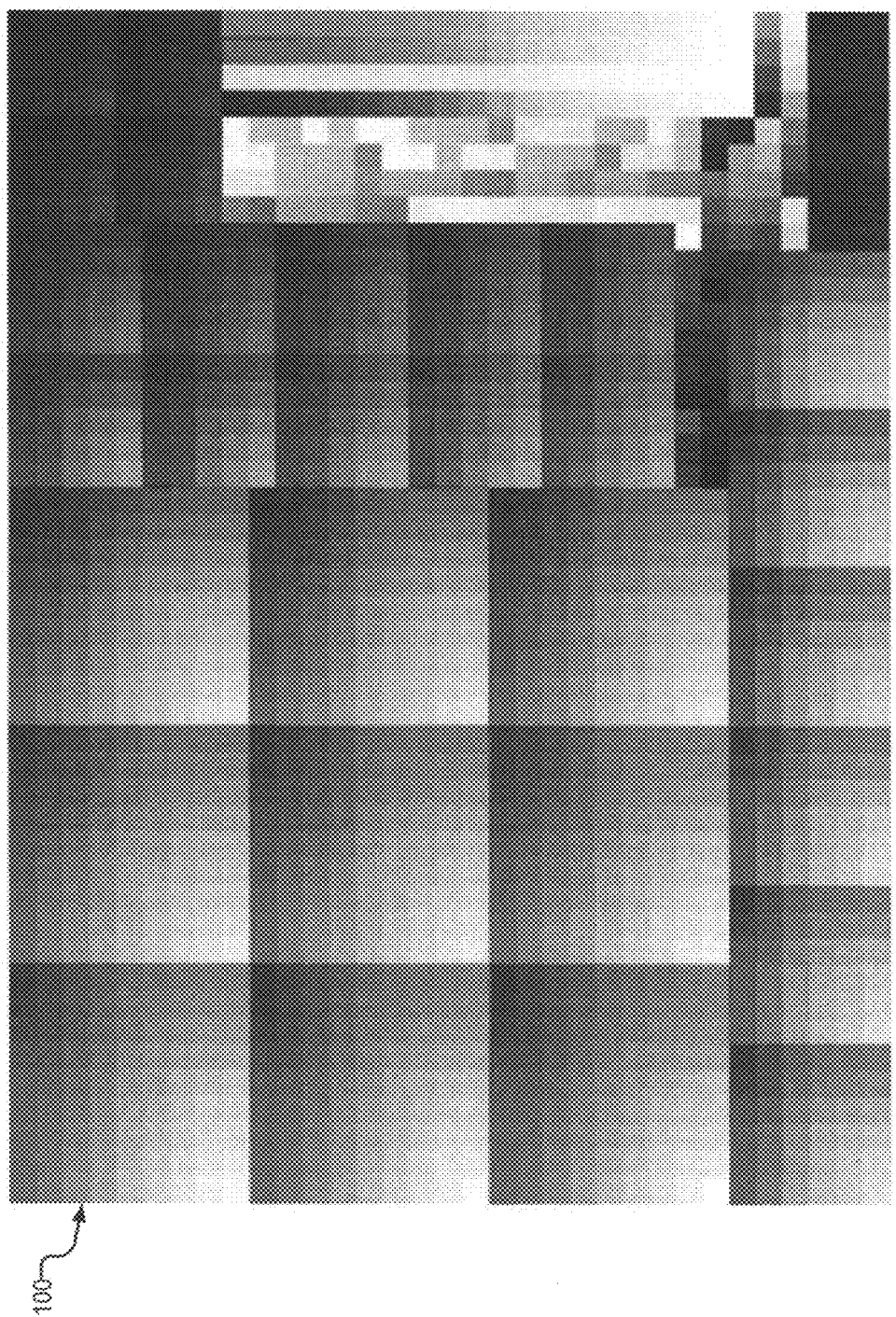
FIGS. 1A and 1B are diagrams illustrating a standard prior art test chart.
Figure 1B:
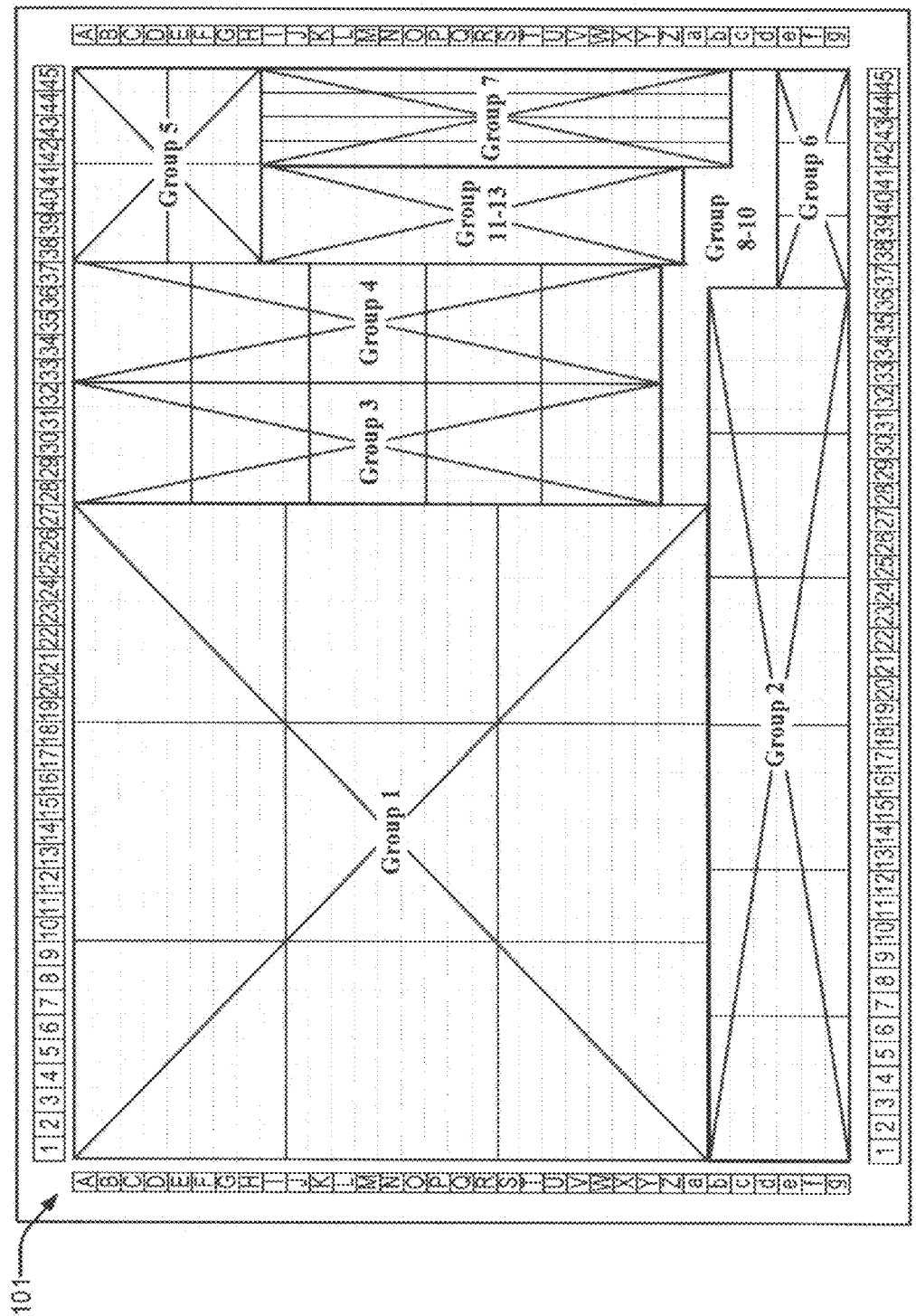
Figure 2:
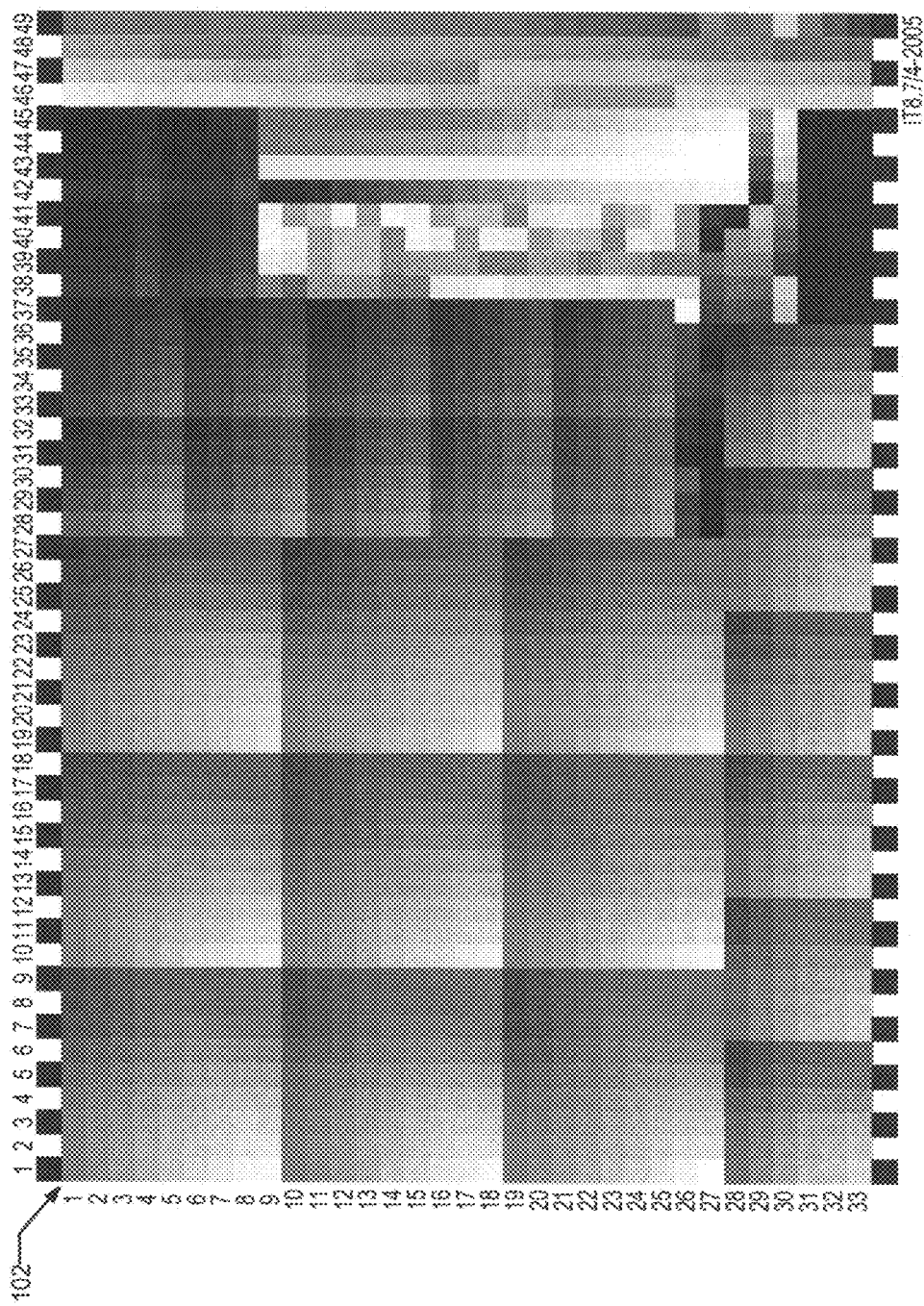
FIG. 2 is a diagram illustrating another standard prior art test chart.

FIGS. 1A, 1B, and 2 are diagrams illustrating standardized prior art test charts used to characterize color responses of printing devices having four process colorants.

FIG. 1A depicts an exemplary visual representation of test chart 100 consistent with the 2002 recommendation of the European Color Initiative for characterizing the color response of four process colorant printing devices. Chart 100 includes approximately 1,485 test patches (1,457 distinct) having test chart organization 101 as illustrated in FIG. 1B. Groups 1-6 correspond to progressive colorant combinations aimed at providing a distribution of patches throughout colorant space as detailed in Table 1.

TABLE 1

| Group | Black Tint (%) | CMY Tints (%) | # of Patches |
|---|---|---|---|
| 1 | 0 | 0, 10, 20, 30, 40, 55, 70, 85, 100 | 9 × 9 × 9 = 729 |
| 2 | 20 | 0, 10, 20, 40, 70, 100 | 6 × 6 × 6 = 216 |
| 3 | 40 | 0, 20, 40, 70, 100 | 5 × 5 × 5 = 125 |
| 4 | 60 | 0, 20, 40, 70, 100 | 5 × 5 × 5 = 125 |
| 5 | 80 | 0, 40, 70, 100 | 4 × 4 × 4 = 64 |
| 6 | 100 | 0, 40, 100 | 3 × 3 × 3 = 27 |
| | | Total Patches | 1286 |

Groups 7-13 include a total of 199 test patches detailed below. Group 7 corresponds to single colorant tone steps (4×20=80 patches). Group 8 corresponds to a patch with no colorants. Group 9 corresponds to gray balance steps including cyan, magenta, and yellow with black overprints (37 patches). Group 10 corresponds to base colors with 70% black for compatibility to ISO 12642 (9 patches). Group 11 corresponds to all combinations of CMYK at selected tint levels (0%, 3%) without redundancies from groups 1-7 (11 patches). Group 12 corresponds to all combinations of CMYK at selected tint levels (0%, 7%) without redundancies from groups 1-7 (11 patches). Group 13 corresponds to all combinations of CMYK at selected tint levels (0%, 3%, 40%) without redundancies from groups 1-7 (50 patches).

FIG. 2 is a diagram illustrating an exemplary visual representation of test chart 102, consistent with the 2005 recommendation of the American National Standards Institute (IT8.7/4) for characterizing the color response of four process colorant printing devices. Test chart 102 includes approximately 1,617 patches, of which 1,558 are distinct, of which 1,457 are shared with chart 100. Most (130) of the additional 131 test patches are similar to the group 2 test patches of chart 10 except with a 10% black tint instead of 20% black tint and without redundancies from groups 1-7.

Figure 3:
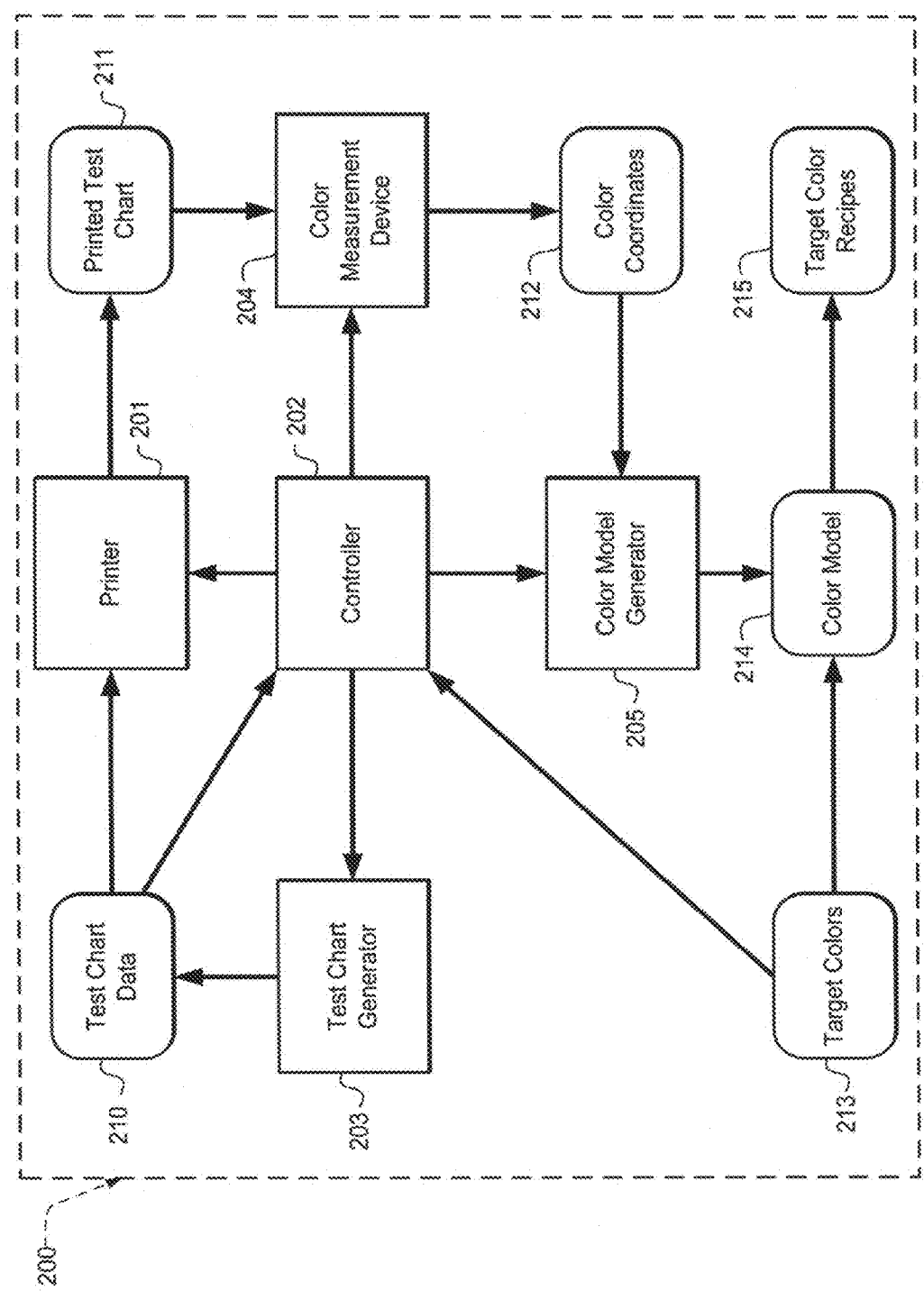
FIG. 3 is a diagram illustrating an exemplary apparatus according to the present invention.
Figure 4A:
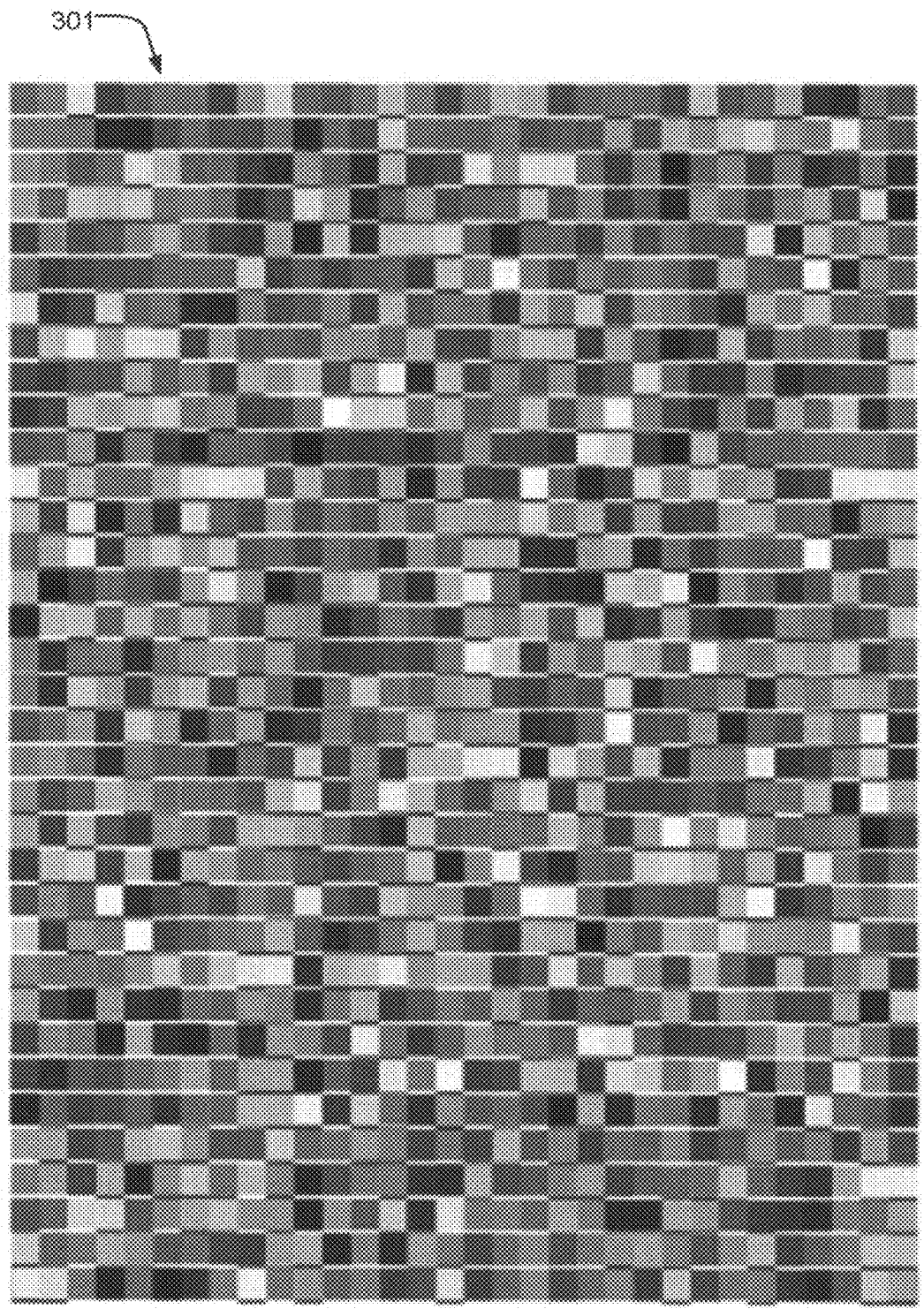
FIGS. 4A-4D are diagrams illustrating an exemplary test chart according to the present invention.
Figure 4B:
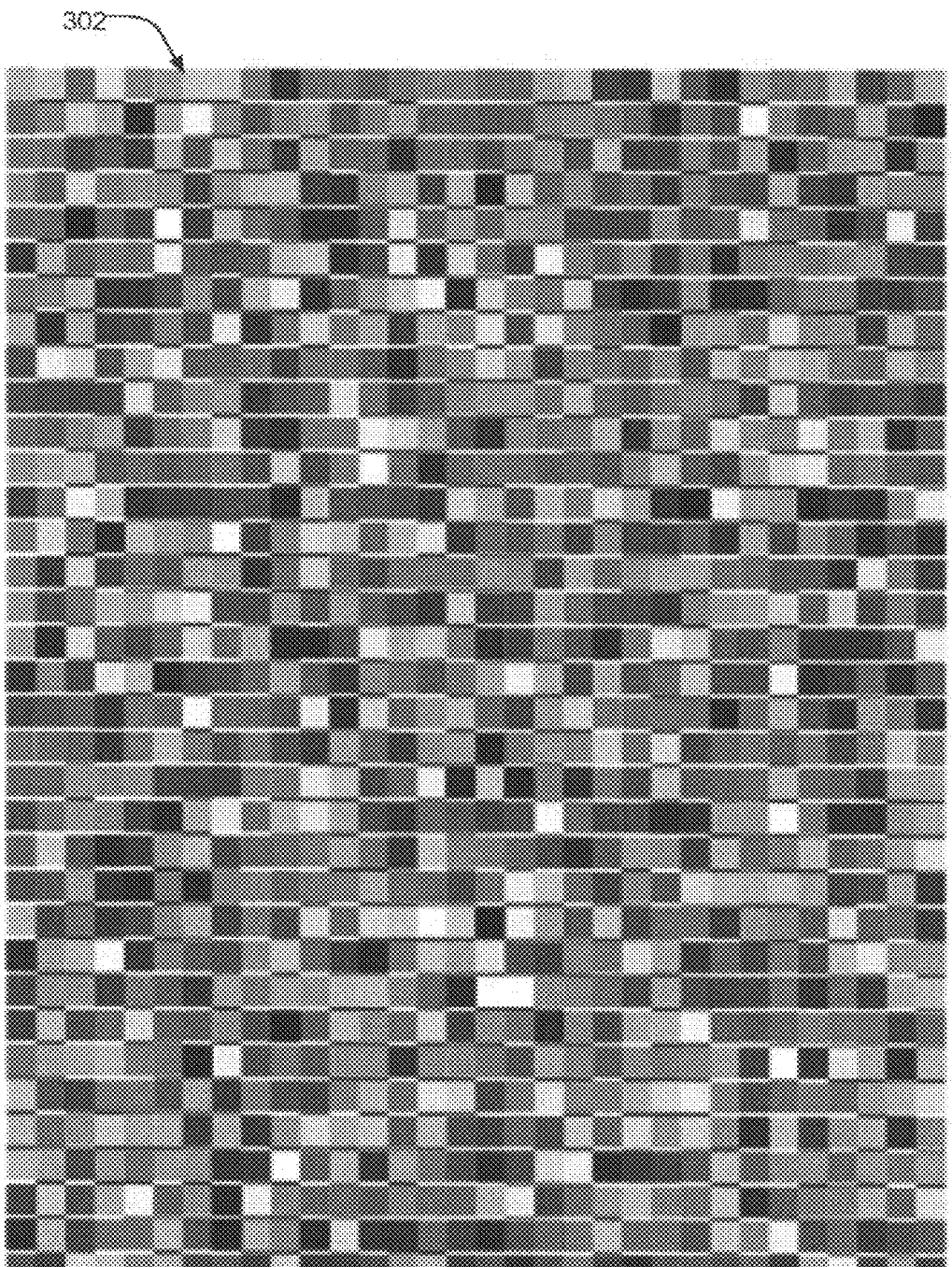
Figure 4C:
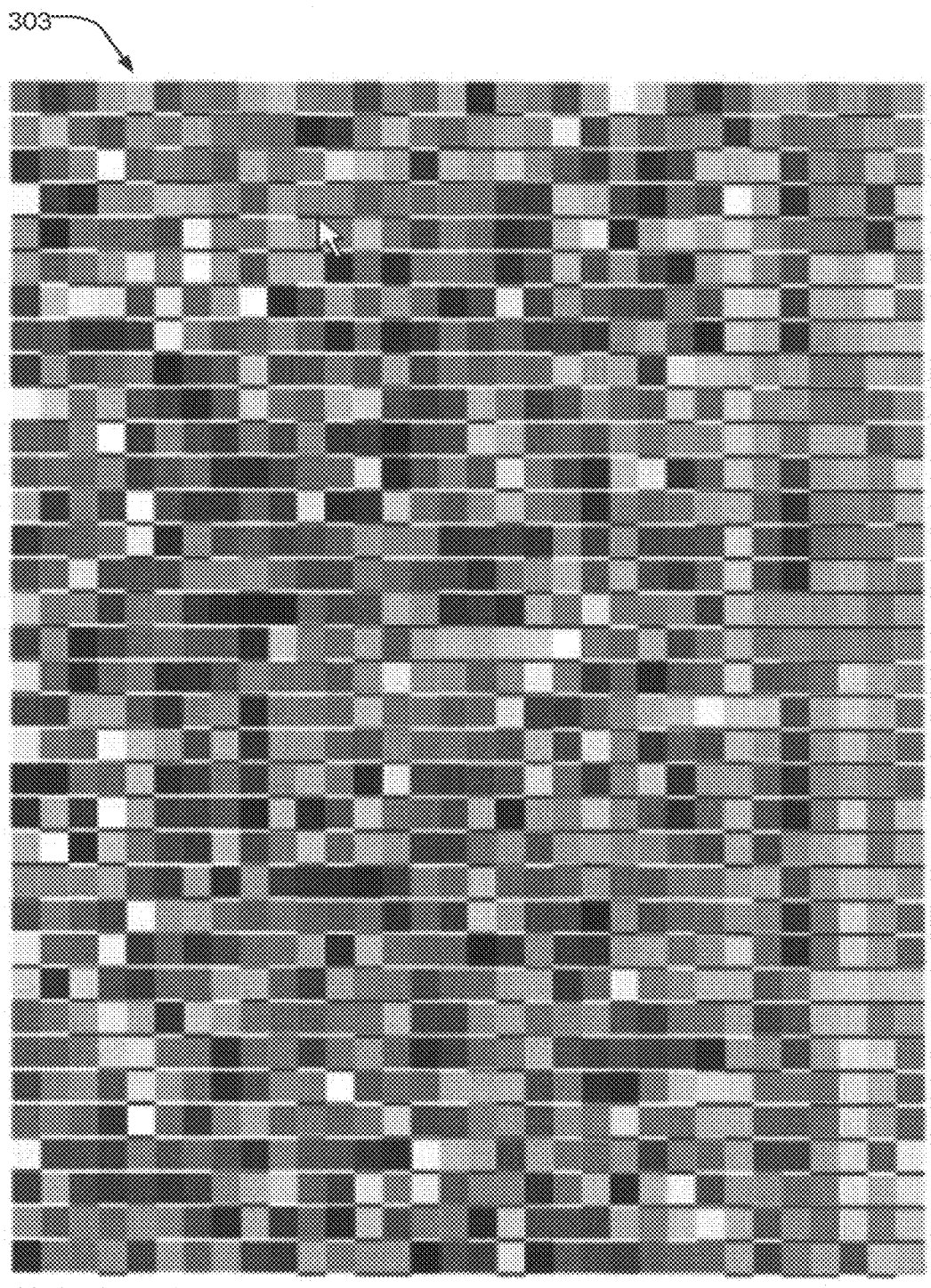
Figure 4D:
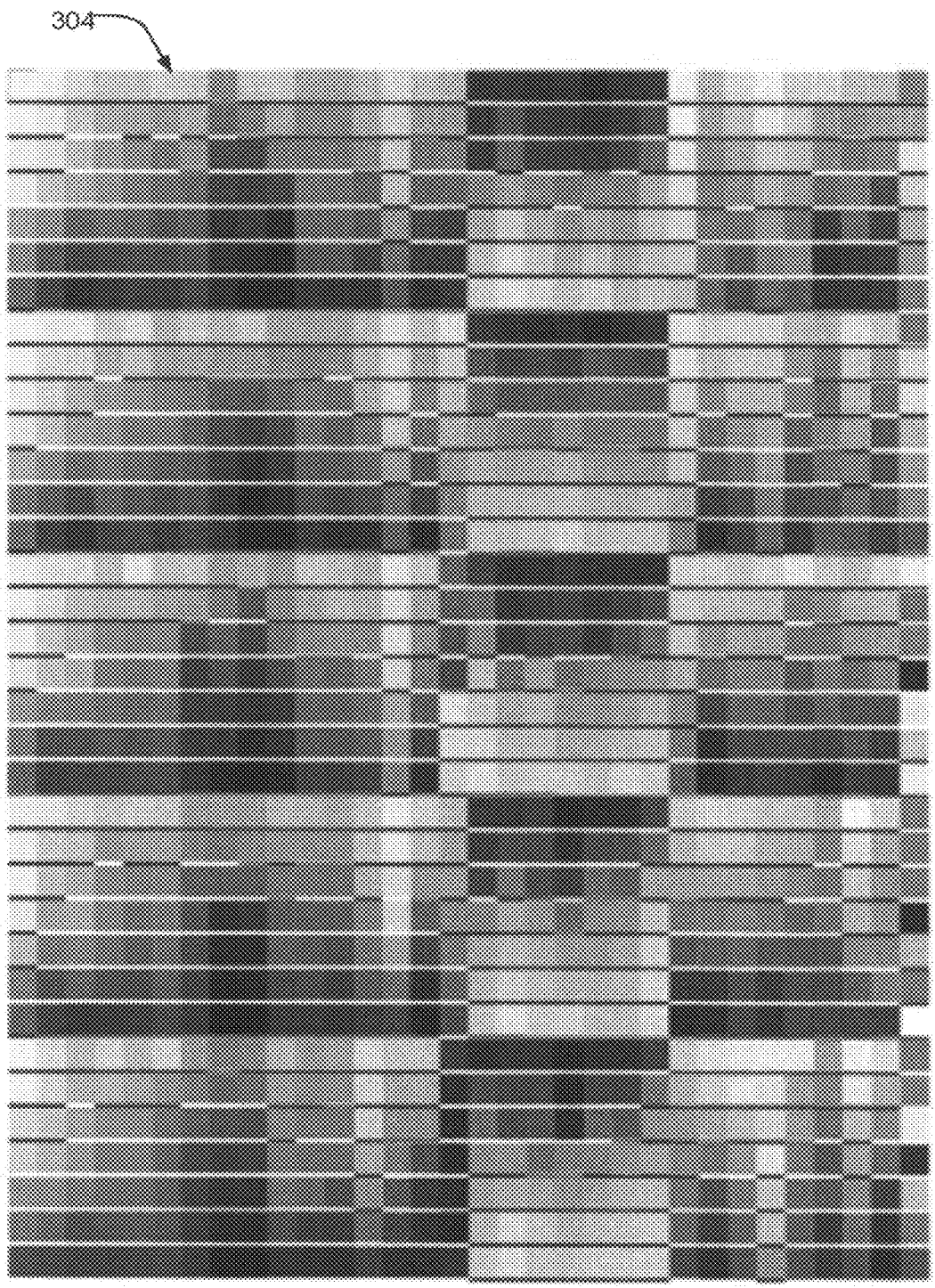

FIG. 3 is a diagram illustrating a computer-controlled apparatus 200 according to the present invention. It comprises a printer 201, configured to print with a set of process colorants. The set of colorants can include cyan, magenta, yellow and black for example. In some embodiments, the set of colorants can include additional colorants as well. For example, orange, green and blue colorants may be added to enlarge the gamut of printer 201.

Printer 201 accepts image data, defining a plurality of image objects or pixels, each specified with one or more colorant combinations. Printer 201 can optionally include a rendering component to transform image data from a first format (e.g. vector or raster page descriptions) into a format suitable for use by imaging components of printer 201. During characterization, test chart data 210 can be supplied to printer 201 so that printed test chart 211 can be reproduced.

According to one aspect of the present invention, controller 202 sequences the characterization process by directing test chart generator 203 to supply test chart data 210. The construction of test chart data 210 can be predetermined or can be based on a set of target colors 213 identified to controller 202. For example, a user may identify a desire to reproduce colors from a particular Pantone® library. As another example, a user may identify the desire to reproduce a subset of colors from a library, each specified with device-independent color coordinates (e.g. CIELAB coordinates). In this case, a subset of the predetermined test chart data can be used.

Based on the desired target colors, test chart generator 203 can be directed to configure test chart data 210 to have more or less test patches. As described below, in reference to FIGS. 4A-4D, an exemplary test chart is an exemplary visual representation of test chart data 210 suitable for characterizing printer 201 for a wide range of target colors 213 such as a Pantone® library.

Controller 202 directs color measurement device 204 to measure test patches from printed test chart 211 and produce device-independent color coordinates 212. Controller 202 directs color model generator 205 to associate test patch colorant combinations of test chart data 210 with color coordinates 212 and to generate a color model 214 that accurately represents the set of colorant combinations and associated colors and predicts color values in areas of interest in colorant space. Color model 214 can be inverted to identify colorant combinations for arbitrary target colors.

In some embodiments, test chart generator 203 can be located on an external computer system and used to generate test chart data 210 independent of apparatus 200. In this case, test chart data 210 can be stored on a computerized storage medium that is accessible to apparatus 200. As another alternative, apparatus 200 can generate test chart data 210 and store it for later use by apparatus 200 or another system used to characterize printer 201.

Since the color response of printer 201 involves a complex functional relationship between colorant combinations and color values, model 214 must be sufficiently flexibility to represent both the entire range of colorant combinations while accurately predicting the response across regions that may be locally linear or nonlinear.

A mathematical functional relationship that is continuous and smooth can be modeled with reasonable accuracy from values at sample points if the derivatives do not vary rapidly relative to the sampling density. This implies that to accurately model a function, one may sample sparsely where the derivatives vary slowly or where low accuracy is required, but must sample densely where the derivatives vary rapidly or high accuracy is desired. This of course necessitates a mathematical model that is flexible, that is one that can reproduce values exactly, or at least to a desired accuracy, no matter how densely the domain is sampled.

Functions of a single variable are often approximated by low-order polynomials (e.g. a line or quadratic) if the derivatives change slowly across the range of interest. The more a function departs from a simple linear or quadratic relationship, the more parameters are needed to model it. One approach is to increase the order of a polynomial approximation, but polynomial coefficient estimation is plagued with instability that can lead to "approximations" that oscillate wildly between sample points. A more stable alternative commonly used is a spline, i.e., where the function is modeled using several "submodels" having a mathematical form with few parameters, but with different values for the parameters over different regions of the function's domain, and such that the submodels produce the same values at common boundaries of the regions, and possibly also have the same derivatives at the common boundaries. For functions of a single variable it is standard practice to use cubic polynomials over successive intervals, usually with not only the same values at the "nodes" where adjoining intervals meet, but also the same first and second derivatives so the model is very smooth.

One characteristic of a spline is that the submodels switch abruptly from one submodel to the next, so that some care is needed to ensure continuity or smoothness at the boundaries, but it is also possible to shift gradually from one submodel to another using weights for each submodel which are a function of the spatial relation of the point at which the function is evaluated to the "centers" of the regions over which each submodel is defined.

For functions of a single variable, samples are often taken on a grid because many methods are designed for samples on a grid, and it is possible to increase the accuracy of an approximation by sampling on finer grid and increasing the number of submodels. This method is readily extended to functions of multiple variables using splines which are products of cubic polynomials within each cube. However, for functions of multiple variables the use of a fine multidimensional grid typically requires so many samples as to be infeasible.

Sampling the color of a single colorant at tint levels 10% apart requires only 11 samples, but doing so for four colorants requires $11^4=14,641$ samples. For a function of a single variable one can define a spline over intervals of different sizes, and, though less well known, for a function of multiple variables one can define a spline over multidimensional "cells" (e.g. hyper-rectangles) of different sizes. It is therefore possible to sample finely in a region where accuracy or rapid change demands, or sparsely elsewhere and build submodels to represent the function over its entire domain.

According to one embodiment, color model 214 is a composite model constructed by combining a set of submodels for a set of multi-dimensional cells into an overall color model for the colorant space, i.e., a multidimensional spline, so that the model is at least continuous across cell boundaries. Selection of the cells can be determined based on the colorant combinations of the test patches selected for test chart data 210, such as a Delaunay tessellation of the colorant combinations, or a set of (hyper) rectangular cells, the density of which varies in proportion to the density of the colorant combinations in the colorant space.

Controller 202 can direct generation of target color recipes 215 that can be saved for later use. When a target color 213 is specified in image data supplied to printer 201, a colorant combination, identified by the appropriate target color recipe 215, can be substituted for the target color 213.

FIGS. 4A-4D are diagrams illustrating an exemplary test chart according to the present invention. The test chart includes four test chart forms 301-304 specifying test patches comprising up to seven process colorants (e.g. cyan, magenta, yellow, black, orange, green, and blue). Test chart data corresponding to the test chart can include 4,412 distinct test patches suitable for accurately predicting recipes for a wide range of target colors such as a Pantone® library. Test chart forms 301-304 can be printed on a single substrate or on multiple substrates as required for color measurement device 204 to make suitable measurements.

Test chart forms 301-304 depict a somewhat randomized arrangement of test patches, including some replicates. Other arrangements, including the use of more or less replicates can be used within the scope of the present invention.

If only four process colorants are configured, the test chart can be simplified to include patches using only the first four colorants. In this case, the number of distinct test patches can be reduced to 2,571.

The patches of the test chart can include a first set of test patches, selected to provide a first degree of color characterization accuracy and which are distributed throughout substantially all of the colorant combination space inscribed by the primary four process colorants of printer 201. For example, the first set of patches can include the 1,457 distinct patches specified by chart 100. As an alternative, a similar number of test patches can be used that provide a wide-ranging sampling of colorant space but which are too granular to enable accurate modeling of colorant regions having non-linear color responses.

The patches of the test chart can also include a second set of test patches, selected to provide a second degree of color characterization accuracy which are distributed in selected regions of colorant space. According to one embodiment, the second set of patches can be located in colorant space regions where significant nonlinearities in the color response exist. According to one embodiment, the second of patches can be located in the regions of colorant space that produce colors similar to at least one of the target colors 213.

According to some embodiments, the second set of patches can be selected to limit the number of chromatic colorants having non-zero colorant values. For printers 201 with four process colorants (i.e. CMYK), patches were generated, printed and measured for the second set based on target colors 213 corresponding to a Pantone® library. In particular, colorant recipes near target colors 213 were identified using an initial characterization based on a first set of test patches. From those recipes, the set of second patches were selected to be near the recipes but with almost all of the patches having at most two chromatic colorants with non-zero values.

After the measurements were complete, 1,114 patches were identified for the second set of patches. The second set included 1,109 patches with at most two chromatic colorants with non-zero values. The specific set of colorant combinations for the second set of test patches for four process colorants is detailed below in Table 2.

Test chart data 210 with the first set of patches and the second set of patches was printed, measured and a composite color model 214 was created. Color recipes 215 were predicted for target colors 213 and printed. The measured color of the resultant patches were good matches for the target colors 213.

Further experiments showed that for printers 201 with seven process colorants (e.g. CMYKOGB), the second set of patches can be augmented with another 1,841 patches based on a similar strategy of selecting patches near target colors 213 with almost all patches limited to at most three chromatic colorants with non-zero values. The specific set of colorant combinations for the second set of test patches for seven process colorants is detailed below in Table 3.

The number of test patches in the second set of test patches can be reduced if the number and color space location of target colors 213 is limited. Test patches can be removed from test chart data 210 for regions of colorant space that produce colors significantly different than the target colors 213. Although this will save some characterization resources, the resulting color model 214 may have limited accuracy in regions of colorant space where test patches were removed.

TABLE 2

(C, M, Y, K) Tint (0, 0, 34.9, 0)
(0, 0, 40.4, 0)
(0, 0, 42.7, 0)
(0, 0, 45.1, 0)
(0, 0, 51.8, 0)
(0, 0, 65.1, 0)
(0, 0, 66.3, 0)
(0, 0, 81.6, 0)
(0, 0, 86.3, 0)
(0, 0, 92.2, 0)
(0, 3.5, 86.3, 0)
(0, 7.1, 25.1, 0)
(0, 7.1, 69, 0)
(0, 7.1, 74.1, 0)
(0, 10.6, 81.6, 0)
(0, 10.6, 98.4, 0)
(0, 13.7, 25.1, 0)
(0, 13.7, 36.5, 0)
(0, 13.7, 42.7, 0)
(0, 13.7, 59.2, 0)
(0, 13.7, 69, 0)
(0, 13.7, 69.8, 0)
(0, 13.7, 72.9, 0)
(0, 13.7, 83.9, 0)
(0, 16.9, 0, 0)
(0, 16.9, 9, 0)
(0, 16.9, 60, 0)
(0, 16.9, 69.8, 0)
(0, 16.9, 86.3, 0)
(0, 20, 10.6, 0)
(0, 20, 36.5, 0)
(0, 20, 38.8, 0)
(0, 20, 56.1, 0)
(0, 20, 63.9, 0)
(0, 20, 72.2, 0)
(0, 20, 82.7, 0)
(0, 22.7, 12.5, 0)
(0, 22.7, 14.1, 0)
(0, 22.7, 26.7, 0)
(0, 22.7, 31, 0)
(0, 22.7, 49.8, 0)
(0, 22.7, 57.3, 0)
(0, 22.7, 64.7, 0)
(0, 22.7, 72.9, 0)
(0, 25.9, 12.5, 0)
(0, 25.9, 15.7, 0)
(0, 25.9, 36.5, 0)
(0, 25.9, 40.4, 0)
(0, 25.9, 46.3, 0)
(0, 25.9, 56.1, 0)
(0, 25.9, 67.1, 0)
(0, 28.6, 12.5, 0)
(0, 28.6, 71.4, 0)
(0, 28.6, 73.7, 0)
(0, 28.6, 89, 0)
(0, 31.4, 0, 0)
(0, 31.4, 37.6, 0)
(0, 31.4, 38.8, 0)
(0, 31.4, 47.5, 0)
(0, 31.4, 54.1, 0)
(0, 31.4, 72.9, 0)
(0, 34.1, 12.5, 0)
(0, 34.1, 15.7, 0)
(0, 34.1, 80.4, 0)
(0, 34.9, 0, 0)
(0, 36.5, 69, 0)
(0, 36.5, 79.6, 0)
(0, 36.5, 90.2, 0)
(0, 38.8, 0, 0)
(0, 38.8, 22, 0)
(0, 38.8, 23.5, 0)
(0, 38.8, 33.7, 0)
(0, 43.5, 17.3, 0)
(0, 43.5, 25.1, 0)
(0, 43.5, 60, 0)
(0, 43.5, 61.2, 0)
(0, 43.5, 67.1, 0)
(0, 45.1, 0, 0)

TABLE 2-continued (C, M, Y, K) Tint (0, 45.9, 5.5, 0)
(0, 45.9, 54.1, 0)
(0, 45.9, 58, 0)
(0, 45.9, 83.5, 0)
(0, 48.2, 17.3, 0)
(0, 48.2, 26.7, 0)
(0, 48.2, 45.1, 0)
(0, 48.2, 62.7, 0)
(0, 48.2, 77.6, 0)
(0, 50.2, 12.5, 0)
(0, 50.2, 56.1, 0)
(0, 52.2, 25.1, 0)
(0, 54.1, 54.9, 0)
(0, 54.1, 75.7, 0)
(0, 54.1, 79.2, 0)
(0, 56.1, 3.5, 0)
(0, 56.1, 33.7, 0)
(0, 56.1, 34.9, 0)
(0, 56.5, 14.9, 0)
(0, 59.6, 42.7, 0)
(0, 59.6, 51.8, 0)
(0, 59.6, 59.2, 0)
(0, 59.6, 80.4, 0)
(0, 61.6, 70.6, 0)
(0, 61.6, 73.7, 0)
(0, 63.1, 51, 0)
(0, 64.7, 0, 0)
(0, 64.7, 17.3, 0)
(0, 64.7, 33.7, 0)
(0, 65.1, 0, 0)
(0, 66.3, 87.1, 0)
(0, 67.8, 90.2, 0)
(0, 69, 81.6, 0)
(0, 70.6, 3.5, 0)
(0, 71.8, 74.9, 0)
(0, 73.3, 37.6, 0)
(0, 73.3, 82.7, 0)
(0, 75.7, 48.6, 0)
(0, 75.7, 51.8, 0)
(0, 75.7, 62, 0)
(0, 75.7, 73.7, 0)
(0, 76.9, 92.2, 0)
(0, 79.2, 14.1, 0)
(0, 80, 51, 0)
(0, 81.2, 86.7, 0)
(0, 82, 41.6, 0)
(0, 82, 83.9, 0)
(0, 83.1, 27.8, 0)
(0, 83.9, 62.7, 0)
(0, 84.7, 51, 0)
(0, 84.7, 77.6, 0)
(0, 85.5, 0, 0)
(0, 86.3, 66.3, 0)
(0, 89.4, 74.1, 0)
(0, 92.5, 81.2, 0)
(0, 93.3, 41.6, 0)
(0, 95.3, 70.6, 0)
(0, 96.1, 81.2, 0)
(0, 96.9, 66.3, 0)
(2.7, 0, 59.2, 0)
(6.3, 0, 51.8, 0)
(6.3, 0, 77.6, 0)
(6.3, 31.4, 0, 0)
(6.3, 81.2, 0, 0)
(6.3, 92.5, 0, 0)
(6.3, 93.7, 0, 0)
(9.8, 0, 72.9, 0)
(9.8, 31.4, 0, 0)
(9.8, 56.1, 0, 0)
(12.9, 0, 61.2, 0)
(12.9, 0, 74.9, 0)
(12.9, 0, 85.5, 0)
(12.9, 0, 90.6, 0)
(12.9, 0, 94.5, 0)
(12.9, 16.9, 0, 0)
(12.9, 25.9, 0, 0)
(12.9, 45.9, 0, 0)
(12.9, 75.7, 0, 0)

TABLE 2-continued (C, M, Y, K) Tint (16.1, 0, 43.9, 0)
(16.1, 0, 71.4, 0)
(16.1, 0, 72.2, 0)
(16.1, 0, 76.5, 0)
(16.1, 7.1, 0, 0)
(16.1, 22.7, 0, 0)
(16.1, 34.1, 0, 0)
(16.1, 48.2, 0, 0)
(16.1, 61.6, 0, 0)
(16.1, 63.1, 0, 0)
(16.1, 82, 0, 0)
(19.2, 0, 48.6, 0)
(19.2, 7.1, 0, 0)
(19.2, 41.2, 0, 0)
(19.2, 50.2, 0, 0)
(19.2, 82, 0, 0)
(22.4, 0, 12.5, 0)
(22.4, 0, 77.6, 0)
(22.4, 0, 86.3, 0)
(22.4, 13.7, 0, 0)
(22.4, 16.9, 0, 0)
(22.4, 20, 0, 0)
(22.4, 45.9, 0, 0)
(22.4, 83.9, 0, 0)
(25.1, 0, 14.1, 0)
(25.1, 0, 40.4, 0)
(25.1, 0, 47.5, 0)
(25.1, 0, 56.1, 0)
(25.1, 0, 83.5, 0)
(25.1, 7.1, 0, 0)
(25.1, 13.7, 0, 0)
(25.1, 31.4, 0, 0)
(25.1, 45.9, 0, 0)
(28.2, 0, 7.1, 0)
(28.2, 0, 9, 0)
(28.2, 41.2, 0, 0)
(28.2, 45.9, 0, 0)
(28.2, 54.1, 0, 0)
(31, 0, 14.1, 0)
(31, 0, 52.9, 0)
(31, 69, 0, 0)
(31, 93.3, 0, 0)
(33.3, 20, 0, 0)
(33.3, 31.4, 0, 0)
(33.3, 59.6, 0, 0)
(33.3, 87.8, 0, 0)
(34.9, 0, 0, 0)
(36.1, 0, 0, 0)
(36.1, 0, 7.1, 0)
(36.1, 0, 17.3, 0)
(36.1, 0, 29.4, 0)
(36.1, 0, 48.6, 0)
(36.1, 16.9, 0, 0)
(36.1, 20, 0, 0)
(38.4, 0, 9, 0)
(38.4, 0, 14.1, 0)
(38.4, 0, 15.7, 0)
(38.4, 0, 32.2, 0)
(38.4, 16.9, 0, 0)
(38.4, 20, 0, 0)
(38.4, 48.2, 0, 0)
(38.4, 61.6, 0, 0)
(38.4, 92.5, 0, 0)
(38.4, 96.5, 0, 0)
(40.8, 0, 10.6, 0)
(40.8, 0, 31, 0)
(40.8, 0, 51.8, 0)
(40.8, 0, 54.1, 0)
(40.8, 0, 67.1, 0)
(40.8, 38.8, 0, 0)
(40.8, 83.9, 0, 0)
(43.1, 0, 26.7, 0)
(43.1, 0, 34.9, 0)
(43.1, 0, 36.5, 0)
(43.1, 34.1, 0, 0)
(43.1, 61.6, 0, 0)
(45.1, 0, 0, 0)
(45.5, 0, 20.4, 0)

TABLE 2-continued (C, M, Y, K) Tint (45.5, 0, 22, 0)
(45.5, 0, 29.4, 0)
(45.5, 0, 38.8, 0)
(45.5, 0, 77.6, 0)
(45.5, 13.7, 0, 0)
(45.5, 20, 0, 0)
(45.5, 22.7, 0, 0)
(45.5, 76.9, 0, 0)
(45.5, 89.4, 0, 0)
(47.8, 0, 7.1, 0)
(47.8, 0, 20.4, 0)
(49.8, 0, 10.6, 0)
(49.8, 0, 65.5, 0)
(49.8, 48.2, 0, 0)
(49.8, 73.3, 0, 0)
(49.8, 93.3, 0, 0)
(51.8, 0, 27.8, 0)
(51.8, 0, 31, 0)
(51.8, 0, 64.7, 0)
(51.8, 31.4, 0, 0)
(54.1, 0, 5.5, 0)
(54.1, 0, 20.4, 0)
(54.1, 0, 36.5, 0)
(54.1, 3.5, 0, 0)
(54.1, 52.2, 0, 0)
(54.1, 59.6, 0, 0)
(54.1, 86.3, 0, 0)
(55.7, 0, 45.1, 0)
(57.6, 0, 25.1, 0)
(57.6, 0, 29.4, 0)
(57.6, 0, 31, 0)
(57.6, 0, 91.4, 0)
(57.6, 34.1, 0, 0)
(57.6, 45.9, 0, 0)
(57.6, 69, 0, 0)
(59.6, 0, 0, 0)
(59.6, 0, 18.8, 0)
(59.6, 22.7, 0, 0)
(59.6, 28.6, 0, 0)
(59.6, 84.7, 0, 0)
(61.2, 0, 73.7, 0)
(61.2, 0, 84.7, 0)
(61.2, 20, 0, 0)
(61.2, 36.5, 0, 0)
(62.7, 0, 56.1, 0)
(62.7, 83.1, 0, 0)
(62.7, 93.7, 0, 0)
(64.7, 0, 12.5, 0)
(64.7, 0, 38.8, 0)
(64.7, 87.8, 0, 0)
(65.1, 0, 0, 0)
(66.3, 0, 10.6, 0)
(66.3, 0, 17.3, 0)
(66.3, 13.7, 0, 0)
(66.3, 71.8, 0, 0)
(67.8, 73.3, 0, 0)
(69, 0, 38.8, 0)
(69, 41.2, 0, 0)
(69, 48.2, 0, 0)
(70.6, 0, 51, 0)
(71.8, 67.8, 0, 0)
(71.8, 83.1, 0, 0)
(73.3, 0, 7.1, 0)
(73.3, 0, 82.7, 0)
(74.5, 0, 37.6, 0)
(74.5, 0, 62.7, 0)
(75.7, 0, 51, 0)
(78, 0, 49.8, 0)
(78, 0, 70.6, 0)
(78, 31.4, 0, 0)
(79.2, 0, 38.8, 0)
(79.2, 52.2, 0, 0)
(80.4, 0, 73.7, 0)
(80.4, 22.7, 0, 0)
(81.2, 0, 12.5, 0)
(81.2, 0, 22, 0)
(81.2, 0, 49.8, 0)
(81.2, 91.8, 0, 0)

TABLE 2-continued (C, M, Y, K) Tint (82.4, 0, 9, 0)
(82.4, 10.6, 0, 0)
(83.1, 0, 48.6, 0)
(83.1, 0, 74.9, 0)
(85.1, 0, 65.5, 0)
(85.9, 0, 15.7, 0)
(85.9, 0, 37.6, 0)
(86.7, 71.8, 0, 0)
(87.5, 0, 59.2, 0)
(88.2, 0, 77.6, 0)
(89.4, 0, 78.4, 0)
(90.2, 56.1, 0, 0)
(91.4, 0, 52.9, 0)
(91.4, 0, 83.9, 0)
(91.8, 0, 41.6, 0)
(91.8, 0, 61.2, 0)
(92.5, 0, 0, 0)
(92.5, 95.3, 0, 0)
(92.9, 0, 63.9, 0)
(93.3, 0, 71.4, 0)
(94.1, 0, 43.9, 0)
(95.3, 75.7, 0, 0)
(97.3, 0, 26.7, 0)
(97.3, 0, 37.6, 0)
(98, 34.1, 0, 0)
(98.4, 0, 52.9, 0)
(98.4, 96.1, 0, 0)
(98.8, 0, 68.2, 0)
(98.8, 91, 0, 0)
(99.2, 0, 17.3, 0)
(99.2, 66.3, 0, 0)
(99.6, 0, 0, 0)
(100, 0, 45.1, 0)
(100, 16.9, 42.7, 0)
(100, 58, 0, 0)
(100, 82, 0, 0)
(100, 91.8, 0, 0)
(0, 0, 49.8, 5.1)
(0, 13.7, 40.4, 5.1)
(0, 22.7, 33.7, 5.1)
(0, 28.6, 32.2, 5.1)
(0, 28.6, 40.4, 5.1)
(0, 28.6, 52.9, 5.1)
(0, 31.4, 3.5, 5.1)
(0, 31.4, 74.1, 5.1)
(0, 34.1, 10.6, 5.1)
(0, 36.5, 79.2, 5.1)
(0, 41.2, 40.4, 5.1)
(0, 43.5, 23.5, 5.1)
(0, 48.2, 72.9, 5.1)
(0, 50.2, 26.7, 5.1)
(0, 56.1, 52.9, 5.1)
(0, 61.6, 91.4, 5.1)
(0, 66.3, 91.8, 5.1)
(0, 69, 85.5, 5.1)
(0, 73.3, 69, 5.1)
(0, 92.5, 7.1, 5.1)
(0, 98.8, 15.7, 5.1)
(6.3, 10.6, 0, 5.1)
(9.8, 0, 48.6, 5.1)
(9.8, 0, 49.8, 5.1)
(9.8, 41.2, 0, 5.1)
(12.9, 25.9, 0, 5.1)
(22.4, 0, 2, 5.1)
(36.1, 16.9, 0, 5.1)
(38.4, 0, 7.1, 5.1)
(47.8, 75.7, 0, 5.1)
(80.4, 94.9, 0, 5.1)
(82.4, 56.1, 0, 5.1)
(0, 0, 34.9, 8.2)
(0, 0, 42.7, 8.2)
(0, 0, 67.1, 8.2)
(0, 16.9, 51, 8.2)
(0, 20, 0, 8.2)
(0, 22.7, 10.6, 8.2)
(0, 25.9, 0, 8.2)
(0, 28.6, 10.6, 8.2)
(0, 63.1, 23.5, 8.2)

TABLE 2-continued

(C, M, Y, K) Tint (0, 70.6, 10.6, 8.2)
(0, 88.6, 60, 8.2)
(0, 88.6, 83.5, 8.2)
(0, 97.6, 77.3, 8.2)
(6.3, 31.4, 0, 8.2)
(12.9, 0, 0, 8.2)
(12.9, 0, 18.8, 8.2)
(12.9, 0, 56.1, 8.2)
(16.1, 7.1, 0, 8.2)
(16.1, 54.1, 0, 8.2)
(33.3, 0, 15.7, 8.2)
(40.8, 0, 18.8, 8.2)
(54.1, 0, 26.7, 8.2)
(54.1, 54.1, 0, 8.2)
(64.7, 64.7, 0, 8.2)
(95.3, 0, 12.5, 8.2)
(100, 76.9, 0, 8.2)
(100, 93.3, 0, 8.2)
(0, 0, 36.5, 11.8)
(0, 0, 74.1, 11.8)
(0, 16.9, 2, 11.8)
(0, 16.9, 90.6, 11.8)
(0, 20, 10.6, 11.8)
(0, 22.7, 91.8, 11.8)
(0, 25.9, 14.1, 11.8)
(0, 28.6, 3.5, 11.8)
(0, 28.6, 31, 11.8)
(0, 31.4, 10.6, 11.8)
(0, 31.4, 33.7, 11.8)
(0, 31.4, 46.3, 11.8)
(0, 31.4, 87.1, 11.8)
(0, 36.5, 10.6, 11.8)
(0, 43.5, 20.4, 11.8)
(0, 71.8, 93.3, 11.8)
(0, 83.1, 90.6, 11.8)
(0, 84.7, 40.4, 11.8)
(0, 87.8, 65.5, 11.8)
(0, 91.8, 42.7, 11.8)
(0, 93.3, 25.1, 11.8)
(0, 94.5, 87.8, 11.8)
(0, 98.8, 69, 11.8)
(0, 99.2, 49.8, 11.8)
(9.8, 10.6, 0, 11.8)
(9.8, 13.7, 0, 11.8)
(16.1, 0, 33.7, 11.8)
(16.1, 0, 70.6, 11.8)
(19.2, 13.7, 0, 11.8)
(19.2, 43.5, 0, 11.8)
(19.2, 89.4, 0, 11.8)
(22.4, 10.6, 0, 11.8)
(31, 25.9, 0, 11.8)
(51.8, 0, 9, 11.8)
(92.9, 0, 59.2, 11.8)
(98.4, 0, 64.7, 11.8)
(0, 0, 52.9, 14.9)
(0, 3.5, 45.1, 14.9)
(0, 7.1, 25.1, 14.9)
(0, 10.6, 0, 14.9)
(0, 16.9, 22, 14.9)
(0, 20, 2, 14.9)
(0, 20, 10.6, 14.9)
(0, 22.7, 7.1, 14.9)
(0, 22.7, 12.5, 14.9)
(0, 22.7, 36.5, 14.9)
(0, 25.9, 9, 14.9)
(0, 25.9, 46.3, 14.9)
(0, 28.6, 31, 14.9)
(0, 45.9, 58, 14.9)
(0, 48.2, 9, 14.9)
(0, 48.2, 69.8, 14.9)
(0, 59.6, 36.5, 14.9)
(0, 80, 42.7, 14.9)
(0, 87.1, 91.4, 14.9)
(0, 90.6, 82.7, 14.9)
(0, 96.9, 27.8, 14.9)
(2.7, 0, 3.5, 14.9)
(9.8, 20, 0, 14.9)
(16.1, 7.1, 0, 14.9)
(19.2, 0, 12.5, 14.9)
(19.2, 0, 33.7, 14.9)
(19.2, 0, 36.5, 14.9)
(22.4, 0, 0, 14.9)
(22.4, 0, 7.1, 14.9)
(22.4, 16.9, 0, 14.9)
(40.8, 94.5, 0, 14.9)
(43.1, 0, 20.4, 14.9)
(55.7, 22.7, 0, 14.9)
(67.8, 0, 12.5, 14.9)
(95.3, 98.4, 0, 14.9)
(0, 0, 7.1, 18)
(0, 0, 36.5, 18)
(0, 0, 65.5, 18)
(0, 0, 86.3, 18)
(0, 7.1, 56.1, 18)
(0, 13.7, 31, 18)
(0, 13.7, 33.7, 18)
(0, 16.9, 0, 18)
(0, 16.9, 18.8, 18)
(0, 16.9, 22, 18)
(0, 22.7, 27.8, 18)
(0, 25.9, 14.1, 18)
(0, 28.6, 2, 18)
(0, 28.6, 7.1, 18)
(0, 28.6, 43.9, 18)
(0, 36.5, 12.5, 18)
(0, 36.5, 20.4, 18)
(0, 41.2, 56.1, 18)
(0, 48.2, 15.7, 18)
(0, 56.1, 31, 18)
(0, 61.6, 95.7, 18)
(0, 64.7, 83.9, 18)
(0, 76.9, 87.1, 18)
(0, 76.9, 98.4, 18)
(0, 95.3, 83.5, 18)
(0, 97.6, 81.2, 18)
(6.3, 0, 2, 18)
(6.3, 96.1, 0, 18)
(9.8, 0, 0, 18)
(9.8, 0, 26.7, 18)
(12.9, 0, 5.5, 18)
(12.9, 31.4, 0, 18)
(16.1, 0, 12.5, 18)
(16.1, 16.9, 0, 18)
(16.1, 28.6, 0, 18)
(19.2, 0, 0, 18)
(19.2, 0, 46.3, 18)
(19.2, 13.7, 0, 18)
(22.4, 7.1, 0, 18)
(25.1, 0, 15.7, 18)
(25.1, 0, 18.8, 18)
(28.2, 0, 7.1, 18)
(28.2, 0, 45.1, 18)
(31, 0, 0, 18)
(38.4, 20, 0, 18)
(61.2, 0, 27.8, 18)
(62.7, 91, 0, 18)
(67.8, 0, 89.8, 18)
(99.6, 0, 14.1, 18)
(100, 89.4, 0, 18)
(0, 0, 14.1, 21.2)
(0, 0, 29.4, 21.2)
(0, 0, 32.2, 21.2)
(0, 0, 41.6, 21.2)
(0, 0, 76.5, 21.2)
(0, 7.1, 33.7, 21.2)
(0, 10.6, 2, 21.2)
(0, 10.6, 62.7, 21.2)
(0, 16.9, 0, 21.2)
(0, 16.9, 40.4, 21.2)
(0, 20, 23.5, 21.2)
(0, 20, 25.1, 21.2)
(0, 20, 40.4, 21.2)
(0, 25.9, 94.9, 21.2)
(0, 34.1, 60, 21.2)
(0, 36.5, 23.5, 21.2)
(0, 38.8, 9, 21.2)

TABLE 2-continued (C, M, Y, K) Tint (0, 38.8, 45.1, 21.2)
(0, 61.6, 10.6, 21.2)
(0, 63.1, 92.2, 21.2)
(0, 85.5, 83.5, 21.2)
(0, 92.5, 76.5, 21.2)
(0, 93.7, 77.6, 21.2)
(0, 95.7, 43.9, 21.2)
(0, 96.9, 67.1, 21.2)
(2.7, 0, 25.1, 21.2)
(9.8, 0, 23.5, 21.2)
(9.8, 0, 34.9, 21.2)
(16.1, 0, 7.1, 21.2)
(16.1, 0, 14.1, 21.2)
(16.1, 20, 0, 21.2)
(19.2, 38.8, 0, 21.2)
(22.4, 0, 95.7, 21.2)
(31, 0, 23.5, 21.2)
(31, 0, 94.1, 21.2)
(31, 20, 0, 21.2)
(33.3, 31.4, 0, 21.2)
(43.1, 7.1, 0, 21.2)
(43.1, 20, 0, 21.2)
(43.1, 97.6, 0, 21.2)
(54.1, 0, 25.1, 21.2)
(67.8, 58, 0, 21.2)
(83.9, 67.8, 0, 21.2)
(99.6, 13.7, 51, 21.2)
(0, 0, 14.1, 23.9)
(0, 0, 49.8, 23.9)
(0, 3.5, 12.5, 23.9)
(0, 3.5, 94.1, 23.9)
(0, 10.6, 36.5, 23.9)
(0, 25.9, 33.7, 23.9)
(0, 31.4, 41.6, 23.9)
(0, 34.1, 20.4, 23.9)
(0, 36.5, 51, 23.9)
(0, 48.2, 92.5, 23.9)
(0, 79.2, 51.8, 23.9)
(0, 95.3, 68.2, 23.9)
(0, 97.3, 77.3, 23.9)
(6.3, 0, 0, 23.9)
(6.3, 0, 3.5, 23.9)
(12.9, 0, 0, 23.9)
(12.9, 0, 27.8, 23.9)
(16.1, 0, 15.7, 23.9)
(19.2, 0, 40.4, 23.9)
(22.4, 0, 15.7, 23.9)
(22.4, 22.7, 0, 23.9)
(22.4, 50.2, 0, 23.9)
(25.1, 0, 0, 23.9)
(25.1, 0, 85.1, 23.9)
(31, 10.6, 0, 23.9)
(31, 54.1, 0, 23.9)
(36.1, 0, 23.5, 23.9)
(38.4, 0, 9, 23.9)
(38.4, 0, 29.4, 23.9)
(54.1, 0, 0, 23.9)
(57.6, 0, 71.4, 23.9)
(71.8, 0, 83.5, 23.9)
(87.5, 0, 15.7, 23.9)
(92.5, 38.8, 0, 23.9)
(99.6, 92.5, 0, 23.9)
(0, 0, 12.5, 26.7)
(0, 7.1, 9, 26.7)
(0, 13.7, 17.3, 26.7)
(0, 13.7, 42.7, 26.7)
(0, 20, 0, 26.7)
(0, 20, 49.8, 26.7)
(0, 28.6, 32.2, 26.7)
(0, 38.8, 72.2, 26.7)
(0, 48.2, 7.1, 26.7)
(0, 48.2, 74.1, 26.7)
(0, 54.1, 74.1, 26.7)
(0, 59.6, 23.5, 26.7)
(0, 61.6, 91.8, 26.7)
(0, 63.1, 85.1, 26.7)
(0, 79.2, 15.7, 26.7)
(0, 79.2, 89.8, 26.7)

TABLE 2-continued (C, M, Y, K) Tint (2.7, 0, 31, 26.7)
(6.3, 0, 14.1, 26.7)
(12.9, 0, 38.8, 26.7)
(16.1, 0, 9, 26.7)
(22.4, 93.3, 0, 26.7)
(31, 0, 90.2, 26.7)
(40.8, 25.9, 0, 26.7)
(59.6, 31.4, 0, 26.7)
(59.6, 34.1, 0, 26.7)
(62.7, 31.4, 0, 26.7)
(91.8, 0, 80.4, 26.7)
(94.5, 0, 66.3, 26.7)
(100, 0, 0, 26.7)
(100, 81.2, 0, 26.7)
(0, 0, 41.6, 29.4)
(0, 7.1, 12.5, 29.4)
(0, 16.9, 3.5, 29.4)
(0, 25.9, 0, 29.4)
(0, 31.4, 92.9, 29.4)
(0, 34.1, 40.4, 29.4)
(0, 41.2, 48.6, 29.4)
(0, 41.2, 85.1, 29.4)
(0, 50.2, 58, 29.4)
(0, 52.2, 34.9, 29.4)
(0, 54.1, 34.9, 29.4)
(0, 83.1, 100, 29.4)
(0, 83.9, 98.8, 29.4)
(0, 87.1, 72.2, 29.4)
(9.8, 0, 0, 29.4)
(19.2, 0, 17.3, 29.4)
(22.4, 0, 9, 29.4)
(45.5, 0, 9, 29.4)
(45.5, 91, 0, 29.4)
(49.8, 82, 0, 29.4)
(74.5, 0, 43.9, 29.4)
(99.2, 0, 69.8, 29.4)
(0, 7.1, 62, 32.2)
(0, 7.1, 90.2, 32.2)
(0, 13.7, 94.9, 32.2)
(0, 52.2, 14.1, 32.2)
(0, 83.1, 89.8, 32.2)
(0, 88.6, 77.6, 32.2)
(28.2, 0, 38.8, 32.2)
(31, 0, 20.4, 32.2)
(49.8, 0, 38.8, 32.2)
(57.6, 10.6, 0, 32.2)
(73.3, 10.6, 0, 32.2)
(0, 0, 0, 34.9)
(0, 10.6, 15.7, 34.9)
(0, 50.2, 68.2, 34.9)
(0, 64.7, 62.7, 34.9)
(0, 70.6, 91.8, 34.9)
(0, 71.8, 84.7, 34.9)
(0, 89.4, 66.3, 34.9)
(0, 96.9, 62.7, 34.9)
(0, 98, 69, 34.9)
(0, 98.8, 26.7, 34.9)
(9.8, 0, 2, 34.9)
(25.1, 56.1, 0, 34.9)
(28.2, 38.8, 0, 34.9)
(45.5, 16.9, 0, 34.9)
(64.7, 89.4, 0, 34.9)
(64.7, 93.3, 0, 34.9)
(70.6, 41.2, 0, 34.9)
(96.1, 0, 70.6, 34.9)
(96.5, 0, 65.5, 34.9)
(98.4, 96.1, 0, 34.9)
(99.6, 25.9, 0, 34.9)
(100, 7.1, 0, 34.9)
(100, 64.7, 0, 34.9)
(0, 0, 40.4, 37.3)
(0, 0, 94.5, 37.3)
(0, 7.1, 14.1, 37.3)
(0, 7.1, 23.5, 37.3)
(0, 13.7, 15.7, 37.3)
(0, 16.9, 23.5, 37.3)
(0, 16.9, 54.1, 37.3)
(0, 25.9, 88.2, 37.3)

TABLE 2-continued (C, M, Y, K) Tint (0, 31.4, 0, 37.3)
(0, 31.4, 65.5, 37.3)
(0, 41.2, 90.6, 37.3)
(0, 58, 83.9, 37.3)
(0, 66.3, 85.5, 37.3)
(0, 74.5, 34.9, 37.3)
(9.8, 0, 0, 37.3)
(12.9, 0, 94.5, 37.3)
(16.1, 0, 40.4, 37.3)
(19.2, 0, 7.1, 37.3)
(19.2, 3.5, 0, 37.3)
(25.1, 0, 20.4, 37.3)
(28.2, 10.6, 0, 37.3)
(55.7, 0, 91, 37.3)
(59.6, 92.2, 0, 37.3)
(71.8, 0, 84.7, 37.3)
(92.5, 0, 85.5, 37.3)
(98.4, 0, 20.4, 37.3)
(98.8, 0, 54.1, 37.3)
(0, 0, 52.9, 39.6)
(0, 41.2, 43.9, 39.6)
(0, 52.2, 34.9, 39.6)
(0, 64.7, 14.1, 39.6)
(0, 73.3, 92.9, 39.6)
(0, 94.5, 80.4, 39.6)
(0, 95.3, 32.2, 39.6)
(0, 96.1, 47.5, 39.6)
(0, 96.9, 68.2, 39.6)
(0, 97.6, 81.2, 39.6)
(0, 98.8, 49.8, 39.6)
(9.8, 0, 15.7, 39.6)
(12.9, 0, 0, 39.6)
(16.1, 0, 52.9, 39.6)
(36.1, 36.5, 0, 39.6)
(49.8, 0, 33.7, 39.6)
(54.1, 0, 72.2, 39.6)
(90.6, 0, 58, 39.6)
(100, 81.2, 0, 39.6)
(0, 13.7, 17.3, 42)
(0, 13.7, 91.4, 42)
(0, 22.7, 7.1, 42)
(0, 34.1, 93.3, 42)
(0, 41.2, 84.7, 42)
(0, 48.2, 51.8, 42)
(0, 52.2, 62, 42)
(0, 61.6, 94.5, 42)
(0, 64.7, 43.9, 42)
(16.1, 0, 17.3, 42)
(33.3, 0, 14.1, 42)
(40.8, 0, 26.7, 42)
(51.8, 0, 74.1, 42)
(83.1, 96.9, 0, 42)
(94.5, 0, 76.5, 42)
(100, 31.4, 36.5, 42)
(0, 13.7, 32.2, 44.3)
(0, 13.7, 75.7, 44.3)
(0, 16.9, 93.7, 44.3)
(0, 20, 51.8, 44.3)
(0, 67.8, 17.3, 44.3)
(0, 96.9, 12.5, 44.3)
(0, 99.2, 74.1, 44.3)
(66.3, 0, 90.2, 44.3)
(93.3, 0, 72.2, 44.3)
(0, 0, 0, 45.1)
(0, 13.7, 17.3, 46.3)
(0, 22.7, 32.2, 46.3)
(0, 28.6, 93.7, 46.3)
(0, 70.6, 82.4, 46.3)
(0, 71.8, 61.2, 46.3)
(0, 75.7, 85.1, 46.3)
(0, 85.5, 87.1, 46.3)
(0, 88.6, 47.5, 46.3)
(9.8, 0, 0, 46.3)
(75.7, 89.4, 0, 46.3)
(98.4, 0, 68.2, 46.3)
(99.6, 0, 38.8, 46.3)
(0, 0, 60, 48.6)
(0, 16.9, 20.4, 48.6)
(0, 48.2, 0, 48.6)
(0, 61.6, 79.2, 48.6)
(0, 87.1, 64.7, 48.6)
(0, 91, 74.9, 48.6)
(0, 92.5, 63.9, 48.6)
(0, 93.7, 78.4, 48.6)
(0, 95.7, 74.1, 48.6)
(12.9, 0, 0, 48.6)
(22.4, 0, 3.5, 48.6)
(25.1, 0, 92.9, 48.6)
(28.2, 0, 91.8, 48.6)
(33.3, 0, 76.5, 48.6)
(55.7, 22.7, 0, 48.6)
(62.7, 0, 14.1, 48.6)
(83.9, 56.1, 0, 48.6)
(94.5, 58, 0, 48.6)
(100, 0, 47.5, 48.6)
(100, 59.6, 0, 48.6)
(100, 90.6, 0, 48.6)
(0, 3.5, 51.8, 50.6)
(0, 3.5, 92.9, 50.6)
(0, 16.9, 81.6, 50.6)
(0, 28.6, 86.7, 50.6)
(0, 41.2, 89, 50.6)
(0, 48.2, 92.9, 50.6)
(0, 63.1, 92.2, 50.6)
(0, 70.6, 91.8, 50.6)
(0, 73.3, 69, 50.6)
(0, 79.2, 88.2, 50.6)
(0, 91.8, 85.5, 50.6)
(0, 99.2, 48.6, 50.6)
(16.1, 0, 17.3, 50.6)
(19.2, 0, 48.6, 50.6)
(45.5, 58, 0, 50.6)
(57.6, 91.8, 0, 50.6)
(62.7, 93.3, 0, 50.6)
(91.4, 59.6, 0, 50.6)
(98.4, 95.7, 0, 50.6)
(100, 87.1, 0, 50.6)
(0, 22.7, 22, 52.5)
(0, 25.9, 89, 52.5)
(0, 28.6, 72.2, 52.5)
(0, 61.6, 68.2, 52.5)
(0, 64.7, 43.9, 52.5)
(0, 64.7, 91, 52.5)
(0, 73.3, 82.4, 52.5)
(0, 76.9, 54.9, 52.5)
(0, 81.2, 23.5, 52.5)
(0, 87.1, 83.9, 52.5)
(0, 90.6, 51, 52.5)
(0, 97.6, 74.1, 52.5)
(0, 98.4, 82.4, 52.5)
(0, 98.8, 51.8, 52.5)
(9.8, 0, 18.8, 52.5)
(40.8, 16.9, 0, 52.5)
(62.7, 28.6, 0, 52.5)
(83.1, 0, 51, 52.5)
(90.2, 16.9, 0, 52.5)
(92.5, 0, 37.6, 52.5)
(100, 13.7, 17.3, 52.5)
(0, 16.9, 23.5, 54.5)
(0, 20, 23.5, 54.5)
(0, 20, 92.9, 54.5)
(0, 41.2, 54.9, 54.5)
(0, 56.1, 57.3, 54.5)
(0, 64.7, 74.9, 54.5)
(0, 71.8, 91, 54.5)
(0, 78, 93.3, 54.5)
(0, 81.2, 94.1, 54.5)
(12.9, 0, 0, 54.5)
(16.1, 3.5, 0, 54.5)
(19.2, 0, 66.3, 54.5)
(19.2, 0, 88.6, 54.5)
(28.2, 96.9, 0, 54.5)
(33.3, 87.8, 0, 54.5)
(64.7, 0, 45.1, 54.5)
(80.4, 95.7, 0, 54.5)
(92.9, 0, 63.9, 54.5)

TABLE 2-continued (C, M, Y, K) Tint (100, 88.6, 0, 54.5)
(0, 0, 0, 54.9)
(0, 88.6, 71.4, 56.5)
(0, 96.1, 66.3, 56.5)
(6.3, 0, 12.5, 56.5)
(31, 13.7, 0, 56.5)
(47.8, 0, 89.8, 56.5)
(51.8, 0, 36.5, 56.5)
(97.3, 94.5, 0, 56.5)
(100, 81.2, 0, 56.5)
(100, 84.7, 0, 56.5)
(0, 7.1, 71.4, 58)
(0, 20, 81.2, 58)
(0, 28.6, 81.6, 58)
(0, 93.3, 58, 58)
(0, 96.9, 25.1, 58)
(0, 96.9, 32.2, 58)
(40.8, 0, 37.6, 58)
(40.8, 0, 75.7, 58)
(40.8, 89.8, 0, 58)
(45.5, 0, 22, 58)
(62.7, 0, 25.1, 58)
(70.6, 0, 84.7, 58)
(75.7, 0, 62.7, 58)
(86.7, 0, 75.7, 58)
(95.7, 25.9, 0, 58)
(100, 63.1, 0, 58)
(0, 22.7, 27.8, 60)
(0, 25.9, 26.7, 60)
(0, 34.1, 77.3, 60)
(0, 70.6, 51, 60)
(0, 79.2, 85.5, 60)
(0, 81.2, 61.2, 60)
(0, 83.9, 26.7, 60)
(0, 84.7, 84.7, 60)
(0, 93.3, 72.2, 60)
(28.2, 0, 0, 60)
(54.1, 0, 77.6, 60)
(54.1, 82, 0, 60)
(94.9, 0, 70.6, 60)
(100, 75.7, 0, 60)
(0, 22.7, 87.8, 61.6)
(0, 25.9, 29.4, 61.6)
(0, 45.9, 84.7, 61.6)
(0, 52.2, 7.1, 61.6)
(0, 63.1, 85.1, 61.6)
(0, 87.1, 52.9, 61.6)
(0, 87.1, 90.2, 61.6)
(0, 92.2, 47.5, 61.6)
(12.9, 0, 23.5, 61.6)
(19.2, 90.6, 0, 61.6)
(55.7, 69, 0, 61.6)
(91.4, 0, 69.8, 61.6)
(97.3, 0, 51.8, 61.6)
(100, 87.8, 0, 61.6)
(0, 61.6, 0, 63.1)
(0, 80, 86.7, 63.1)
(0, 86.3, 67.1, 63.1)
(0, 86.3, 74.9, 63.1)
(0, 88.6, 14.1, 63.1)
(0, 90.6, 47.5, 63.1)
(16.1, 7.1, 0, 63.1)
(25.1, 0, 59.2, 63.1)
(57.6, 71.8, 0, 63.1)
(59.6, 59.6, 0, 63.1)
(67.8, 84.7, 0, 63.1)
(87.5, 0, 57.3, 63.1)
(91.8, 0, 73.7, 63.1)
(97.6, 0, 66.3, 63.1)
(97.6, 22.7, 0, 63.1)
(97.6, 89.4, 0, 63.1)
(0, 67.8, 69, 64.7)
(0, 82, 93.7, 64.7)
(0, 93.3, 79.6, 64.7)
(12.9, 0, 91.8, 64.7)
(51.8, 89.4, 0, 64.7)
(59.6, 91.8, 0, 64.7)
(80.4, 0, 17.3, 64.7)
(97.6, 94.5, 0, 64.7)
(0, 0, 0, 65.1)
(0, 36.5, 47.5, 66.3)
(0, 54.1, 70.6, 66.3)
(0, 84.7, 57.3, 66.3)
(0, 91.8, 40.4, 66.3)
(57.6, 0, 40.4, 66.3)
(0, 22.7, 32.2, 67.8)
(0, 28.6, 33.7, 67.8)
(0, 43.5, 22, 67.8)
(0, 79.2, 70.6, 67.8)
(0, 93.3, 72.9, 67.8)
(16.1, 7.1, 0, 67.8)
(40.8, 83.1, 0, 67.8)
(45.5, 0, 42.7, 67.8)
(82.4, 0, 52.9, 67.8)
(96.5, 0, 12.5, 67.8)
(98.8, 75.7, 0, 67.8)
(99.2, 0, 48.6, 67.8)
(100, 83.9, 0, 67.8)
(0, 20, 51, 69)
(0, 58, 88.6, 69)
(22.4, 0, 78.4, 69)
(78, 94.9, 0, 69)
(100, 61.6, 0, 69)
(100, 86.3, 0, 69)
(0, 0, 83.5, 70.6)
(0, 34.1, 32.2, 70.6)
(0, 75.7, 91, 70.6)
(0, 76.9, 78.4, 70.6)
(0, 88.6, 57.3, 70.6)
(0, 89.8, 57.3, 70.6)
(45.5, 22.7, 0, 70.6)
(45.5, 81.2, 0, 70.6)
(51.8, 84.7, 0, 70.6)
(76.9, 0, 65.5, 70.6)
(96.1, 70.6, 0, 70.6)
(99.6, 48.2, 0, 70.6)
(100, 61.6, 0, 70.6)
(0, 31.4, 36.5, 71.8)
(0, 45.9, 79.2, 71.8)
(0, 63.1, 84.7, 71.8)
(0, 63.1, 87.1, 71.8)
(0, 70.6, 0, 71.8)
(78, 0, 73.7, 71.8)
(87.5, 0, 49.8, 71.8)
(90.6, 0, 73.7, 71.8)
(0, 43.5, 88.2, 72.9)
(0, 79.2, 69, 72.9)
(0, 83.9, 80.4, 72.9)
(0, 84.7, 89.8, 72.9)
(0, 94.1, 49.8, 72.9)
(28.2, 0, 67.1, 72.9)
(43.1, 87.1, 0, 72.9)
(70.6, 70.6, 0, 72.9)
(78, 0, 56.1, 72.9)
(96.9, 93.7, 0, 72.9)
(0, 36.5, 85.1, 74.5)
(0, 61.6, 56.1, 74.5)
(0, 90.6, 40.4, 74.5)
(0, 95.3, 67.1, 74.5)
(9.8, 0, 27.8, 74.5)
(22.4, 13.7, 0, 74.5)
(40.8, 0, 83.5, 74.5)
(54.1, 0, 83.9, 74.5)
(59.6, 0, 32.2, 74.5)
(61.2, 31.4, 0, 74.5)
(100, 74.5, 0, 74.5)
(0, 28.6, 36.5, 75.7)
(0, 28.6, 88.6, 75.7)
(0, 80, 63.9, 75.7)
(0, 82, 5.5, 75.7)
(0, 85.5, 79.2, 75.7)
(85.1, 0, 62.7, 75.7)
(87.5, 66.3, 0, 75.7)
(100, 10.6, 38.8, 75.7)
(0, 45.9, 54.9, 76.5)
(0, 64.7, 7.1, 76.5)

TABLE 2-continued

| (C, M, Y, K) Tint |
|---|
| (0, 75.7, 83.9, 76.5) |
| (0, 76.9, 77.3, 76.5) |
| (70.6, 82, 0, 76.5) |
| (80.4, 0, 74.1, 76.5) |
| (94.1, 0, 32.2, 76.5) |
| (94.9, 91, 0, 76.5) |
| (0, 78, 90.2, 77.6) |
| (0, 91, 62, 77.6) |
| (0, 93.7, 45.1, 77.6) |
| (83.9, 0, 54.9, 77.6) |
| (90.6, 0, 56.1, 77.6) |
| (95.3, 13.7, 0, 77.6) |
| (100, 81.2, 0, 77.6) |
| (0, 13.7, 86.3, 78.8) |
| (0, 41.2, 37.6, 78.8) |
| (0, 73.3, 85.5, 78.8) |
| (0, 83.9, 67.1, 78.8) |
| (81.2, 0, 29.4, 78.8) |
| (0, 48.2, 84.7, 79.6) |
| (0, 54.1, 75.7, 79.6) |
| (25.1, 13.7, 0, 79.6) |
| (28.2, 81.2, 0, 79.6) |
| (82.4, 89.8, 0, 79.6) |
| (0, 80, 76.5, 80.8) |
| (12.9, 0, 31, 80.8) |
| (31, 10.6, 0, 80.8) |
| (31, 16.9, 0, 80.8) |
| (45.5, 0, 76.5, 80.8) |
| (73.3, 0, 66.3, 80.8) |
| (88.6, 0, 69.8, 80.8) |
| (0, 86.3, 59.2, 81.6) |
| (33.3, 0, 71.4, 81.6) |
| (33.3, 20, 0, 81.6) |
| (73.3, 3.5, 0, 81.6) |
| (0, 16.9, 82.4, 82.7) |
| (0, 50.2, 57.3, 82.7) |
| (0, 80, 90.6, 82.7) |
| (99.6, 0, 20.4, 82.7) |
| (100, 80, 0, 82.7) |
| (0, 52.2, 37.6, 83.5) |
| (0, 81.2, 15.7, 83.5) |
| (12.9, 71.8, 0, 83.5) |
| (67.8, 0, 60, 83.5) |
| (85.9, 0, 57.3, 83.5) |
| (96.9, 0, 12.5, 83.5) |
| (97.6, 87.1, 0, 83.5) |
| (98.8, 66.3, 0, 83.5) |
| (0, 25.9, 74.1, 84.3) |
| (40.8, 0, 74.1, 84.3) |
| (100, 85.5, 0, 84.3) |
| (0, 28.6, 72.2, 85.1) |
| (0, 75.7, 62.7, 85.1) |
| (96.1, 74.5, 0, 85.1) |
| (100, 75.7, 0, 85.1) |
| (33.3, 64.7, 0, 85.9) |
| (70.6, 38.8, 0, 85.9) |
| (0, 67.8, 71.4, 86.7) |
| (0, 81.2, 85.5, 86.7) |
| (25.1, 0, 3.5, 86.7) |
| (43.1, 0, 82.7, 86.7) |
| (0, 50.2, 36.5, 87.1) |
| (76.9, 0, 49.8, 87.1) |
| (81.2, 61.6, 0, 87.1) |
| (83.9, 0, 57.3, 87.1) |
| (97.6, 52.2, 0, 87.1) |
| (0, 31.4, 66.3, 87.8) |
| (0, 70.6, 7.1, 87.8) |
| (75.7, 0, 42.7, 87.8) |
| (97.6, 52.2, 0, 87.8) |
| (98.4, 38.8, 0, 87.8) |
| (0, 71.8, 3.5, 88.6) |
| (62.7, 28.6, 0, 88.6) |
| (85.1, 82, 0, 88.6) |
| (0, 50.2, 62, 89) |
| (0, 87.8, 74.1, 89) |
| (16.1, 0, 14.1, 89) |
| (81.2, 0, 54.1, 89) |
| (91.8, 87.1, 0, 89) |
| (95.7, 0, 14.1, 89.8) |
| (0, 61.6, 42.7, 90.2) |
| (79.2, 0, 62.7, 91) |
| (0, 43.5, 36.5, 91.4) |
| (91.8, 0, 67.1, 91.4) |
| (0, 3.5, 17.3, 91.8) |
| (98, 0, 15.7, 91.8) |
| (0, 48.2, 43.9, 92.2) |
| (100, 61.6, 0, 93.3) |
| (98.4, 38.8, 0, 93.7) |
| (0, 20, 62.7, 94.5) |
| (0, 22.7, 36.5, 94.5) |
| (62.7, 45.9, 0, 94.5) |
| (31, 0, 0, 94.9) |
| (0, 52.2, 67.1, 95.3) |
| (47.8, 0, 41.6, 95.7) |
| (70.6, 20, 0, 96.1) |
| (89.4, 36.5, 0, 96.9) |
| (31, 0, 26.7, 97.6) |
| (33.3, 0, 26.7, 97.6) |
| (43.1, 0, 37.6, 97.6) |
| (96.5, 22.7, 0, 98) |

TABLE 3

| (C, M, Y, K, O, G, B) Tint |
|---|
| (0, 0, 0, 0, 0, 0, 2) |
| (0, 0, 0, 0, 0, 0, 3.1) |
| (0, 0, 0, 0, 0, 0, 5.1) |
| (0, 0, 0, 0, 0, 0, 7.1) |
| (0, 0, 0, 0, 0, 0, 10.2) |
| (0, 0, 0, 0, 0, 0, 14.9) |
| (0, 0, 0, 0, 0, 0, 20) |
| (0, 0, 0, 0, 0, 0, 25.1) |
| (0, 0, 0, 0, 0, 0, 30.2) |
| (0, 0, 0, 0, 0, 0, 34.9) |
| (0, 0, 0, 0, 0, 0, 40) |
| (0, 0, 0, 0, 0, 0, 45.1) |
| (0, 0, 0, 0, 0, 0, 50.2) |
| (0, 0, 0, 0, 0, 0, 54.9) |
| (0, 0, 0, 0, 0, 0, 60) |
| (0, 0, 0, 0, 0, 0, 65.1) |
| (0, 0, 0, 0, 0, 0, 70.2) |
| (0, 0, 0, 0, 0, 0, 74.9) |
| (0, 0, 0, 0, 0, 0, 80) |
| (0, 0, 0, 0, 0, 0, 85.1) |
| (0, 0, 0, 0, 0, 0, 90.2) |
| (0, 0, 0, 0, 0, 0, 94.9) |
| (0, 0, 0, 0, 0, 0, 98) |
| (0, 0, 0, 0, 0, 0, 100) |
| (0, 0, 0, 0, 0, 2, 0) |
| (0, 0, 0, 0, 0, 3.1, 0) |
| (0, 0, 0, 0, 0, 5.1, 0) |
| (0, 0, 0, 0, 0, 7.1, 0) |
| (0, 0, 0, 0, 0, 10.2, 0) |
| (0, 0, 0, 0, 0, 14.9, 0) |
| (0, 0, 0, 0, 0, 20, 0) |
| (0, 0, 0, 0, 0, 25.1, 0) |
| (0, 0, 0, 0, 0, 30.2, 0) |
| (0, 0, 0, 0, 0, 34.9, 0) |
| (0, 0, 0, 0, 0, 37.6, 0) |
| (0, 0, 0, 0, 0, 40, 0) |
| (0, 0, 0, 0, 0, 45.1, 0) |
| (0, 0, 0, 0, 0, 47.8, 0) |
| (0, 0, 0, 0, 0, 50.2, 0) |
| (0, 0, 0, 0, 0, 54.9, 0) |
| (0, 0, 0, 0, 0, 60, 0) |
| (0, 0, 0, 0, 0, 65.1, 0) |
| (0, 0, 0, 0, 0, 70.2, 0) |
| (0, 0, 0, 0, 0, 74.9, 0) |
| (0, 0, 0, 0, 0, 80, 0) |
| (0, 0, 0, 0, 0, 85.1, 0) |
| (0, 0, 0, 0, 0, 90.2, 0) |
| (0, 0, 0, 0, 0, 94.9, 0) |

TABLE 3-continued (C, M, Y, K, O, G, B) Tint (0, 0, 0, 0, 0, 98, 0)
(0, 0, 0, 0, 0, 100, 0)
(0, 0, 0, 0, 2, 0, 0)
(0, 0, 0, 0, 3.1, 0, 0)
(0, 0, 0, 0, 5.1, 0, 0)
(0, 0, 0, 0, 7.1, 0, 0)
(0, 0, 0, 0, 10.2, 0, 0)
(0, 0, 0, 0, 14.9, 0, 0)
(0, 0, 0, 0, 20, 0, 0)
(0, 0, 0, 0, 25.1, 0, 0)
(0, 0, 0, 0, 30.2, 0, 0)
(0, 0, 0, 0, 34.9, 0, 0)
(0, 0, 0, 0, 40, 0, 0)
(0, 0, 0, 0, 45.1, 0, 0)
(0, 0, 0, 0, 50.2, 0, 0)
(0, 0, 0, 0, 54.9, 0, 0)
(0, 0, 0, 0, 60, 0, 0)
(0, 0, 0, 0, 65.1, 0, 0)
(0, 0, 0, 0, 70.2, 0, 0)
(0, 0, 0, 0, 74.9, 0, 0)
(0, 0, 0, 0, 80, 0, 0)
(0, 0, 0, 0, 85.1, 0, 0)
(0, 0, 0, 0, 90.2, 0, 0)
(0, 0, 0, 0, 94.9, 0, 0)
(0, 0, 0, 0, 98, 0, 0)
(0, 0, 0, 0, 100, 0, 0)
(0, 0, 0, 3.1, 0, 0, 3.1)
(0, 0, 0, 3.1, 0, 0, 40)
(0, 0, 0, 3.1, 0, 3.1, 0)
(0, 0, 0, 3.1, 0, 40, 0)
(0, 0, 0, 3.1, 3.1, 0, 0)
(0, 0, 0, 3.1, 40, 0, 0)
(0, 0, 0, 7.1, 0, 0, 7.1)
(0, 0, 0, 7.1, 0, 7.1, 0)
(0, 0, 0, 7.1, 7.1, 0, 0)
(0, 0, 0, 11.8, 0, 0, 49.4)
(0, 0, 0, 20, 0, 0, 10.2)
(0, 0, 0, 20, 0, 0, 20)
(0, 0, 0, 20, 0, 0, 40)
(0, 0, 0, 20, 0, 0, 70.2)
(0, 0, 0, 20, 0, 0, 100)
(0, 0, 0, 20, 0, 10.2, 0)
(0, 0, 0, 20, 0, 20, 0)
(0, 0, 0, 20, 0, 40, 0)
(0, 0, 0, 20, 0, 70.2, 0)
(0, 0, 0, 20, 0, 100, 0)
(0, 0, 0, 20, 10.2, 0, 0)
(0, 0, 0, 20, 20, 0, 0)
(0, 0, 0, 20, 40, 0, 0)
(0, 0, 0, 20, 70.2, 0, 0)
(0, 0, 0, 20, 100, 0, 0)
(0, 0, 0, 40, 0, 0, 3.1)
(0, 0, 0, 40, 0, 0, 20)
(0, 0, 0, 40, 0, 0, 40)
(0, 0, 0, 40, 0, 0, 70.2)
(0, 0, 0, 40, 0, 0, 100)
(0, 0, 0, 40, 0, 3.1, 0)
(0, 0, 0, 40, 0, 20, 0)
(0, 0, 0, 40, 0, 40, 0)
(0, 0, 0, 40, 0, 70.2, 0)
(0, 0, 0, 40, 0, 100, 0)
(0, 0, 0, 40, 3.1, 0, 0)
(0, 0, 0, 40, 20, 0, 0)
(0, 0, 0, 40, 40, 0, 0)
(0, 0, 0, 40, 70.2, 0, 0)
(0, 0, 0, 40, 100, 0, 0)
(0, 0, 0, 60, 0, 0, 20)
(0, 0, 0, 60, 0, 0, 40)
(0, 0, 0, 60, 0, 0, 70.2)
(0, 0, 0, 60, 0, 0, 100)
(0, 0, 0, 60, 0, 20, 0)
(0, 0, 0, 60, 0, 40, 0)
(0, 0, 0, 60, 0, 70.2, 0)
(0, 0, 0, 60, 0, 100, 0)
(0, 0, 0, 60, 20, 0, 0)
(0, 0, 0, 60, 40, 0, 0)
(0, 0, 0, 60, 70.2, 0, 0)
(0, 0, 0, 60, 100, 0, 0)

TABLE 3-continued (C, M, Y, K, O, G, B) Tint (0, 0, 0, 70.2, 0, 0, 100)
(0, 0, 0, 70.2, 0, 100, 0)
(0, 0, 0, 70.2, 100, 0, 0)
(0, 0, 0, 80, 0, 0, 40)
(0, 0, 0, 80, 0, 0, 70.2)
(0, 0, 0, 80, 0, 0, 100)
(0, 0, 0, 80, 0, 40, 0)
(0, 0, 0, 80, 0, 70.2, 0)
(0, 0, 0, 80, 0, 100, 0)
(0, 0, 0, 80, 40, 0, 0)
(0, 0, 0, 80, 70.2, 0, 0)
(0, 0, 0, 80, 100, 0, 0)
(0, 0, 0, 100, 0, 0, 40)
(0, 0, 0, 100, 0, 0, 100)
(0, 0, 0, 100, 0, 40, 0)
(0, 0, 0, 100, 0, 100, 0)
(0, 0, 0, 100, 40, 0, 0)
(0, 0, 0, 100, 100, 0, 0)
(0, 0, 2, 0, 0, 42.7, 0)
(0, 0, 3.1, 0, 0, 0, 3.1)
(0, 0, 3.1, 0, 0, 0, 40)
(0, 0, 3.1, 0, 3.1, 0, 0)
(0, 0, 3.1, 0, 40, 0, 0)
(0, 0, 3.1, 3.1, 0, 3.1, 0)
(0, 0, 3.1, 3.1, 0, 40, 0)
(0, 0, 3.1, 3.1, 3.1, 0, 0)
(0, 0, 3.1, 3.1, 40, 0, 0)
(0, 0, 3.1, 40, 0, 3.1, 0)
(0, 0, 3.1, 40, 0, 40, 0)
(0, 0, 3.1, 40, 3.1, 0, 0)
(0, 0, 3.1, 40, 40, 0, 0)
(0, 0, 5.5, 0, 0, 37.6, 0)
(0, 0, 7.1, 0, 0, 0, 7.1)
(0, 0, 7.1, 0, 0, 7.1, 0)
(0, 0, 7.1, 7.1, 0, 7.1, 0)
(0, 0, 7.1, 7.1, 7.1, 0, 0)
(0, 0, 9, 5.1, 36.5, 0, 0)
(0, 0, 10.2, 0, 0, 0, 10.2)
(0, 0, 10.2, 0, 0, 0, 20)
(0, 0, 10.2, 0, 0, 0, 30.2)
(0, 0, 10.2, 0, 0, 0, 40)
(0, 0, 10.2, 0, 0, 0, 54.9)
(0, 0, 10.2, 0, 0, 0, 70.2)
(0, 0, 10.2, 0, 0, 0, 85.1)
(0, 0, 10.2, 0, 0, 0, 100)
(0, 0, 10.2, 0, 0, 10.2, 0)
(0, 0, 10.2, 0, 20, 0, 0)
(0, 0, 10.2, 0, 30.2, 0, 0)
(0, 0, 10.2, 0, 40, 0, 0)
(0, 0, 10.2, 0, 54.9, 0, 0)
(0, 0, 10.2, 0, 70.2, 0, 0)
(0, 0, 10.2, 0, 85.1, 0, 0)
(0, 0, 10.2, 0, 100, 0, 0)
(0, 0, 10.2, 20, 0, 10.2, 0)
(0, 0, 10.2, 20, 0, 20, 0)
(0, 0, 10.2, 20, 0, 40, 0)
(0, 0, 10.2, 20, 0, 70.2, 0)
(0, 0, 10.2, 20, 0, 100, 0)
(0, 0, 10.2, 20, 10.2, 0, 0)
(0, 0, 10.2, 20, 20, 0, 0)
(0, 0, 10.2, 20, 40, 0, 0)
(0, 0, 10.2, 20, 70.2, 0, 0)
(0, 0, 10.2, 20, 100, 0, 0)
(0, 0, 14.1, 8.2, 43.5, 0, 0)
(0, 0, 15.7, 0, 0, 87.8, 0)
(0, 0, 15.7, 0, 62.7, 0, 0)
(0, 0, 18.8, 18, 0, 96.1, 0)
(0, 0, 20, 0, 0, 10.2, 0)
(0, 0, 20, 0, 0, 20, 0)
(0, 0, 20, 0, 0, 30.2, 0)
(0, 0, 20, 0, 0, 40, 0)
(0, 0, 20, 0, 0, 54.9, 0)
(0, 0, 20, 0, 0, 70.2, 0)
(0, 0, 20, 0, 0, 85.1, 0)
(0, 0, 20, 0, 0, 100, 0)
(0, 0, 20, 0, 10.2, 0, 0)
(0, 0, 20, 0, 20, 0, 0)
(0, 0, 20, 0, 30.2, 0, 0)

TABLE 3-continued

(C, M, Y, K, O, G, B) Tint (0, 0, 20, 0, 40, 0, 0)
(0, 0, 20, 0, 54.9, 0, 0)
(0, 0, 20, 0, 70.2, 0, 0)
(0, 0, 20, 0, 85.1, 0, 0)
(0, 0, 20, 0, 100, 0, 0)
(0, 0, 20, 20, 0, 10.2, 0)
(0, 0, 20, 20, 0, 20, 0)
(0, 0, 20, 20, 0, 40, 0)
(0, 0, 20, 20, 0, 70.2, 0)
(0, 0, 20, 20, 0, 100, 0)
(0, 0, 20, 20, 10.2, 0, 0)
(0, 0, 20, 20, 20, 0, 0)
(0, 0, 20, 20, 40, 0, 0)
(0, 0, 20, 20, 70.2, 0, 0)
(0, 0, 20, 20, 100, 0, 0)
(0, 0, 20, 40, 0, 20, 0)
(0, 0, 20, 40, 0, 40, 0)
(0, 0, 20, 40, 0, 70.2, 0)
(0, 0, 20, 40, 0, 100, 0)
(0, 0, 20, 40, 20, 0, 0)
(0, 0, 20, 40, 40, 0, 0)
(0, 0, 20, 40, 70.2, 0, 0)
(0, 0, 20, 40, 100, 0, 0)
(0, 0, 20, 60, 0, 20, 0)
(0, 0, 20, 60, 0, 40, 0)
(0, 0, 20, 60, 0, 70.2, 0)
(0, 0, 20, 60, 0, 100, 0)
(0, 0, 20, 60, 20, 0, 0)
(0, 0, 20, 60, 40, 0, 0)
(0, 0, 20, 60, 70.2, 0, 0)
(0, 0, 20, 60, 100, 0, 0)
(0, 0, 22, 5.1, 36.5, 0, 0)
(0, 0, 27.8, 0, 57.6, 0, 0)
(0, 0, 27.8, 11.8, 56.1, 0, 0)
(0, 0, 30.2, 0, 0, 10.2, 0)
(0, 0, 30.2, 0, 0, 20, 0)
(0, 0, 30.2, 0, 0, 30.2, 0)
(0, 0, 30.2, 0, 0, 40, 0)
(0, 0, 30.2, 0, 0, 54.9, 0)
(0, 0, 30.2, 0, 0, 70.2, 0)
(0, 0, 30.2, 0, 0, 85.1, 0)
(0, 0, 30.2, 0, 0, 100, 0)
(0, 0, 30.2, 0, 10.2, 0, 0)
(0, 0, 30.2, 0, 20, 0, 0)
(0, 0, 30.2, 0, 30.2, 0, 0)
(0, 0, 30.2, 0, 40, 0, 0)
(0, 0, 30.2, 0, 54.9, 0, 0)
(0, 0, 30.2, 0, 70.2, 0, 0)
(0, 0, 30.2, 0, 85.1, 0, 0)
(0, 0, 30.2, 0, 100, 0, 0)
(0, 0, 31, 5.1, 45.9, 0, 0)
(0, 0, 34.9, 5.1, 33.7, 0, 0)
(0, 0, 37.6, 8.2, 0, 35.3, 0)
(0, 0, 37.6, 8.2, 91.8, 0, 0)
(0, 0, 40, 0, 0, 0, 70.2)
(0, 0, 40, 0, 0, 0, 100)
(0, 0, 40, 0, 0, 3.1, 0)
(0, 0, 40, 0, 0, 10.2, 0)
(0, 0, 40, 0, 0, 20, 0)
(0, 0, 40, 0, 0, 30.2, 0)
(0, 0, 40, 0, 0, 40, 0)
(0, 0, 40, 0, 0, 54.9, 0)
(0, 0, 40, 0, 0, 70.2, 0)
(0, 0, 40, 0, 0, 85.1, 0)
(0, 0, 40, 0, 0, 100, 0)
(0, 0, 40, 0, 3.1, 0, 0)
(0, 0, 40, 0, 10.2, 0, 0)
(0, 0, 40, 0, 20, 0, 0)
(0, 0, 40, 0, 30.2, 0, 0)
(0, 0, 40, 0, 40, 0, 0)
(0, 0, 40, 0, 54.9, 0, 0)
(0, 0, 40, 0, 70.2, 0, 0)
(0, 0, 40, 0, 85.1, 0, 0)
(0, 0, 40, 0, 100, 0, 0)
(0, 0, 40, 3.1, 0, 3.1, 0)
(0, 0, 40, 3.1, 0, 40, 0)
(0, 0, 40, 3.1, 3.1, 0, 0)
(0, 0, 40, 3.1, 40, 0, 0)
(0, 0, 40, 20, 0, 10.2, 0)
(0, 0, 40, 20, 0, 20, 0)
(0, 0, 40, 20, 0, 40, 0)
(0, 0, 40, 20, 0, 70.2, 0)
(0, 0, 40, 20, 0, 100, 0)
(0, 0, 40, 20, 10.2, 0, 0)
(0, 0, 40, 20, 20, 0, 0)
(0, 0, 40, 20, 40, 0, 0)
(0, 0, 40, 20, 70.2, 0, 0)
(0, 0, 40, 20, 100, 0, 0)
(0, 0, 40, 40, 0, 3.1, 0)
(0, 0, 40, 40, 0, 20, 0)
(0, 0, 40, 40, 0, 40, 0)
(0, 0, 40, 40, 0, 70.2, 0)
(0, 0, 40, 40, 0, 100, 0)
(0, 0, 40, 40, 3.1, 0, 0)
(0, 0, 40, 40, 20, 0, 0)
(0, 0, 40, 40, 40, 0, 0)
(0, 0, 40, 40, 70.2, 0, 0)
(0, 0, 40, 40, 100, 0, 0)
(0, 0, 40, 60, 0, 20, 0)
(0, 0, 40, 60, 0, 40, 0)
(0, 0, 40, 60, 0, 70.2, 0)
(0, 0, 40, 60, 0, 100, 0)
(0, 0, 40, 60, 20, 0, 0)
(0, 0, 40, 60, 40, 0, 0)
(0, 0, 40, 60, 70.2, 0, 0)
(0, 0, 40, 60, 100, 0, 0)
(0, 0, 40, 80, 0, 0, 100)
(0, 0, 40, 80, 0, 40, 0)
(0, 0, 40, 80, 0, 70.2, 0)
(0, 0, 40, 80, 0, 100, 0)
(0, 0, 40, 80, 40, 0, 0)
(0, 0, 40, 80, 70.2, 0, 0)
(0, 0, 40, 80, 100, 0, 0)
(0, 0, 40, 100, 0, 40, 0)
(0, 0, 40, 100, 0, 100, 0)
(0, 0, 40, 100, 40, 0, 0)
(0, 0, 40, 100, 100, 0, 0)
(0, 0, 40.4, 5.1, 38.8, 0, 0)
(0, 0, 40.4, 8.2, 0, 37.6, 0)
(0, 0, 41.6, 0, 0, 14.1, 0)
(0, 0, 43.9, 8.2, 59.6, 0, 0)
(0, 0, 45.1, 0, 0, 17.3, 0)
(0, 0, 45.1, 0, 0, 37.6, 0)
(0, 0, 45.1, 0, 85.1, 0, 0)
(0, 0, 45.1, 0, 95.3, 0, 0)
(0, 0, 46.3, 0, 31.4, 0, 0)
(0, 0, 47.5, 0, 22.7, 0, 0)
(0, 0, 47.5, 5.1, 0, 26.7, 0)
(0, 0, 48.6, 0, 74.1, 0, 0)
(0, 0, 49.8, 18, 71.8, 0, 0)
(0, 0, 51, 0, 0, 3.5, 0)
(0, 0, 52.9, 0, 0, 54.5, 0)
(0, 0, 52.9, 8.2, 52.2, 0, 0)
(0, 0, 52.9, 14.9, 0, 60.4, 0)
(0, 0, 54.1, 0, 0, 23.5, 0)
(0, 0, 54.9, 0, 0, 10.2, 0)
(0, 0, 54.9, 0, 0, 20, 0)
(0, 0, 54.9, 0, 0, 30.2, 0)
(0, 0, 54.9, 0, 0, 40, 0)
(0, 0, 54.9, 0, 0, 54.9, 0)
(0, 0, 54.9, 0, 0, 70.2, 0)
(0, 0, 54.9, 0, 0, 85.1, 0)
(0, 0, 54.9, 0, 0, 100, 0)
(0, 0, 54.9, 0, 10.2, 0, 0)
(0, 0, 54.9, 0, 20, 0, 0)
(0, 0, 54.9, 0, 30.2, 0, 0)
(0, 0, 54.9, 0, 40, 0, 0)
(0, 0, 54.9, 0, 54.9, 0, 0)
(0, 0, 54.9, 0, 70.2, 0, 0)
(0, 0, 54.9, 0, 85.1, 0, 0)
(0, 0, 54.9, 0, 100, 0, 0)
(0, 0, 56.1, 0, 0, 52.2, 0)
(0, 0, 56.1, 5.1, 38.8, 0, 0)
(0, 0, 57.3, 0, 22.7, 0, 0)
(0, 0, 59.2, 8.2, 0, 37.6, 0)
(0, 0, 59.2, 18, 0, 72.5, 0)

TABLE 3-continued

(C, M, Y, K, O, G, B) Tint (0, 0, 60, 0, 0, 7.5, 0)
(0, 0, 61.2, 8.2, 64.3, 0, 0)
(0, 0, 62.7, 0, 31.4, 0, 0)
(0, 0, 62.7, 5.1, 45.9, 0, 0)
(0, 0, 64.7, 5.1, 38.8, 0, 0)
(0, 0, 67.1, 0, 38.8, 0, 0)
(0, 0, 70.2, 0, 0, 0, 40)
(0, 0, 70.2, 0, 0, 0, 70.2)
(0, 0, 70.2, 0, 0, 0, 100)
(0, 0, 70.2, 0, 0, 10.2, 0)
(0, 0, 70.2, 0, 0, 20, 0)
(0, 0, 70.2, 0, 0, 30.2, 0)
(0, 0, 70.2, 0, 0, 40, 0)
(0, 0, 70.2, 0, 0, 54.9, 0)
(0, 0, 70.2, 0, 0, 70.2, 0)
(0, 0, 70.2, 0, 0, 85.1, 0)
(0, 0, 70.2, 0, 0, 100, 0)
(0, 0, 70.2, 0, 10.2, 0, 0)
(0, 0, 70.2, 0, 20, 0, 0)
(0, 0, 70.2, 0, 30.2, 0, 0)
(0, 0, 70.2, 0, 40, 0, 0)
(0, 0, 70.2, 0, 54.9, 0, 0)
(0, 0, 70.2, 0, 70.2, 0, 0)
(0, 0, 70.2, 0, 85.1, 0, 0)
(0, 0, 70.2, 0, 100, 0, 0)
(0, 0, 70.2, 20, 0, 10.2, 0)
(0, 0, 70.2, 20, 0, 20, 0)
(0, 0, 70.2, 20, 0, 40, 0)
(0, 0, 70.2, 20, 0, 70.2, 0)
(0, 0, 70.2, 20, 0, 100, 0)
(0, 0, 70.2, 20, 10.2, 0, 0)
(0, 0, 70.2, 20, 20, 0, 0)
(0, 0, 70.2, 20, 40, 0, 0)
(0, 0, 70.2, 20, 70.2, 0, 0)
(0, 0, 70.2, 20, 100, 0, 0)
(0, 0, 70.2, 40, 0, 20, 0)
(0, 0, 70.2, 40, 0, 40, 0)
(0, 0, 70.2, 40, 0, 70.2, 0)
(0, 0, 70.2, 40, 0, 100, 0)
(0, 0, 70.2, 40, 20, 0, 0)
(0, 0, 70.2, 40, 40, 0, 0)
(0, 0, 70.2, 40, 70.2, 0, 0)
(0, 0, 70.2, 40, 100, 0, 0)
(0, 0, 70.2, 60, 0, 0, 100)
(0, 0, 70.2, 60, 0, 20, 0)
(0, 0, 70.2, 60, 0, 40, 0)
(0, 0, 70.2, 60, 0, 70.2, 0)
(0, 0, 70.2, 60, 0, 100, 0)
(0, 0, 70.2, 60, 20, 0, 0)
(0, 0, 70.2, 60, 40, 0, 0)
(0, 0, 70.2, 60, 70.2, 0, 0)
(0, 0, 70.2, 60, 100, 0, 0)
(0, 0, 70.2, 80, 0, 0, 70.2)
(0, 0, 70.2, 80, 0, 0, 100)
(0, 0, 70.2, 80, 0, 40, 0)
(0, 0, 70.2, 80, 0, 70.2, 0)
(0, 0, 70.2, 80, 0, 100, 0)
(0, 0, 70.2, 80, 40, 0, 0)
(0, 0, 70.2, 80, 70.2, 0, 0)
(0, 0, 70.2, 80, 100, 0, 0)
(0, 0, 70.6, 0, 0, 17.3, 0)
(0, 0, 72.2, 0, 0, 7.5, 0)
(0, 0, 72.2, 0, 0, 14.1, 0)
(0, 0, 72.2, 5.1, 50.2, 0, 0)
(0, 0, 74.1, 8.2, 62.7, 0, 0)
(0, 0, 74.1, 18, 0, 60.4, 0)
(0, 0, 74.9, 0, 0, 7.5, 0)
(0, 0, 77.3, 0, 0, 14.1, 0)
(0, 0, 77.6, 0, 0, 3.5, 0)
(0, 0, 77.6, 0, 0, 20.8, 0)
(0, 0, 77.6, 0, 0, 45.5, 0)
(0, 0, 82.4, 5.1, 0, 23.5, 0)
(0, 0, 85.1, 0, 0, 10.2, 0)
(0, 0, 85.1, 0, 0, 20, 0)
(0, 0, 85.1, 0, 0, 30.2, 0)
(0, 0, 85.1, 0, 0, 40, 0)
(0, 0, 85.1, 0, 0, 54.9, 0)
(0, 0, 85.1, 0, 0, 70.2, 0)
(0, 0, 85.1, 0, 0, 85.1, 0)
(0, 0, 85.1, 0, 0, 100, 0)
(0, 0, 85.1, 0, 10.2, 0, 0)
(0, 0, 85.1, 0, 20, 0, 0)
(0, 0, 85.1, 0, 30.2, 0, 0)
(0, 0, 85.1, 0, 40, 0, 0)
(0, 0, 85.1, 0, 54.9, 0, 0)
(0, 0, 85.1, 0, 70.2, 0, 0)
(0, 0, 85.1, 0, 85.1, 0, 0)
(0, 0, 85.1, 0, 100, 0, 0)
(0, 0, 86.7, 0, 0, 14.1, 0)
(0, 0, 89, 0, 0, 23.5, 0)
(0, 0, 91.4, 0, 0, 10.6, 0)
(0, 0, 100, 0, 0, 0, 40)
(0, 0, 100, 0, 0, 0, 70.2)
(0, 0, 100, 0, 0, 0, 100)
(0, 0, 100, 0, 0, 10.2, 0)
(0, 0, 100, 0, 0, 20, 0)
(0, 0, 100, 0, 0, 30.2, 0)
(0, 0, 100, 0, 0, 40, 0)
(0, 0, 100, 0, 0, 54.9, 0)
(0, 0, 100, 0, 0, 70.2, 0)
(0, 0, 100, 0, 0, 85.1, 0)
(0, 0, 100, 0, 0, 100, 0)
(0, 0, 100, 0, 10.2, 0, 0)
(0, 0, 100, 0, 20, 0, 0)
(0, 0, 100, 0, 30.2, 0, 0)
(0, 0, 100, 0, 40, 0, 0)
(0, 0, 100, 0, 54.9, 0, 0)
(0, 0, 100, 0, 70.2, 0, 0)
(0, 0, 100, 0, 85.1, 0, 0)
(0, 0, 100, 0, 100, 0, 0)
(0, 0, 100, 20, 0, 0, 100)
(0, 0, 100, 20, 0, 10.2, 0)
(0, 0, 100, 20, 0, 20, 0)
(0, 0, 100, 20, 0, 40, 0)
(0, 0, 100, 20, 0, 70.2, 0)
(0, 0, 100, 20, 0, 100, 0)
(0, 0, 100, 20, 10.2, 0, 0)
(0, 0, 100, 20, 20, 0, 0)
(0, 0, 100, 20, 40, 0, 0)
(0, 0, 100, 20, 70.2, 0, 0)
(0, 0, 100, 20, 100, 0, 0)
(0, 0, 100, 40, 0, 20, 0)
(0, 0, 100, 40, 0, 40, 0)
(0, 0, 100, 40, 0, 70.2, 0)
(0, 0, 100, 40, 0, 100, 0)
(0, 0, 100, 40, 20, 0, 0)
(0, 0, 100, 40, 40, 0, 0)
(0, 0, 100, 40, 70.2, 0, 0)
(0, 0, 100, 40, 100, 0, 0)
(0, 0, 100, 60, 0, 0, 70.2)
(0, 0, 100, 60, 0, 0, 100)
(0, 0, 100, 60, 0, 20, 0)
(0, 0, 100, 60, 0, 40, 0)
(0, 0, 100, 60, 0, 70.2, 0)
(0, 0, 100, 60, 0, 100, 0)
(0, 0, 100, 60, 20, 0, 0)
(0, 0, 100, 60, 40, 0, 0)
(0, 0, 100, 60, 70.2, 0, 0)
(0, 0, 100, 60, 100, 0, 0)
(0, 0, 100, 70.2, 0, 100, 0)
(0, 0, 100, 70.2, 100, 0, 0)
(0, 0, 100, 80, 0, 0, 40)
(0, 0, 100, 80, 0, 0, 70.2)
(0, 0, 100, 80, 0, 40, 0)
(0, 0, 100, 80, 0, 70.2, 0)
(0, 0, 100, 80, 0, 100, 0)
(0, 0, 100, 80, 40, 0, 0)
(0, 0, 100, 80, 70.2, 0, 0)
(0, 0, 100, 80, 100, 0, 0)
(0, 0, 100, 100, 0, 0, 100)
(0, 0, 100, 100, 0, 40, 0)
(0, 0, 100, 100, 0, 100, 0)
(0, 0, 100, 100, 40, 0, 0)
(0, 0, 100, 100, 100, 0, 0)
(0, 3.1, 0, 0, 0, 0, 3.1)
(0, 3.1, 0, 0, 0, 0, 40)

TABLE 3-continued (C, M, Y, K, O, G, B) Tint (0, 3.1, 0, 0, 3.1, 0, 0)
(0, 3.1, 0, 0, 40, 0, 0)
(0, 3.1, 0, 3.1, 0, 0, 3.1)
(0, 3.1, 0, 3.1, 0, 0, 40)
(0, 3.1, 0, 3.1, 3.1, 0, 0)
(0, 3.1, 0, 3.1, 40, 0, 0)
(0, 3.1, 0, 40, 0, 0, 3.1)
(0, 3.1, 0, 40, 0, 0, 40)
(0, 3.1, 0, 40, 3.1, 0, 0)
(0, 3.1, 0, 40, 40, 0, 0)
(0, 7.1, 0, 0, 0, 0, 7.1)
(0, 7.1, 0, 0, 7.1, 0, 0)
(0, 7.1, 0, 7.1, 0, 0, 7.1)
(0, 7.1, 0, 7.1, 7.1, 0, 0)
(0, 10.2, 0, 0, 0, 0, 10.2)
(0, 10.2, 0, 0, 0, 0, 20)
(0, 10.2, 0, 0, 0, 0, 30.2)
(0, 10.2, 0, 0, 0, 0, 40)
(0, 10.2, 0, 0, 0, 0, 54.9)
(0, 10.2, 0, 0, 0, 0, 70.2)
(0, 10.2, 0, 0, 0, 0, 85.1)
(0, 10.2, 0, 0, 0, 0, 100)
(0, 10.2, 0, 0, 10.2, 0, 0)
(0, 10.2, 0, 0, 20, 0, 0)
(0, 10.2, 0, 0, 30.2, 0, 0)
(0, 10.2, 0, 0, 40, 0, 0)
(0, 10.2, 0, 0, 54.9, 0, 0)
(0, 10.2, 0, 0, 70.2, 0, 0)
(0, 10.2, 0, 0, 85.1, 0, 0)
(0, 10.2, 0, 0, 100, 0, 0)
(0, 10.2, 0, 20, 0, 0, 10.2)
(0, 10.2, 0, 20, 0, 0, 20)
(0, 10.2, 0, 20, 0, 0, 40)
(0, 10.2, 0, 20, 0, 0, 70.2)
(0, 10.2, 0, 20, 0, 0, 100)
(0, 10.2, 0, 20, 10.2, 0, 0)
(0, 10.2, 0, 20, 20, 0, 0)
(0, 10.2, 0, 20, 40, 0, 0)
(0, 10.2, 0, 20, 70.2, 0, 0)
(0, 10.2, 0, 20, 100, 0, 0)
(0, 10.2, 10.2, 0, 100, 0, 0)
(0, 10.2, 10.2, 20, 100, 0, 0)
(0, 10.2, 20, 0, 100, 0, 0)
(0, 10.2, 20, 20, 100, 0, 0)
(0, 10.2, 30.2, 0, 100, 0, 0)
(0, 10.2, 40, 0, 100, 0, 0)
(0, 10.2, 40, 20, 100, 0, 0)
(0, 10.2, 54.9, 0, 100, 0, 0)
(0, 10.2, 70.2, 0, 100, 0, 0)
(0, 10.2, 70.2, 20, 100, 0, 0)
(0, 10.2, 85.1, 0, 100, 0, 0)
(0, 10.2, 100, 0, 100, 0, 0)
(0, 10.2, 100, 20, 100, 0, 0)
(0, 13.7, 0, 0, 38.8, 0, 0)
(0, 13.7, 0, 5.1, 57.6, 0, 0)
(0, 13.7, 0, 8.2, 82, 0, 0)
(0, 13.7, 0, 11.8, 0, 0, 68.2)
(0, 16.9, 0, 0, 7.1, 0, 0)
(0, 16.9, 0, 67.8, 0, 0, 98.8)
(0, 20, 0, 0, 0, 0, 10.2)
(0, 20, 0, 0, 0, 0, 19.2)
(0, 20, 0, 0, 0, 0, 20)
(0, 20, 0, 0, 0, 0, 30.2)
(0, 20, 0, 0, 0, 0, 40)
(0, 20, 0, 0, 0, 0, 42.7)
(0, 20, 0, 0, 0, 0, 54.9)
(0, 20, 0, 0, 0, 0, 70.2)
(0, 20, 0, 0, 0, 0, 85.1)
(0, 20, 0, 0, 0, 0, 100)
(0, 20, 0, 0, 10.2, 0, 0)
(0, 20, 0, 0, 20, 0, 0)
(0, 20, 0, 0, 30.2, 0, 0)
(0, 20, 0, 0, 36.5, 0, 0)
(0, 20, 0, 0, 40, 0, 0)
(0, 20, 0, 0, 54.9, 0, 0)
(0, 20, 0, 0, 70.2, 0, 0)
(0, 20, 0, 0, 85.1, 0, 0)
(0, 20, 0, 0, 100, 0, 0)

TABLE 3-continued (C, M, Y, K, O, G, B) Tint (0, 20, 0, 20, 0, 0, 10.2)
(0, 20, 0, 20, 0, 0, 20)
(0, 20, 0, 20, 0, 0, 40)
(0, 20, 0, 20, 0, 0, 70.2)
(0, 20, 0, 20, 0, 0, 100)
(0, 20, 0, 20, 10.2, 0, 0)
(0, 20, 0, 20, 20, 0, 0)
(0, 20, 0, 20, 40, 0, 0)
(0, 20, 0, 20, 70.2, 0, 0)
(0, 20, 0, 20, 100, 0, 0)
(0, 20, 0, 40, 0, 0, 20)
(0, 20, 0, 40, 0, 0, 40)
(0, 20, 0, 40, 0, 0, 70.2)
(0, 20, 0, 40, 0, 0, 100)
(0, 20, 0, 40, 20, 0, 0)
(0, 20, 0, 40, 40, 0, 0)
(0, 20, 0, 40, 70.2, 0, 0)
(0, 20, 0, 40, 100, 0, 0)
(0, 20, 0, 60, 0, 0, 20)
(0, 20, 0, 60, 0, 0, 40)
(0, 20, 0, 60, 0, 0, 70.2)
(0, 20, 0, 60, 0, 0, 100)
(0, 20, 0, 60, 20, 0, 0)
(0, 20, 0, 60, 40, 0, 0)
(0, 20, 0, 60, 70.2, 0, 0)
(0, 20, 0, 60, 100, 0, 0)
(0, 20, 10.2, 0, 100, 0, 0)
(0, 20, 10.2, 20, 100, 0, 0)
(0, 20, 20, 0, 100, 0, 0)
(0, 20, 20, 20, 100, 0, 0)
(0, 20, 20, 40, 100, 0, 0)
(0, 20, 20, 60, 100, 0, 0)
(0, 20, 30.2, 0, 100, 0, 0)
(0, 20, 40, 0, 100, 0, 0)
(0, 20, 40, 20, 100, 0, 0)
(0, 20, 40, 40, 100, 0, 0)
(0, 20, 40, 60, 100, 0, 0)
(0, 20, 54.9, 0, 100, 0, 0)
(0, 20, 70.2, 0, 100, 0, 0)
(0, 20, 70.2, 20, 100, 0, 0)
(0, 20, 70.2, 40, 100, 0, 0)
(0, 20, 70.2, 60, 100, 0, 0)
(0, 20, 85.1, 0, 100, 0, 0)
(0, 20, 100, 0, 100, 0, 0)
(0, 20, 100, 20, 100, 0, 0)
(0, 20, 100, 40, 100, 0, 0)
(0, 20, 100, 60, 100, 0, 0)
(0, 22.7, 0, 0, 13.7, 0, 0)
(0, 22.7, 0, 0, 61.2, 0, 0)
(0, 22.7, 0, 5.1, 0, 0, 55.3)
(0, 22.7, 0, 5.1, 78.8, 0, 0)
(0, 22.7, 0, 21.2, 0, 0, 92.5)
(0, 25.9, 0, 0, 0, 0, 25.1)
(0, 25.9, 0, 0, 0, 0, 40.4)
(0, 25.9, 0, 0, 89.4, 0, 0)
(0, 28.6, 0, 0, 0, 0, 9.8)
(0, 28.6, 0, 0, 0, 0, 19.2)
(0, 28.6, 0, 0, 97.3, 0, 0)
(0, 30.2, 0, 0, 0, 0, 10.2)
(0, 30.2, 0, 0, 0, 0, 20)
(0, 30.2, 0, 0, 0, 0, 30.2)
(0, 30.2, 0, 0, 0, 0, 40)
(0, 30.2, 0, 0, 0, 0, 54.9)
(0, 30.2, 0, 0, 0, 0, 70.2)
(0, 30.2, 0, 0, 0, 0, 85.1)
(0, 30.2, 0, 0, 0, 0, 100)
(0, 30.2, 0, 0, 10.2, 0, 0)
(0, 30.2, 0, 0, 20, 0, 0)
(0, 30.2, 0, 0, 30.2, 0, 0)
(0, 30.2, 0, 0, 40, 0, 0)
(0, 30.2, 0, 0, 54.9, 0, 0)
(0, 30.2, 0, 0, 70.2, 0, 0)
(0, 30.2, 0, 0, 85.1, 0, 0)
(0, 30.2, 0, 0, 100, 0, 0)
(0, 30.2, 10.2, 0, 100, 0, 0)
(0, 30.2, 20, 0, 100, 0, 0)
(0, 30.2, 30.2, 0, 100, 0, 0)
(0, 30.2, 40, 0, 100, 0, 0)

TABLE 3-continued (C, M, Y, K, O, G, B) Tint (0, 30.2, 54.9, 0, 100, 0, 0)
(0, 30.2, 70.2, 0, 100, 0, 0)
(0, 30.2, 85.1, 0, 100, 0, 0)
(0, 30.2, 100, 0, 100, 0, 0)
(0, 31.4, 0, 0, 10.6, 0, 0)
(0, 31.4, 0, 0, 16.9, 0, 0)
(0, 31.4, 0, 0, 33.7, 0, 0)
(0, 31.4, 0, 0, 47.8, 0, 0)
(0, 31.4, 0, 0, 61.2, 0, 0)
(0, 34.1, 0, 0, 0, 0, 27.8)
(0, 34.1, 0, 0, 20, 0, 0)
(0, 34.1, 0, 0, 22.7, 0, 0)
(0, 34.1, 0, 0, 64.3, 0, 0)
(0, 36.5, 0, 0, 0, 0, 22)
(0, 36.5, 0, 0, 90.6, 0, 0)
(0, 38.8, 0, 0, 0, 0, 38)
(0, 38.8, 0, 0, 0, 0, 53.3)
(0, 38.8, 0, 0, 22.7, 0, 0)
(0, 38.8, 0, 5.1, 0, 0, 27.8)
(0, 38.8, 0, 29.4, 0, 0, 100)
(0, 40, 0, 0, 0, 0, 3.1)
(0, 40, 0, 0, 0, 0, 10.2)
(0, 40, 0, 0, 0, 0, 20)
(0, 40, 0, 0, 0, 0, 30.2)
(0, 40, 0, 0, 0, 0, 40)
(0, 40, 0, 0, 0, 0, 54.9)
(0, 40, 0, 0, 0, 0, 70.2)
(0, 40, 0, 0, 0, 0, 85.1)
(0, 40, 0, 0, 0, 0, 100)
(0, 40, 0, 0, 0, 70.2, 0)
(0, 40, 0, 0, 0, 100, 0)
(0, 40, 0, 0, 3.1, 0, 0)
(0, 40, 0, 0, 10.2, 0, 0)
(0, 40, 0, 0, 20, 0, 0)
(0, 40, 0, 0, 30.2, 0, 0)
(0, 40, 0, 0, 40, 0, 0)
(0, 40, 0, 0, 54.9, 0, 0)
(0, 40, 0, 0, 70.2, 0, 0)
(0, 40, 0, 0, 85.1, 0, 0)
(0, 40, 0, 0, 100, 0, 0)
(0, 40, 0, 3.1, 0, 0, 3.1)
(0, 40, 0, 3.1, 0, 0, 40)
(0, 40, 0, 3.1, 3.1, 0, 0)
(0, 40, 0, 3.1, 40, 0, 0)
(0, 40, 0, 20, 0, 0, 10.2)
(0, 40, 0, 20, 0, 0, 20)
(0, 40, 0, 20, 0, 0, 40)
(0, 40, 0, 20, 0, 0, 70.2)
(0, 40, 0, 20, 0, 0, 100)
(0, 40, 0, 20, 10.2, 0, 0)
(0, 40, 0, 20, 20, 0, 0)
(0, 40, 0, 20, 40, 0, 0)
(0, 40, 0, 20, 70.2, 0, 0)
(0, 40, 0, 20, 100, 0, 0)
(0, 40, 0, 40, 0, 0, 3.1)
(0, 40, 0, 40, 0, 0, 20)
(0, 40, 0, 40, 0, 0, 40)
(0, 40, 0, 40, 0, 0, 70.2)
(0, 40, 0, 40, 0, 0, 100)
(0, 40, 0, 40, 3.1, 0, 0)
(0, 40, 0, 40, 20, 0, 0)
(0, 40, 0, 40, 40, 0, 0)
(0, 40, 0, 40, 70.2, 0, 0)
(0, 40, 0, 40, 100, 0, 0)
(0, 40, 0, 60, 0, 0, 20)
(0, 40, 0, 60, 0, 0, 40)
(0, 40, 0, 60, 0, 0, 70.2)
(0, 40, 0, 60, 0, 0, 100)
(0, 40, 0, 60, 20, 0, 0)
(0, 40, 0, 60, 40, 0, 0)
(0, 40, 0, 60, 70.2, 0, 0)
(0, 40, 0, 60, 100, 0, 0)
(0, 40, 0, 80, 0, 0, 40)
(0, 40, 0, 80, 0, 0, 70.2)
(0, 40, 0, 80, 0, 0, 100)
(0, 40, 0, 80, 0, 100, 0)
(0, 40, 0, 80, 40, 0, 0)
(0, 40, 0, 80, 70.2, 0, 0)

TABLE 3-continued (C, M, Y, K, O, G, B) Tint (0, 40, 0, 80, 100, 0, 0)
(0, 40, 0, 100, 0, 0, 40)
(0, 40, 0, 100, 0, 0, 100)
(0, 40, 0, 100, 40, 0, 0)
(0, 40, 0, 100, 100, 0, 0)
(0, 40, 10.2, 0, 100, 0, 0)
(0, 40, 10.2, 20, 100, 0, 0)
(0, 40, 20, 0, 100, 0, 0)
(0, 40, 20, 20, 100, 0, 0)
(0, 40, 20, 40, 100, 0, 0)
(0, 40, 20, 60, 100, 0, 0)
(0, 40, 30.2, 0, 100, 0, 0)
(0, 40, 40, 0, 100, 0, 0)
(0, 40, 40, 20, 100, 0, 0)
(0, 40, 40, 40, 100, 0, 0)
(0, 40, 40, 60, 100, 0, 0)
(0, 40, 40, 80, 100, 0, 0)
(0, 40, 40, 100, 100, 0, 0)
(0, 40, 54.9, 0, 100, 0, 0)
(0, 40, 70.2, 0, 100, 0, 0)
(0, 40, 70.2, 20, 100, 0, 0)
(0, 40, 70.2, 40, 100, 0, 0)
(0, 40, 70.2, 60, 100, 0, 0)
(0, 40, 70.2, 80, 100, 0, 0)
(0, 40, 85.1, 0, 100, 0, 0)
(0, 40, 100, 0, 0, 0, 100)
(0, 40, 100, 0, 0, 100, 0)
(0, 40, 100, 0, 100, 0, 0)
(0, 40, 100, 20, 100, 0, 0)
(0, 40, 100, 40, 100, 0, 0)
(0, 40, 100, 60, 100, 0, 0)
(0, 40, 100, 80, 100, 0, 0)
(0, 40, 100, 100, 100, 0, 0)
(0, 41.2, 0, 0, 0, 0, 25.1)
(0, 41.2, 0, 0, 16.9, 0, 0)
(0, 41.2, 0, 63.1, 0, 0, 98.8)
(0, 43.5, 0, 0, 0, 0, 16.1)
(0, 43.5, 0, 0, 56.1, 0, 0)
(0, 43.5, 0, 0, 84.3, 0, 0)
(0, 45.9, 0, 0, 0, 0, 19.2)
(0, 48.2, 0, 0, 16.9, 0, 0)
(0, 48.2, 0, 0, 25.9, 0, 0)
(0, 48.2, 0, 14.9, 0, 0, 82.7)
(0, 50.2, 0, 0, 0, 0, 27.8)
(0, 50.2, 0, 0, 31.4, 0, 0)
(0, 52.2, 0, 0, 0, 0, 53.3)
(0, 52.2, 0, 0, 0, 0, 69.4)
(0, 52.2, 0, 0, 43.5, 0, 0)
(0, 54.1, 0, 0, 82, 0, 0)
(0, 54.9, 0, 0, 0, 0, 10.2)
(0, 54.9, 0, 0, 0, 0, 20)
(0, 54.9, 0, 0, 0, 0, 30.2)
(0, 54.9, 0, 0, 0, 0, 40)
(0, 54.9, 0, 0, 0, 0, 54.9)
(0, 54.9, 0, 0, 0, 0, 70.2)
(0, 54.9, 0, 0, 0, 0, 85.1)
(0, 54.9, 0, 0, 0, 0, 100)
(0, 54.9, 0, 0, 10.2, 0, 0)
(0, 54.9, 0, 0, 20, 0, 0)
(0, 54.9, 0, 0, 30.2, 0, 0)
(0, 54.9, 0, 0, 40, 0, 0)
(0, 54.9, 0, 0, 54.9, 0, 0)
(0, 54.9, 0, 0, 70.2, 0, 0)
(0, 54.9, 0, 0, 85.1, 0, 0)
(0, 54.9, 0, 0, 100, 0, 0)
(0, 54.9, 10.2, 0, 100, 0, 0)
(0, 54.9, 20, 0, 100, 0, 0)
(0, 54.9, 30.2, 0, 100, 0, 0)
(0, 54.9, 40, 0, 100, 0, 0)
(0, 54.9, 54.9, 0, 100, 0, 0)
(0, 54.9, 70.2, 0, 100, 0, 0)
(0, 54.9, 85.1, 0, 100, 0, 0)
(0, 54.9, 100, 0, 100, 0, 0)
(0, 56.1, 0, 0, 0, 0, 9.8)
(0, 56.1, 0, 0, 0, 0, 38)
(0, 56.1, 0, 0, 93.7, 0, 0)
(0, 56.1, 0, 5.1, 0, 0, 42.7)
(0, 56.1, 0, 42, 0, 0, 99.6)

TABLE 3-continued

| (C, M, Y, K, O, G, B) Tint |
|---|
| (0, 59.6, 0, 0, 0, 0, 19.2) |
| (0, 61.6, 0, 0, 0, 0, 19.2) |
| (0, 61.6, 0, 0, 0, 0, 56.9) |
| (0, 61.6, 0, 0, 0, 31.4, 0, 0) |
| (0, 61.6, 0, 0, 0, 91.4, 0, 0) |
| (0, 63.1, 0, 0, 0, 0, 65.1) |
| (0, 63.1, 0, 0, 0, 67.5, 0, 0) |
| (0, 64.7, 0, 0, 0, 0, 65.1) |
| (0, 67.8, 0, 0, 0, 0, 30.6) |
| (0, 67.8, 0, 0, 0, 0, 49.4) |
| (0, 67.8, 0, 23.9, 0, 0, 96.5) |
| (0, 69, 0, 0, 36.5, 0, 0) |
| (0, 69, 0, 0, 54.1, 0, 0) |
| (0, 69, 0, 0, 84.3, 0, 0) |
| (0, 70.2, 0, 0, 0, 0, 10.2) |
| (0, 70.2, 0, 0, 0, 0, 20) |
| (0, 70.2, 0, 0, 0, 0, 30.2) |
| (0, 70.2, 0, 0, 0, 0, 40) |
| (0, 70.2, 0, 0, 0, 0, 54.9) |
| (0, 70.2, 0, 0, 0, 0, 70.2) |
| (0, 70.2, 0, 0, 0, 0, 85.1) |
| (0, 70.2, 0, 0, 0, 0, 100) |
| (0, 70.2, 0, 0, 0, 40, 0) |
| (0, 70.2, 0, 0, 0, 70.2, 0) |
| (0, 70.2, 0, 0, 0, 100, 0) |
| (0, 70.2, 0, 0, 10.2, 0, 0) |
| (0, 70.2, 0, 0, 20, 0, 0) |
| (0, 70.2, 0, 0, 30.2, 0, 0) |
| (0, 70.2, 0, 0, 40, 0, 0) |
| (0, 70.2, 0, 0, 54.9, 0, 0) |
| (0, 70.2, 0, 0, 70.2, 0, 0) |
| (0, 70.2, 0, 0, 85.1, 0, 0) |
| (0, 70.2, 0, 0, 100, 0, 0) |
| (0, 70.2, 0, 20, 0, 0, 10.2) |
| (0, 70.2, 0, 20, 0, 0, 20) |
| (0, 70.2, 0, 20, 0, 0, 40) |
| (0, 70.2, 0, 20, 0, 0, 70.2) |
| (0, 70.2, 0, 20, 0, 0, 100) |
| (0, 70.2, 0, 20, 10.2, 0, 0) |
| (0, 70.2, 0, 20, 20, 0, 0) |
| (0, 70.2, 0, 20, 40, 0, 0) |
| (0, 70.2, 0, 20, 70.2, 0, 0) |
| (0, 70.2, 0, 20, 100, 0, 0) |
| (0, 70.2, 0, 40, 0, 0, 20) |
| (0, 70.2, 0, 40, 0, 0, 40) |
| (0, 70.2, 0, 40, 0, 0, 70.2) |
| (0, 70.2, 0, 40, 0, 0, 100) |
| (0, 70.2, 0, 40, 20, 0, 0) |
| (0, 70.2, 0, 40, 40, 0, 0) |
| (0, 70.2, 0, 40, 70.2, 0, 0) |
| (0, 70.2, 0, 40, 100, 0, 0) |
| (0, 70.2, 0, 60, 0, 0, 20) |
| (0, 70.2, 0, 60, 0, 0, 40) |
| (0, 70.2, 0, 60, 0, 0, 70.2) |
| (0, 70.2, 0, 60, 0, 0, 100) |
| (0, 70.2, 0, 60, 0, 100, 0) |
| (0, 70.2, 0, 60, 20, 0, 0) |
| (0, 70.2, 0, 60, 40, 0, 0) |
| (0, 70.2, 0, 60, 70.2, 0, 0) |
| (0, 70.2, 0, 60, 100, 0, 0) |
| (0, 70.2, 0, 80, 0, 0, 40) |
| (0, 70.2, 0, 80, 0, 0, 70.2) |
| (0, 70.2, 0, 80, 0, 0, 100) |
| (0, 70.2, 0, 80, 0, 70.2, 0) |
| (0, 70.2, 0, 80, 0, 100, 0) |
| (0, 70.2, 0, 80, 40, 0, 0) |
| (0, 70.2, 0, 80, 70.2, 0, 0) |
| (0, 70.2, 0, 80, 100, 0, 0) |
| (0, 70.2, 10.2, 0, 100, 0, 0) |
| (0, 70.2, 10.2, 20, 100, 0, 0) |
| (0, 70.2, 20, 0, 100, 0, 0) |
| (0, 70.2, 20, 20, 100, 0, 0) |
| (0, 70.2, 20, 40, 100, 0, 0) |
| (0, 70.2, 20, 60, 100, 0, 0) |
| (0, 70.2, 30.2, 0, 100, 0, 0) |
| (0, 70.2, 40, 0, 100, 0, 0) |
| (0, 70.2, 40, 20, 100, 0, 0) |
| (0, 70.2, 40, 40, 100, 0, 0) |
| (0, 70.2, 40, 60, 100, 0, 0) |
| (0, 70.2, 40, 80, 100, 0, 0) |
| (0, 70.2, 54.9, 0, 100, 0, 0) |
| (0, 70.2, 70.2, 0, 0, 0, 100) |
| (0, 70.2, 70.2, 0, 0, 100, 0) |
| (0, 70.2, 70.2, 0, 100, 0, 0) |
| (0, 70.2, 70.2, 20, 100, 0, 0) |
| (0, 70.2, 70.2, 40, 100, 0, 0) |
| (0, 70.2, 70.2, 60, 100, 0, 0) |
| (0, 70.2, 70.2, 80, 100, 0, 0) |
| (0, 70.2, 85.1, 0, 100, 0, 0) |
| (0, 70.2, 100, 0, 0, 0, 70.2) |
| (0, 70.2, 100, 0, 0, 0, 100) |
| (0, 70.2, 100, 0, 0, 70.2, 0) |
| (0, 70.2, 100, 0, 0, 100, 0) |
| (0, 70.2, 100, 0, 70.2, 0, 0) |
| (0, 70.2, 100, 0, 100, 0, 0) |
| (0, 70.2, 100, 20, 100, 0, 0) |
| (0, 70.2, 100, 40, 100, 0, 0) |
| (0, 70.2, 100, 60, 100, 0, 0) |
| (0, 70.2, 100, 80, 0, 0, 100) |
| (0, 70.2, 100, 80, 0, 100, 0) |
| (0, 70.2, 100, 80, 100, 0, 0) |
| (0, 73.3, 0, 0, 0, 0, 45.1) |
| (0, 74.5, 0, 0, 0, 0, 16.1) |
| (0, 74.5, 0, 0, 54.1, 0, 0) |
| (0, 74.5, 0, 18, 0, 0, 60.4) |
| (0, 75.7, 0, 0, 0, 0, 71) |
| (0, 79.2, 0, 0, 41.2, 0, 0) |
| (0, 80, 0, 0, 71.8, 0, 0) |
| (0, 81.2, 0, 0, 0, 0, 58.8) |
| (0, 82, 0, 0, 0, 0, 40.4) |
| (0, 82, 0, 0, 52.2, 0, 0) |
| (0, 82, 0, 14.9, 0, 0, 63.9) |
| (0, 82, 0, 23.9, 0, 0, 78) |
| (0, 83.1, 0, 0, 0, 0, 25.1) |
| (0, 83.1, 0, 0, 80, 0, 0) |
| (0, 83.1, 0, 29.4, 0, 0, 95.3) |
| (0, 83.9, 0, 0, 0, 0, 55.3) |
| (0, 85.1, 0, 0, 0, 0, 10.2) |
| (0, 85.1, 0, 0, 0, 0, 20) |
| (0, 85.1, 0, 0, 0, 0, 30.2) |
| (0, 85.1, 0, 0, 0, 0, 40) |
| (0, 85.1, 0, 0, 0, 0, 54.9) |
| (0, 85.1, 0, 0, 0, 0, 70.2) |
| (0, 85.1, 0, 0, 0, 0, 85.1) |
| (0, 85.1, 0, 0, 0, 0, 100) |
| (0, 85.1, 0, 0, 10.2, 0, 0) |
| (0, 85.1, 0, 0, 20, 0, 0) |
| (0, 85.1, 0, 0, 30.2, 0, 0) |
| (0, 85.1, 0, 0, 40, 0, 0) |
| (0, 85.1, 0, 0, 54.9, 0, 0) |
| (0, 85.1, 0, 0, 70.2, 0, 0) |
| (0, 85.1, 0, 0, 85.1, 0, 0) |
| (0, 85.1, 0, 0, 100, 0, 0) |
| (0, 85.1, 10.2, 0, 100, 0, 0) |
| (0, 85.1, 20, 0, 100, 0, 0) |
| (0, 85.1, 30.2, 0, 100, 0, 0) |
| (0, 85.1, 40, 0, 100, 0, 0) |
| (0, 85.1, 54.9, 0, 100, 0, 0) |
| (0, 85.1, 70.2, 0, 100, 0, 0) |
| (0, 85.1, 85.1, 0, 100, 0, 0) |
| (0, 85.1, 100, 0, 100, 0, 0) |
| (0, 86.3, 0, 0, 0, 0, 33.3) |
| (0, 87.8, 0, 0, 0, 0, 45.1) |
| (0, 88.6, 0, 14.9, 0, 0, 89.8) |
| (0, 91.8, 0, 0, 0, 0, 38) |
| (0, 91.8, 0, 5.1, 0, 0, 63.9) |
| (0, 92.5, 0, 0, 0, 0, 30.6) |
| (0, 93.7, 0, 0, 75.3, 0, 0) |
| (0, 93.7, 0, 0, 86.7, 0, 0) |
| (0, 96.1, 0, 0, 0, 0, 40.4) |
| (0, 96.1, 0, 0, 70.2, 0, 0) |
| (0, 100, 0, 0, 0, 0, 10.2) |
| (0, 100, 0, 0, 0, 0, 20) |
| (0, 100, 0, 0, 0, 0, 30.2) |
| (0, 100, 0, 0, 0, 0, 40) |
| (0, 100, 0, 0, 0, 0, 54.9) |

TABLE 3-continued (C, M, Y, K, O, G, B) Tint (0, 100, 0, 0, 0, 0, 70.2)
(0, 100, 0, 0, 0, 0, 85.1)
(0, 100, 0, 0, 0, 0, 100)
(0, 100, 0, 0, 0, 40, 0)
(0, 100, 0, 0, 0, 70.2, 0)
(0, 100, 0, 0, 0, 100, 0)
(0, 100, 0, 0, 10.2, 0, 0)
(0, 100, 0, 0, 20, 0, 0)
(0, 100, 0, 0, 30.2, 0, 0)
(0, 100, 0, 0, 40, 0, 0)
(0, 100, 0, 0, 54.9, 0, 0)
(0, 100, 0, 0, 70.2, 0, 0)
(0, 100, 0, 0, 85.1, 0, 0)
(0, 100, 0, 0, 100, 0, 0)
(0, 100, 0, 20, 0, 0, 10.2)
(0, 100, 0, 20, 0, 0, 20)
(0, 100, 0, 20, 0, 0, 40)
(0, 100, 0, 20, 0, 0, 70.2)
(0, 100, 0, 20, 0, 0, 100)
(0, 100, 0, 20, 0, 100, 0)
(0, 100, 0, 20, 10.2, 0, 0)
(0, 100, 0, 20, 20, 0, 0)
(0, 100, 0, 20, 40, 0, 0)
(0, 100, 0, 20, 70.2, 0, 0)
(0, 100, 0, 20, 100, 0, 0)
(0, 100, 0, 40, 0, 0, 20)
(0, 100, 0, 40, 0, 0, 40)
(0, 100, 0, 40, 0, 0, 70.2)
(0, 100, 0, 40, 0, 0, 100)
(0, 100, 0, 40, 20, 0, 0)
(0, 100, 0, 40, 40, 0, 0)
(0, 100, 0, 40, 70.2, 0, 0)
(0, 100, 0, 40, 100, 0, 0)
(0, 100, 0, 60, 0, 0, 20)
(0, 100, 0, 60, 0, 0, 40)
(0, 100, 0, 60, 0, 0, 70.2)
(0, 100, 0, 60, 0, 0, 100)
(0, 100, 0, 60, 0, 70.2, 0)
(0, 100, 0, 60, 0, 100, 0)
(0, 100, 0, 60, 20, 0, 0)
(0, 100, 0, 60, 40, 0, 0)
(0, 100, 0, 60, 70.2, 0, 0)
(0, 100, 0, 60, 100, 0, 0)
(0, 100, 0, 70.2, 0, 0, 100)
(0, 100, 0, 70.2, 100, 0, 0)
(0, 100, 0, 80, 0, 0, 40)
(0, 100, 0, 80, 0, 0, 70.2)
(0, 100, 0, 80, 0, 0, 100)
(0, 100, 0, 80, 0, 40, 0)
(0, 100, 0, 80, 0, 70.2, 0)
(0, 100, 0, 80, 40, 0, 0)
(0, 100, 0, 80, 70.2, 0, 0)
(0, 100, 0, 80, 100, 0, 0)
(0, 100, 0, 100, 0, 0, 40)
(0, 100, 0, 100, 0, 0, 100)
(0, 100, 0, 100, 0, 100, 0)
(0, 100, 0, 100, 40, 0, 0)
(0, 100, 0, 100, 100, 0, 0)
(0, 100, 10.2, 0, 100, 0, 0)
(0, 100, 10.2, 20, 100, 0, 0)
(0, 100, 20, 0, 100, 0, 0)
(0, 100, 20, 20, 100, 0, 0)
(0, 100, 20, 40, 100, 0, 0)
(0, 100, 20, 60, 100, 0, 0)
(0, 100, 30.2, 0, 100, 0, 0)
(0, 100, 40, 0, 0, 0, 100)
(0, 100, 40, 0, 0, 100, 0)
(0, 100, 40, 0, 100, 0, 0)
(0, 100, 40, 20, 100, 0, 0)
(0, 100, 40, 40, 100, 0, 0)
(0, 100, 40, 60, 100, 0, 0)
(0, 100, 40, 80, 100, 0, 0)
(0, 100, 40, 100, 100, 0, 0)
(0, 100, 54.9, 0, 100, 0, 0)
(0, 100, 70.2, 0, 0, 0, 70.2)
(0, 100, 70.2, 0, 0, 0, 100)
(0, 100, 70.2, 0, 0, 70.2, 0)
(0, 100, 70.2, 0, 0, 100, 0)

TABLE 3-continued (C, M, Y, K, O, G, B) Tint (0, 100, 70.2, 0, 70.2, 0, 0)
(0, 100, 70.2, 0, 100, 0, 0)
(0, 100, 70.2, 20, 100, 0, 0)
(0, 100, 70.2, 40, 100, 0, 0)
(0, 100, 70.2, 60, 100, 0, 0)
(0, 100, 70.2, 80, 0, 0, 100)
(0, 100, 70.2, 80, 0, 100, 0)
(0, 100, 70.2, 80, 100, 0, 0)
(0, 100, 85.1, 0, 100, 0, 0)
(0, 100, 100, 0, 0, 0, 40)
(0, 100, 100, 0, 0, 0, 70.2)
(0, 100, 100, 0, 0, 0, 100)
(0, 100, 100, 0, 0, 40, 0)
(0, 100, 100, 0, 0, 70.2, 0)
(0, 100, 100, 0, 0, 100, 0)
(0, 100, 100, 0, 40, 0, 0)
(0, 100, 100, 0, 70.2, 0, 0)
(0, 100, 100, 0, 100, 0, 0)
(0, 100, 100, 20, 100, 0, 0)
(0, 100, 100, 40, 100, 0, 0)
(0, 100, 100, 60, 0, 0, 100)
(0, 100, 100, 60, 0, 100, 0)
(0, 100, 100, 60, 100, 0, 0)
(0, 100, 100, 80, 0, 0, 70.2)
(0, 100, 100, 80, 0, 70.2, 0)
(0, 100, 100, 80, 70.2, 0, 0)
(0, 100, 100, 80, 100, 0, 0)
(0, 100, 100, 100, 0, 0, 100)
(0, 100, 100, 100, 0, 100, 0)
(0, 100, 100, 100, 100, 0, 0)
(2.7, 0, 0, 0, 0, 67.8, 0)
(3.1, 0, 0, 0, 0, 0, 3.1)
(3.1, 0, 0, 0, 0, 0, 40)
(3.1, 0, 0, 0, 0, 3.1, 0)
(3.1, 0, 0, 0, 0, 40, 0)
(3.1, 0, 0, 3.1, 0, 0, 3.1)
(3.1, 0, 0, 3.1, 0, 0, 40)
(3.1, 0, 0, 3.1, 0, 3.1, 0)
(3.1, 0, 0, 3.1, 0, 40, 0)
(3.1, 0, 0, 40, 0, 0, 3.1)
(3.1, 0, 0, 40, 0, 0, 40)
(3.1, 0, 0, 40, 0, 3.1, 0)
(3.1, 0, 0, 40, 0, 40, 0)
(6.3, 0, 0, 0, 0, 0, 35.7)
(6.3, 0, 9, 0, 0, 89.8, 0)
(7.1, 0, 0, 0, 0, 0, 7.1)
(7.1, 0, 0, 0, 0, 7.1, 0)
(7.1, 0, 0, 7.1, 0, 0, 7.1)
(7.1, 0, 0, 7.1, 0, 7.1, 0)
(10.2, 0, 0, 0, 0, 0, 10.2)
(10.2, 0, 0, 0, 0, 0, 20)
(10.2, 0, 0, 0, 0, 0, 30.2)
(10.2, 0, 0, 0, 0, 0, 40)
(10.2, 0, 0, 0, 0, 0, 54.9)
(10.2, 0, 0, 0, 0, 0, 70.2)
(10.2, 0, 0, 0, 0, 0, 85.1)
(10.2, 0, 0, 0, 0, 0, 100)
(10.2, 0, 0, 0, 0, 10.2, 0)
(10.2, 0, 0, 0, 0, 20, 0)
(10.2, 0, 0, 0, 0, 30.2, 0)
(10.2, 0, 0, 0, 0, 40, 0)
(10.2, 0, 0, 0, 0, 54.9, 0)
(10.2, 0, 0, 0, 0, 70.2, 0)
(10.2, 0, 0, 0, 0, 85.1, 0)
(10.2, 0, 0, 0, 0, 100, 0)
(10.2, 0, 0, 20, 0, 0, 10.2)
(10.2, 0, 0, 20, 0, 0, 20)
(10.2, 0, 0, 20, 0, 0, 40)
(10.2, 0, 0, 20, 0, 0, 70.2)
(10.2, 0, 0, 20, 0, 0, 100)
(10.2, 0, 0, 20, 0, 10.2, 0)
(10.2, 0, 0, 20, 0, 20, 0)
(10.2, 0, 0, 20, 0, 40, 0)
(10.2, 0, 0, 20, 0, 70.2, 0)
(10.2, 0, 0, 20, 0, 100, 0)
(10.2, 0, 10.2, 0, 0, 100, 0)
(10.2, 0, 10.2, 20, 0, 100, 0)
(10.2, 0, 20, 0, 0, 100, 0)

TABLE 3-continued

| (C, M, Y, K, O, G, B) Tint |
|---|
| (10.2, 0, 20, 20, 0, 100, 0) |
| (10.2, 0, 30.2, 0, 0, 100, 0) |
| (10.2, 0, 40, 0, 0, 100, 0) |
| (10.2, 0, 40, 20, 0, 100, 0) |
| (10.2, 0, 54.9, 0, 0, 100, 0) |
| (10.2, 0, 70.2, 0, 0, 100, 0) |
| (10.2, 0, 70.2, 20, 0, 100, 0) |
| (10.2, 0, 85.1, 0, 0, 100, 0) |
| (10.2, 0, 100, 0, 0, 100, 0) |
| (10.2, 0, 100, 20, 0, 100, 0) |
| (10.2, 10.2, 0, 0, 0, 0, 100) |
| (10.2, 10.2, 0, 20, 0, 0, 100) |
| (10.2, 20, 0, 0, 0, 0, 100) |
| (10.2, 20, 0, 20, 0, 0, 100) |
| (10.2, 30.2, 0, 0, 0, 0, 100) |
| (10.2, 40, 0, 0, 0, 0, 100) |
| (10.2, 40, 0, 20, 0, 0, 100) |
| (10.2, 54.9, 0, 0, 0, 0, 100) |
| (10.2, 70.2, 0, 0, 0, 0, 100) |
| (10.2, 70.2, 0, 20, 0, 0, 100) |
| (10.2, 85.1, 0, 0, 0, 0, 100) |
| (10.2, 100, 0, 0, 0, 0, 100) |
| (10.2, 100, 0, 20, 0, 0, 100) |
| (16.1, 0, 0, 0, 0, 0, 38) |
| (16.1, 0, 0, 0, 0, 20.8, 0) |
| (16.1, 0, 0, 0, 0, 85.9, 0) |
| (16.1, 0, 0, 5.1, 0, 0, 27.8) |
| (16.1, 0, 0, 5.1, 0, 0, 76.9) |
| (16.1, 0, 0, 14.9, 0, 50.2, 0) |
| (19.2, 0, 0, 0, 0, 0, 14.1) |
| (19.2, 0, 0, 0, 0, 0, 23.5) |
| (20, 0, 0, 0, 0, 0, 10.2) |
| (20, 0, 0, 0, 0, 0, 20) |
| (20, 0, 0, 0, 0, 0, 30.2) |
| (20, 0, 0, 0, 0, 0, 40) |
| (20, 0, 0, 0, 0, 0, 54.9) |
| (20, 0, 0, 0, 0, 0, 70.2) |
| (20, 0, 0, 0, 0, 0, 85.1) |
| (20, 0, 0, 0, 0, 0, 100) |
| (20, 0, 0, 0, 0, 10.2, 0) |
| (20, 0, 0, 0, 0, 20, 0) |
| (20, 0, 0, 0, 0, 30.2, 0) |
| (20, 0, 0, 0, 0, 40, 0) |
| (20, 0, 0, 0, 0, 54.9, 0) |
| (20, 0, 0, 0, 0, 70.2, 0) |
| (20, 0, 0, 0, 0, 85.1, 0) |
| (20, 0, 0, 0, 0, 100, 0) |
| (20, 0, 0, 20, 0, 0, 10.2) |
| (20, 0, 0, 20, 0, 0, 20) |
| (20, 0, 0, 20, 0, 0, 40) |
| (20, 0, 0, 20, 0, 0, 70.2) |
| (20, 0, 0, 20, 0, 0, 100) |
| (20, 0, 0, 20, 0, 10.2, 0) |
| (20, 0, 0, 20, 0, 20, 0) |
| (20, 0, 0, 20, 0, 40, 0) |
| (20, 0, 0, 20, 0, 70.2, 0) |
| (20, 0, 0, 20, 0, 100, 0) |
| (20, 0, 0, 40, 0, 0, 20) |
| (20, 0, 0, 40, 0, 0, 40) |
| (20, 0, 0, 40, 0, 0, 70.2) |
| (20, 0, 0, 40, 0, 0, 100) |
| (20, 0, 0, 40, 0, 20, 0) |
| (20, 0, 0, 40, 0, 40, 0) |
| (20, 0, 0, 40, 0, 70.2, 0) |
| (20, 0, 0, 40, 0, 100, 0) |
| (20, 0, 0, 60, 0, 0, 20) |
| (20, 0, 0, 60, 0, 0, 40) |
| (20, 0, 0, 60, 0, 0, 70.2) |
| (20, 0, 0, 60, 0, 0, 100) |
| (20, 0, 0, 60, 0, 20, 0) |
| (20, 0, 0, 60, 0, 40, 0) |
| (20, 0, 0, 60, 0, 70.2, 0) |
| (20, 0, 0, 60, 0, 100, 0) |
| (20, 0, 10.2, 0, 0, 100, 0) |
| (20, 0, 10.2, 20, 0, 100, 0) |
| (20, 0, 20, 0, 0, 100, 0) |
| (20, 0, 20, 20, 0, 100, 0) |
| (20, 0, 20, 40, 0, 100, 0) |

TABLE 3-continued

| (C, M, Y, K, O, G, B) Tint |
|---|
| (20, 0, 20, 60, 0, 100, 0) |
| (20, 0, 30.2, 0, 0, 100, 0) |
| (20, 0, 40, 0, 0, 100, 0) |
| (20, 0, 40, 20, 0, 100, 0) |
| (20, 0, 40, 40, 0, 100, 0) |
| (20, 0, 40, 60, 0, 100, 0) |
| (20, 0, 54.9, 0, 0, 100, 0) |
| (20, 0, 70.2, 0, 0, 100, 0) |
| (20, 0, 70.2, 20, 0, 100, 0) |
| (20, 0, 70.2, 40, 0, 100, 0) |
| (20, 0, 70.2, 60, 0, 100, 0) |
| (20, 0, 85.1, 0, 0, 100, 0) |
| (20, 0, 100, 0, 0, 100, 0) |
| (20, 0, 100, 20, 0, 100, 0) |
| (20, 0, 100, 40, 0, 100, 0) |
| (20, 0, 100, 60, 0, 100, 0) |
| (20, 10.2, 0, 0, 0, 0, 100) |
| (20, 10.2, 0, 20, 0, 0, 100) |
| (20, 20, 0, 0, 0, 0, 100) |
| (20, 20, 0, 20, 0, 0, 100) |
| (20, 20, 0, 40, 0, 0, 100) |
| (20, 20, 0, 60, 0, 0, 100) |
| (20, 30.2, 0, 0, 0, 0, 100) |
| (20, 40, 0, 0, 0, 0, 100) |
| (20, 40, 0, 20, 0, 0, 100) |
| (20, 40, 0, 40, 0, 0, 100) |
| (20, 40, 0, 60, 0, 0, 100) |
| (20, 54.9, 0, 0, 0, 0, 100) |
| (20, 70.2, 0, 0, 0, 0, 100) |
| (20, 70.2, 0, 20, 0, 0, 100) |
| (20, 70.2, 0, 40, 0, 0, 100) |
| (20, 70.2, 0, 60, 0, 0, 100) |
| (20, 85.1, 0, 0, 0, 0, 100) |
| (20, 100, 0, 0, 0, 0, 100) |
| (20, 100, 0, 20, 0, 0, 100) |
| (20, 100, 0, 40, 0, 0, 100) |
| (20, 100, 0, 60, 0, 0, 100) |
| (22.4, 0, 0, 0, 0, 35.3, 0) |
| (25.1, 0, 0, 5.1, 0, 0, 33.3) |
| (28.2, 0, 0, 0, 0, 17.3, 0) |
| (30.2, 0, 0, 0, 0, 0, 10.2) |
| (30.2, 0, 0, 0, 0, 0, 20) |
| (30.2, 0, 0, 0, 0, 0, 30.2) |
| (30.2, 0, 0, 0, 0, 0, 40) |
| (30.2, 0, 0, 0, 0, 0, 54.9) |
| (30.2, 0, 0, 0, 0, 0, 70.2) |
| (30.2, 0, 0, 0, 0, 0, 85.1) |
| (30.2, 0, 0, 0, 0, 0, 100) |
| (30.2, 0, 0, 0, 0, 10.2, 0) |
| (30.2, 0, 0, 0, 0, 20, 0) |
| (30.2, 0, 0, 0, 0, 30.2, 0) |
| (30.2, 0, 0, 0, 0, 40, 0) |
| (30.2, 0, 0, 0, 0, 54.9, 0) |
| (30.2, 0, 0, 0, 0, 70.2, 0) |
| (30.2, 0, 0, 0, 0, 85.1, 0) |
| (30.2, 0, 0, 0, 0, 100, 0) |
| (30.2, 0, 10.2, 0, 0, 100, 0) |
| (30.2, 0, 20, 0, 0, 100, 0) |
| (30.2, 0, 30.2, 0, 0, 100, 0) |
| (30.2, 0, 40, 0, 0, 100, 0) |
| (30.2, 0, 54.9, 0, 0, 100, 0) |
| (30.2, 0, 70.2, 0, 0, 100, 0) |
| (30.2, 0, 85.1, 0, 0, 100, 0) |
| (30.2, 0, 100, 0, 0, 100, 0) |
| (30.2, 10.2, 0, 0, 0, 0, 100) |
| (30.2, 20, 0, 0, 0, 0, 100) |
| (30.2, 30.2, 0, 0, 0, 0, 100) |
| (30.2, 40, 0, 0, 0, 0, 100) |
| (30.2, 54.9, 0, 0, 0, 0, 100) |
| (30.2, 70.2, 0, 0, 0, 0, 100) |
| (30.2, 85.1, 0, 0, 0, 0, 100) |
| (30.2, 100, 0, 0, 0, 0, 100) |
| (31, 0, 0, 5.1, 0, 26.7, 0) |
| (31, 0, 0, 8.2, 0, 0, 62) |
| (33.3, 0, 0, 0, 0, 26.7, 0) |
| (33.3, 0, 0, 0, 0, 42.7, 0) |
| (33.3, 0, 0, 8.2, 0, 37.6, 0) |
| (36.1, 0, 0, 0, 0, 17.3, 0) |

TABLE 3-continued

(C, M, Y, K, O, G, B) Tint (36.1, 0, 0, 5.1, 0, 0, 47.1)
(38.4, 0, 0, 0, 0, 26.7, 0)
(38.4, 0, 0, 0, 0, 35.3, 0)
(38.4, 0, 0, 0, 0, 74.1, 0)
(38.4, 0, 0, 21.2, 0, 87.8, 0)
(40, 0, 0, 0, 0, 0, 3.1)
(40, 0, 0, 0, 0, 0, 10.2)
(40, 0, 0, 0, 0, 0, 20)
(40, 0, 0, 0, 0, 0, 30.2)
(40, 0, 0, 0, 0, 0, 40)
(40, 0, 0, 0, 0, 0, 54.9)
(40, 0, 0, 0, 0, 0, 70.2)
(40, 0, 0, 0, 0, 0, 85.1)
(40, 0, 0, 0, 0, 0, 100)
(40, 0, 0, 0, 0, 3.1, 0)
(40, 0, 0, 0, 0, 10.2, 0)
(40, 0, 0, 0, 0, 20, 0)
(40, 0, 0, 0, 0, 30.2, 0)
(40, 0, 0, 0, 0, 40, 0)
(40, 0, 0, 0, 0, 54.9, 0)
(40, 0, 0, 0, 0, 70.2, 0)
(40, 0, 0, 0, 0, 85.1, 0)
(40, 0, 0, 0, 0, 100, 0)
(40, 0, 0, 0, 70.2, 0, 0)
(40, 0, 0, 0, 100, 0, 0)
(40, 0, 0, 3.1, 0, 0, 3.1)
(40, 0, 0, 3.1, 0, 0, 40)
(40, 0, 0, 3.1, 0, 3.1, 0)
(40, 0, 0, 3.1, 0, 40, 0)
(40, 0, 0, 20, 0, 0, 10.2)
(40, 0, 0, 20, 0, 0, 20)
(40, 0, 0, 20, 0, 0, 40)
(40, 0, 0, 20, 0, 0, 70.2)
(40, 0, 0, 20, 0, 0, 100)
(40, 0, 0, 20, 0, 10.2, 0)
(40, 0, 0, 20, 0, 20, 0)
(40, 0, 0, 20, 0, 40, 0)
(40, 0, 0, 20, 0, 70.2, 0)
(40, 0, 0, 20, 0, 100, 0)
(40, 0, 0, 40, 0, 0, 3.1)
(40, 0, 0, 40, 0, 0, 20)
(40, 0, 0, 40, 0, 0, 40)
(40, 0, 0, 40, 0, 0, 70.2)
(40, 0, 0, 40, 0, 0, 100)
(40, 0, 0, 40, 0, 3.1, 0)
(40, 0, 0, 40, 0, 20, 0)
(40, 0, 0, 40, 0, 40, 0)
(40, 0, 0, 40, 0, 70.2, 0)
(40, 0, 0, 40, 0, 100, 0)
(40, 0, 0, 60, 0, 0, 20)
(40, 0, 0, 60, 0, 0, 40)
(40, 0, 0, 60, 0, 0, 70.2)
(40, 0, 0, 60, 0, 0, 100)
(40, 0, 0, 60, 0, 20, 0)
(40, 0, 0, 60, 0, 40, 0)
(40, 0, 0, 60, 0, 70.2, 0)
(40, 0, 0, 60, 0, 100, 0)
(40, 0, 0, 80, 0, 0, 40)
(40, 0, 0, 80, 0, 0, 70.2)
(40, 0, 0, 80, 0, 0, 100)
(40, 0, 0, 80, 0, 40, 0)
(40, 0, 0, 80, 0, 70.2, 0)
(40, 0, 0, 80, 0, 100, 0)
(40, 0, 0, 80, 100, 0, 0)
(40, 0, 0, 100, 0, 0, 40)
(40, 0, 0, 100, 0, 0, 100)
(40, 0, 0, 100, 0, 40, 0)
(40, 0, 0, 100, 0, 100, 0)
(40, 0, 10.2, 0, 0, 100, 0)
(40, 0, 10.2, 20, 0, 100, 0)
(40, 0, 20, 0, 0, 100, 0)
(40, 0, 20, 20, 0, 100, 0)
(40, 0, 20, 40, 0, 100, 0)
(40, 0, 20, 60, 0, 100, 0)
(40, 0, 30.2, 0, 0, 100, 0)
(40, 0, 40, 0, 0, 100, 0)
(40, 0, 40, 20, 0, 100, 0)
(40, 0, 40, 40, 0, 100, 0)
(40, 0, 40, 60, 0, 100, 0)
(40, 0, 40, 80, 0, 100, 0)
(40, 0, 40, 100, 0, 100, 0)
(40, 0, 54.9, 0, 0, 100, 0)
(40, 0, 70.2, 0, 0, 100, 0)
(40, 0, 70.2, 20, 0, 100, 0)
(40, 0, 70.2, 40, 0, 100, 0)
(40, 0, 70.2, 60, 0, 100, 0)
(40, 0, 70.2, 80, 0, 100, 0)
(40, 0, 85.1, 0, 0, 100, 0)
(40, 0, 100, 0, 0, 0, 100)
(40, 0, 100, 0, 0, 100, 0)
(40, 0, 100, 0, 100, 0, 0)
(40, 0, 100, 20, 0, 100, 0)
(40, 0, 100, 40, 0, 100, 0)
(40, 0, 100, 60, 0, 100, 0)
(40, 0, 100, 80, 0, 100, 0)
(40, 0, 100, 100, 0, 100, 0)
(40, 10.2, 0, 0, 0, 0, 100)
(40, 10.2, 0, 20, 0, 0, 100)
(40, 20, 0, 0, 0, 0, 100)
(40, 20, 0, 20, 0, 0, 100)
(40, 20, 0, 40, 0, 0, 100)
(40, 20, 0, 60, 0, 0, 100)
(40, 30.2, 0, 0, 0, 0, 100)
(40, 40, 0, 0, 0, 0, 100)
(40, 40, 0, 20, 0, 0, 100)
(40, 40, 0, 40, 0, 0, 100)
(40, 40, 0, 60, 0, 0, 100)
(40, 40, 0, 80, 0, 0, 100)
(40, 40, 0, 100, 0, 0, 100)
(40, 54.9, 0, 0, 0, 0, 100)
(40, 70.2, 0, 0, 0, 0, 100)
(40, 70.2, 0, 20, 0, 0, 100)
(40, 70.2, 0, 40, 0, 0, 100)
(40, 70.2, 0, 60, 0, 0, 100)
(40, 70.2, 0, 80, 0, 0, 100)
(40, 85.1, 0, 0, 0, 0, 100)
(40, 100, 0, 0, 0, 0, 100)
(40, 100, 0, 0, 0, 100, 0)
(40, 100, 0, 0, 100, 0, 0)
(40, 100, 0, 20, 0, 0, 100)
(40, 100, 0, 40, 0, 0, 100)
(40, 100, 0, 60, 0, 0, 100)
(40, 100, 0, 80, 0, 0, 100)
(40, 100, 0, 100, 0, 0, 100)
(43.1, 0, 0, 0, 0, 0, 40.4)
(43.1, 0, 0, 8.2, 0, 35.3, 0)
(45.5, 0, 0, 0, 0, 26.7, 0)
(45.5, 0, 0, 21.2, 0, 87.8, 0)
(45.5, 0, 0, 48.6, 0, 0, 96.5)
(47.8, 0, 0, 0, 0, 32.5, 0)
(47.8, 0, 0, 0, 0, 35.3, 0)
(49.8, 0, 0, 8.2, 0, 42.7, 0)
(51.8, 0, 0, 0, 0, 60.4, 0)
(51.8, 0, 0, 74.5, 0, 0, 96.9)
(54.1, 0, 0, 0, 0, 23.5, 0)
(54.9, 0, 0, 0, 0, 0, 10.2)
(54.9, 0, 0, 0, 0, 0, 20)
(54.9, 0, 0, 0, 0, 0, 30.2)
(54.9, 0, 0, 0, 0, 0, 40)
(54.9, 0, 0, 0, 0, 0, 54.9)
(54.9, 0, 0, 0, 0, 0, 70.2)
(54.9, 0, 0, 0, 0, 0, 85.1)
(54.9, 0, 0, 0, 0, 0, 100)
(54.9, 0, 0, 0, 0, 10.2, 0)
(54.9, 0, 0, 0, 0, 20, 0)
(54.9, 0, 0, 0, 0, 30.2, 0)
(54.9, 0, 0, 0, 0, 40, 0)
(54.9, 0, 0, 0, 0, 54.9, 0)
(54.9, 0, 0, 0, 0, 70.2, 0)
(54.9, 0, 0, 0, 0, 85.1, 0)
(54.9, 0, 0, 0, 0, 100, 0)
(54.9, 0, 10.2, 0, 0, 100, 0)
(54.9, 0, 20, 0, 0, 100, 0)
(54.9, 0, 30.2, 0, 0, 100, 0)
(54.9, 0, 40, 0, 0, 100, 0)
(54.9, 0, 54.9, 0, 0, 100, 0)

TABLE 3-continued (C, M, Y, K, O, G, B) Tint (54.9, 0, 70.2, 0, 0, 100, 0)
(54.9, 0, 85.1, 0, 0, 100, 0)
(54.9, 0, 100, 0, 0, 100, 0)
(54.9, 10.2, 0, 0, 0, 0, 100)
(54.9, 20, 0, 0, 0, 0, 100)
(54.9, 30.2, 0, 0, 0, 0, 100)
(54.9, 40, 0, 0, 0, 0, 100)
(54.9, 54.9, 0, 0, 0, 0, 100)
(54.9, 70.2, 0, 0, 0, 0, 100)
(54.9, 85.1, 0, 0, 0, 0, 100)
(54.9, 100, 0, 0, 0, 0, 100)
(55.7, 0, 0, 85.9, 0, 0, 94.5)
(57.6, 0, 0, 14.9, 0, 56.5, 0)
(59.6, 0, 0, 54.5, 0, 0, 97.6)
(61.2, 0, 0, 0, 0, 45.5, 0)
(61.2, 0, 0, 14.9, 0, 0, 78.8)
(62.7, 0, 0, 0, 0, 17.3, 0)
(62.7, 0, 0, 8.2, 0, 56.5, 0)
(62.7, 0, 0, 64.7, 0, 0, 98.8)
(64.7, 0, 0, 0, 0, 0, 23.5)
(64.7, 0, 0, 0, 0, 0, 74.1)
(66.3, 0, 0, 5.1, 0, 0, 51.4)
(67.8, 0, 0, 0, 0, 42.7, 0)
(67.8, 0, 0, 14.9, 0, 54.5, 0)
(69, 0, 0, 8.2, 0, 42.7, 0)
(69, 0, 0, 46.3, 0, 0, 99.6)
(70.2, 0, 0, 0, 0, 0, 10.2)
(70.2, 0, 0, 0, 0, 0, 20)
(70.2, 0, 0, 0, 0, 0, 30.2)
(70.2, 0, 0, 0, 0, 0, 40)
(70.2, 0, 0, 0, 0, 0, 54.9)
(70.2, 0, 0, 0, 0, 0, 70.2)
(70.2, 0, 0, 0, 0, 0, 85.1)
(70.2, 0, 0, 0, 0, 0, 100)
(70.2, 0, 0, 0, 0, 10.2, 0)
(70.2, 0, 0, 0, 0, 20, 0)
(70.2, 0, 0, 0, 0, 30.2, 0)
(70.2, 0, 0, 0, 0, 40, 0)
(70.2, 0, 0, 0, 0, 54.9, 0)
(70.2, 0, 0, 0, 0, 70.2, 0)
(70.2, 0, 0, 0, 0, 85.1, 0)
(70.2, 0, 0, 0, 0, 100, 0)
(70.2, 0, 0, 0, 40, 0, 0)
(70.2, 0, 0, 0, 70.2, 0, 0)
(70.2, 0, 0, 0, 100, 0, 0)
(70.2, 0, 0, 20, 0, 0, 10.2)
(70.2, 0, 0, 20, 0, 0, 20)
(70.2, 0, 0, 20, 0, 0, 40)
(70.2, 0, 0, 20, 0, 0, 70.2)
(70.2, 0, 0, 20, 0, 0, 100)
(70.2, 0, 0, 20, 0, 10.2, 0)
(70.2, 0, 0, 20, 0, 20, 0)
(70.2, 0, 0, 20, 0, 40, 0)
(70.2, 0, 0, 20, 0, 70.2, 0)
(70.2, 0, 0, 20, 0, 100, 0)
(70.2, 0, 0, 40, 0, 0, 20)
(70.2, 0, 0, 40, 0, 0, 40)
(70.2, 0, 0, 40, 0, 0, 70.2)
(70.2, 0, 0, 40, 0, 0, 100)
(70.2, 0, 0, 40, 0, 20, 0)
(70.2, 0, 0, 40, 0, 40, 0)
(70.2, 0, 0, 40, 0, 70.2, 0)
(70.2, 0, 0, 40, 0, 100, 0)
(70.2, 0, 0, 60, 0, 0, 20)
(70.2, 0, 0, 60, 0, 0, 40)
(70.2, 0, 0, 60, 0, 0, 70.2)
(70.2, 0, 0, 60, 0, 0, 100)
(70.2, 0, 0, 60, 0, 20, 0)
(70.2, 0, 0, 60, 0, 40, 0)
(70.2, 0, 0, 60, 0, 70.2, 0)
(70.2, 0, 0, 60, 0, 100, 0)
(70.2, 0, 0, 60, 100, 0, 0)
(70.2, 0, 0, 80, 0, 0, 40)
(70.2, 0, 0, 80, 0, 0, 70.2)
(70.2, 0, 0, 80, 0, 0, 100)
(70.2, 0, 0, 80, 0, 40, 0)
(70.2, 0, 0, 80, 0, 70.2, 0)
(70.2, 0, 0, 80, 0, 100, 0)
(70.2, 0, 0, 80, 70.2, 0, 0)
(70.2, 0, 0, 80, 100, 0, 0)
(70.2, 0, 10.2, 0, 0, 100, 0)
(70.2, 0, 10.2, 20, 0, 100, 0)
(70.2, 0, 20, 0, 0, 100, 0)
(70.2, 0, 20, 20, 0, 100, 0)
(70.2, 0, 20, 40, 0, 100, 0)
(70.2, 0, 20, 60, 0, 100, 0)
(70.2, 0, 30.2, 0, 0, 100, 0)
(70.2, 0, 40, 0, 0, 100, 0)
(70.2, 0, 40, 20, 0, 100, 0)
(70.2, 0, 40, 40, 0, 100, 0)
(70.2, 0, 40, 60, 0, 100, 0)
(70.2, 0, 40, 80, 0, 100, 0)
(70.2, 0, 54.9, 0, 0, 100, 0)
(70.2, 0, 70.2, 0, 0, 0, 100)
(70.2, 0, 70.2, 0, 0, 100, 0)
(70.2, 0, 70.2, 0, 100, 0, 0)
(70.2, 0, 70.2, 20, 0, 100, 0)
(70.2, 0, 70.2, 40, 0, 100, 0)
(70.2, 0, 70.2, 60, 0, 100, 0)
(70.2, 0, 70.2, 80, 0, 100, 0)
(70.2, 0, 85.1, 0, 0, 100, 0)
(70.2, 0, 100, 0, 0, 0, 70.2)
(70.2, 0, 100, 0, 0, 0, 100)
(70.2, 0, 100, 0, 0, 70.2, 0)
(70.2, 0, 100, 0, 0, 100, 0)
(70.2, 0, 100, 0, 70.2, 0, 0)
(70.2, 0, 100, 0, 100, 0, 0)
(70.2, 0, 100, 20, 0, 100, 0)
(70.2, 0, 100, 40, 0, 100, 0)
(70.2, 0, 100, 60, 0, 100, 0)
(70.2, 0, 100, 80, 0, 0, 100)
(70.2, 0, 100, 80, 0, 100, 0)
(70.2, 0, 100, 80, 100, 0, 0)
(70.2, 10.2, 0, 0, 0, 0, 100)
(70.2, 10.2, 0, 20, 0, 0, 100)
(70.2, 20, 0, 0, 0, 0, 100)
(70.2, 20, 0, 20, 0, 0, 100)
(70.2, 20, 0, 40, 0, 0, 100)
(70.2, 20, 0, 60, 0, 0, 100)
(70.2, 30.2, 0, 0, 0, 0, 100)
(70.2, 40, 0, 0, 0, 0, 100)
(70.2, 40, 0, 20, 0, 0, 100)
(70.2, 40, 0, 40, 0, 0, 100)
(70.2, 40, 0, 60, 0, 0, 100)
(70.2, 40, 0, 80, 0, 0, 100)
(70.2, 54.9, 0, 0, 0, 0, 100)
(70.2, 70.2, 0, 0, 0, 0, 100)
(70.2, 70.2, 0, 0, 0, 100, 0)
(70.2, 70.2, 0, 0, 100, 0, 0)
(70.2, 70.2, 0, 20, 0, 0, 100)
(70.2, 70.2, 0, 40, 0, 0, 100)
(70.2, 70.2, 0, 60, 0, 0, 100)
(70.2, 70.2, 0, 80, 0, 0, 100)
(70.2, 85.1, 0, 0, 0, 0, 100)
(70.2, 100, 0, 0, 0, 0, 70.2)
(70.2, 100, 0, 0, 0, 0, 100)
(70.2, 100, 0, 0, 0, 70.2, 0)
(70.2, 100, 0, 0, 0, 100, 0)
(70.2, 100, 0, 0, 70.2, 0, 0)
(70.2, 100, 0, 0, 100, 0, 0)
(70.2, 100, 0, 20, 0, 0, 100)
(70.2, 100, 0, 40, 0, 0, 100)
(70.2, 100, 0, 60, 0, 0, 100)
(70.2, 100, 0, 80, 0, 0, 100)
(70.2, 100, 0, 80, 0, 100, 0)
(70.2, 100, 0, 80, 100, 0, 0)
(70.2, 100, 100, 0, 0, 0, 100)
(70.2, 100, 100, 0, 0, 100, 0)
(70.2, 100, 100, 0, 100, 0, 0)
(70.6, 0, 0, 61.6, 0, 0, 99.2)
(73.3, 0, 0, 87.1, 0, 0, 92.2)
(74.5, 0, 0, 0, 0, 0, 35.7)
(74.5, 0, 0, 0, 0, 54.5, 0)
(74.5, 0, 0, 34.9, 0, 0, 97.3)
(78, 0, 0, 21.2, 0, 74.1, 0)
(78, 0, 0, 63.1, 0, 0, 98)

TABLE 3-continued (C, M, Y, K, O, G, B) Tint (79.2, 0, 0, 0, 0, 65.9, 0)
(80.4, 0, 0, 0, 0, 29.8, 0)
(80.4, 0, 0, 21.2, 0, 64.3, 0)
(82.4, 0, 0, 0, 0, 40.4, 0)
(82.4, 0, 0, 14.9, 0, 69.4, 0)
(83.9, 0, 0, 0, 0, 23.5, 0)
(85.1, 0, 0, 0, 0, 0, 10.2)
(85.1, 0, 0, 0, 0, 0, 20)
(85.1, 0, 0, 0, 0, 0, 30.2)
(85.1, 0, 0, 0, 0, 0, 40)
(85.1, 0, 0, 0, 0, 0, 54.9)
(85.1, 0, 0, 0, 0, 0, 70.2)
(85.1, 0, 0, 0, 0, 0, 85.1)
(85.1, 0, 0, 0, 0, 0, 100)
(85.1, 0, 0, 0, 0, 10.2, 0)
(85.1, 0, 0, 0, 0, 20, 0)
(85.1, 0, 0, 0, 0, 30.2, 0)
(85.1, 0, 0, 0, 0, 40, 0)
(85.1, 0, 0, 0, 0, 54.9, 0)
(85.1, 0, 0, 0, 0, 70.2, 0)
(85.1, 0, 0, 0, 0, 85.1, 0)
(85.1, 0, 0, 0, 0, 100, 0)
(85.1, 0, 10.2, 0, 0, 100, 0)
(85.1, 0, 20, 0, 0, 100, 0)
(85.1, 0, 30.2, 0, 0, 100, 0)
(85.1, 0, 40, 0, 0, 100, 0)
(85.1, 0, 54.9, 0, 0, 100, 0)
(85.1, 0, 70.2, 0, 0, 100, 0)
(85.1, 0, 85.1, 0, 0, 100, 0)
(85.1, 0, 100, 0, 0, 100, 0)
(85.1, 10.2, 0, 0, 0, 0, 100)
(85.1, 20, 0, 0, 0, 0, 100)
(85.1, 30.2, 0, 0, 0, 0, 100)
(85.1, 40, 0, 0, 0, 0, 100)
(85.1, 54.9, 0, 0, 0, 0, 100)
(85.1, 70.2, 0, 0, 0, 0, 100)
(85.1, 85.1, 0, 0, 0, 0, 100)
(85.1, 100, 0, 0, 0, 0, 100)
(87.5, 0, 0, 0, 0, 58.4, 0)
(88.2, 0, 0, 64.7, 0, 0, 94.5)
(88.2, 0, 0, 77.6, 0, 0, 92.2)
(88.6, 0, 0, 26.7, 0, 0, 94.9)
(90.2, 0, 0, 0, 0, 45.5, 0)
(91.4, 0, 0, 21.2, 0, 0, 87.1)
(92.5, 0, 0, 0, 0, 47.8, 0)
(92.5, 0, 0, 44.3, 0, 0, 87.1)
(94.1, 0, 0, 23.9, 0, 65.9, 0)
(96.1, 0, 0, 18, 0, 52.2, 0)
(96.5, 0, 0, 5.1, 0, 0, 55.3)
(96.9, 0, 0, 0, 0, 40.4, 0)
(97.3, 0, 0, 0, 0, 32.5, 0)
(97.3, 0, 0, 18, 0, 0, 80.8)
(98.4, 0, 0, 50.6, 0, 0, 82.7)
(99.2, 0, 0, 21.2, 0, 37.6, 0)
(99.6, 0, 0, 0, 0, 23.5, 0)
(100, 0, 0, 0, 0, 0, 10.2)
(100, 0, 0, 0, 0, 0, 20)
(100, 0, 0, 0, 0, 0, 30.2)
(100, 0, 0, 0, 0, 0, 40)
(100, 0, 0, 0, 0, 0, 54.9)
(100, 0, 0, 0, 0, 0, 70.2)
(100, 0, 0, 0, 0, 0, 85.1)
(100, 0, 0, 0, 0, 0, 100)
(100, 0, 0, 0, 0, 10.2, 0)
(100, 0, 0, 0, 0, 20, 0)
(100, 0, 0, 0, 0, 30.2, 0)
(100, 0, 0, 0, 0, 40, 0)
(100, 0, 0, 0, 0, 54.9, 0)
(100, 0, 0, 0, 0, 70.2, 0)
(100, 0, 0, 0, 0, 85.1, 0)
(100, 0, 0, 0, 0, 100, 0)
(100, 0, 0, 0, 40, 0, 0)
(100, 0, 0, 0, 70.2, 0, 0)
(100, 0, 0, 0, 100, 0, 0)
(100, 0, 0, 20, 0, 0, 10.2)
(100, 0, 0, 20, 0, 0, 20)
(100, 0, 0, 20, 0, 0, 40)
(100, 0, 0, 20, 0, 0, 70.2)

TABLE 3-continued (C, M, Y, K, O, G, B) Tint (100, 0, 0, 20, 0, 0, 100)
(100, 0, 0, 20, 0, 10.2, 0)
(100, 0, 0, 20, 0, 20, 0)
(100, 0, 0, 20, 0, 40, 0)
(100, 0, 0, 20, 0, 70.2, 0)
(100, 0, 0, 20, 0, 100, 0)
(100, 0, 0, 20, 100, 0, 0)
(100, 0, 0, 40, 0, 0, 20)
(100, 0, 0, 40, 0, 0, 40)
(100, 0, 0, 40, 0, 0, 70.2)
(100, 0, 0, 40, 0, 0, 100)
(100, 0, 0, 40, 0, 20, 0)
(100, 0, 0, 40, 0, 40, 0)
(100, 0, 0, 40, 0, 70.2, 0)
(100, 0, 0, 40, 0, 100, 0)
(100, 0, 0, 60, 0, 0, 20)
(100, 0, 0, 60, 0, 0, 40)
(100, 0, 0, 60, 0, 0, 70.2)
(100, 0, 0, 60, 0, 0, 100)
(100, 0, 0, 60, 0, 20, 0)
(100, 0, 0, 60, 0, 40, 0)
(100, 0, 0, 60, 0, 70.2, 0)
(100, 0, 0, 60, 0, 100, 0)
(100, 0, 0, 60, 70.2, 0, 0)
(100, 0, 0, 60, 100, 0, 0)
(100, 0, 0, 70.2, 0, 0, 100)
(100, 0, 0, 70.2, 0, 0, 100)
(100, 0, 0, 80, 0, 0, 40)
(100, 0, 0, 80, 0, 0, 70.2)
(100, 0, 0, 80, 0, 0, 100)
(100, 0, 0, 80, 0, 40, 0)
(100, 0, 0, 80, 0, 70.2, 0)
(100, 0, 0, 80, 0, 100, 0)
(100, 0, 0, 80, 40, 0, 0)
(100, 0, 0, 80, 70.2, 0, 0)
(100, 0, 0, 100, 0, 0, 40)
(100, 0, 0, 100, 0, 0, 100)
(100, 0, 0, 100, 0, 40, 0)
(100, 0, 0, 100, 0, 100, 0)
(100, 0, 0, 100, 100, 0, 0)
(100, 0, 10.2, 0, 0, 100, 0)
(100, 0, 10.2, 20, 0, 100, 0)
(100, 0, 20, 0, 0, 100, 0)
(100, 0, 20, 20, 0, 100, 0)
(100, 0, 20, 40, 0, 100, 0)
(100, 0, 20, 60, 0, 100, 0)
(100, 0, 30.2, 0, 0, 100, 0)
(100, 0, 40, 0, 0, 0, 100)
(100, 0, 40, 0, 0, 100, 0)
(100, 0, 40, 0, 100, 0, 0)
(100, 0, 40, 20, 0, 100, 0)
(100, 0, 40, 40, 0, 100, 0)
(100, 0, 40, 60, 0, 100, 0)
(100, 0, 40, 80, 0, 100, 0)
(100, 0, 40, 100, 0, 100, 0)
(100, 0, 54.9, 0, 0, 100, 0)
(100, 0, 70.2, 0, 0, 0, 70.2)
(100, 0, 70.2, 0, 0, 0, 100)
(100, 0, 70.2, 0, 0, 70.2, 0)
(100, 0, 70.2, 0, 0, 100, 0)
(100, 0, 70.2, 0, 70.2, 0, 0)
(100, 0, 70.2, 0, 100, 0, 0)
(100, 0, 70.2, 20, 0, 100, 0)
(100, 0, 70.2, 40, 0, 100, 0)
(100, 0, 70.2, 60, 0, 100, 0)
(100, 0, 70.2, 80, 0, 0, 100)
(100, 0, 70.2, 80, 0, 100, 0)
(100, 0, 70.2, 80, 100, 0, 0)
(100, 0, 85.1, 0, 0, 100, 0)
(100, 0, 100, 0, 0, 0, 40)
(100, 0, 100, 0, 0, 0, 70.2)
(100, 0, 100, 0, 0, 0, 100)
(100, 0, 100, 0, 0, 40, 0)
(100, 0, 100, 0, 0, 70.2, 0)
(100, 0, 100, 0, 0, 100, 0)
(100, 0, 100, 0, 40, 0, 0)
(100, 0, 100, 0, 70.2, 0, 0)
(100, 0, 100, 0, 100, 0, 0)

TABLE 3-continued (C, M, Y, K, O, G, B) Tint (100, 0, 100, 20, 0, 100, 0)
(100, 0, 100, 40, 0, 100, 0)
(100, 0, 100, 60, 0, 0, 100)
(100, 0, 100, 60, 0, 100, 0)
(100, 0, 100, 60, 100, 0, 0)
(100, 0, 100, 80, 0, 0, 70.2)
(100, 0, 100, 80, 0, 70.2, 0)
(100, 0, 100, 80, 0, 100, 0)
(100, 0, 100, 80, 70.2, 0, 0)
(100, 0, 100, 100, 0, 0, 100)
(100, 0, 100, 100, 0, 100, 0)
(100, 0, 100, 100, 100, 0, 0)
(100, 10.2, 0, 0, 0, 0, 100)
(100, 10.2, 0, 20, 0, 0, 100)
(100, 20, 0, 0, 0, 0, 100)
(100, 20, 0, 20, 0, 0, 100)
(100, 20, 0, 40, 0, 0, 100)
(100, 20, 0, 60, 0, 0, 100)
(100, 30.2, 0, 0, 0, 0, 100)
(100, 40, 0, 0, 0, 0, 100)
(100, 40, 0, 0, 0, 100, 0)
(100, 40, 0, 0, 100, 0, 0)
(100, 40, 0, 20, 0, 0, 100)
(100, 40, 0, 40, 0, 0, 100)
(100, 40, 0, 60, 0, 0, 100)
(100, 40, 0, 80, 0, 0, 100)
(100, 40, 0, 100, 0, 0, 100)
(100, 54.9, 0, 0, 0, 0, 100)
(100, 70.2, 0, 0, 0, 0, 70.2)
(100, 70.2, 0, 0, 0, 0, 100)
(100, 70.2, 0, 0, 0, 70.2, 0)
(100, 70.2, 0, 0, 0, 100, 0)
(100, 70.2, 0, 0, 70.2, 0, 0)
(100, 70.2, 0, 0, 100, 0, 0)
(100, 70.2, 0, 20, 0, 0, 100)
(100, 70.2, 0, 40, 0, 0, 100)
(100, 70.2, 0, 60, 0, 0, 100)
(100, 70.2, 0, 80, 0, 0, 100)
(100, 70.2, 0, 80, 0, 100, 0)
(100, 70.2, 0, 80, 100, 0, 0)
(100, 70.2, 100, 0, 0, 0, 100)
(100, 70.2, 100, 0, 0, 100, 0)
(100, 70.2, 100, 0, 100, 0, 0)
(100, 85.1, 0, 0, 0, 0, 100)
(100, 100, 0, 0, 0, 0, 40)
(100, 100, 0, 0, 0, 0, 70.2)
(100, 100, 0, 0, 0, 0, 100)
(100, 100, 0, 0, 0, 40, 0)
(100, 100, 0, 0, 0, 70.2, 0)
(100, 100, 0, 0, 0, 100, 0)
(100, 100, 0, 0, 40, 0, 0)
(100, 100, 0, 0, 70.2, 0, 0)
(100, 100, 0, 0, 100, 0, 0)
(100, 100, 0, 20, 0, 0, 100)
(100, 100, 0, 40, 0, 0, 100)
(100, 100, 0, 60, 0, 0, 100)
(100, 100, 0, 60, 0, 100, 0)
(100, 100, 0, 60, 100, 0, 0)
(100, 100, 0, 80, 0, 0, 70.2)
(100, 100, 0, 80, 0, 0, 100)
(100, 100, 0, 80, 0, 70.2, 0)
(100, 100, 0, 80, 70.2, 0, 0)
(100, 100, 0, 100, 0, 0, 100)
(100, 100, 0, 100, 0, 100, 0)
(100, 100, 0, 100, 100, 0, 0)
(100, 100, 70.2, 0, 0, 0, 100)
(100, 100, 70.2, 0, 0, 100, 0)
(100, 100, 70.2, 0, 100, 0, 0)
(100, 100, 100, 0, 0, 0, 70.2)
(100, 100, 100, 0, 0, 0, 100)
(100, 100, 100, 0, 0, 70.2, 0)
(100, 100, 100, 0, 0, 100, 0)
(100, 100, 100, 0, 70.2, 0, 0)
(100, 100, 100, 0, 100, 0, 0)
(100, 100, 100, 100, 0, 0, 100)
(100, 100, 100, 100, 0, 100, 0)
(100, 100, 100, 100, 100, 0, 0)

Embodiments of the present invention may comprise any medium which carries a set of computer-readable signals comprising instructions which, when executed by a computer processor, cause the computer processor to execute a method of the invention. Embodiments may be in any of a wide variety of forms. Embodiments may comprise, for example, physical media such as magnetic storage media including floppy diskettes, hard disk drives, optical data storage media including CD ROMs, DVDs, electronic data storage media including ROMs, flash RAM, or the like or transmission-type media such as digital or analog communication links. The instructions may optionally be compressed and/or encrypted on the medium.

The invention has been described in detail with particular reference to certain preferred embodiments thereof, but it will be understood that variations and modifications can be effected within the scope of the invention.

PARTS LIST 100 test chart
101 test chart organization
102 test chart
200 apparatus
201 printer
202 controller
203 test chart generator
204 color measurement device
205 color model generator
210 test chart data
211 printed test chart
212 color coordinates
213 target colors
214 color model
215 target color recipes
301 test chart form
302 test chart form
303 test chart form
304 test chart form

The invention claimed is:

1. An apparatus for creating colorant combination recipes for target colors for a printer configured with a plurality of process colorants defining a colorant space for the printer, the apparatus comprising:
   a color measurement device operative to identify device-independent color coordinates for printed test patches;
   a color model generator operative to generate a color model for the printer in one iteration based on colorant combination and color coordinate pairs;
   a controller operative to:
      obtain a set of target colors to be printed wherein a target color is associated with a target color coordinate defined in a device-independent color space;
      obtain test chart data including first and second sets of test patches to be reproduced by the printer;
      wherein a test patch specifies a combination of colorant tints for the printer;
      wherein the first set of test patches are selected to provide a first degree of color characterization accuracy and are distributed throughout substantially all of the printer colorant space; and
      wherein the second set of patches are intended to provide a second degree of color characterization accuracy and are distributed in selected areas of the printer colorant space;
   operate the printer to produce a printed test chart from the test chart data;

direct the measurement device to measure color coordinates from test patches of the printed test chart;

initiate generation of a color model based on the measured colors and the test chart data; and create colorant combination recipes for the set of target colors based on target color coordinates and the color model.

2. The apparatus according to claim 1 wherein the selected areas of the printer colorant space correspond to areas with a nonlinear color response.

3. The apparatus according to claim 1 wherein the second set of test patches produce colors in the vicinity of at least some of the set of target colors.

4. The apparatus according to claim 1 wherein the plurality of process colorants consists of chromatic colorants (CMY) and black (K).

5. The apparatus according to claim 4 wherein almost all of the second set of test patches comprise colorant combinations with at most two chromatic colorants having non-zero values.

6. The apparatus according to claim 1 wherein the plurality of colorants include more than three chromatic colorants.

7. The apparatus according to claim 6 wherein almost all of the second set of test patches comprise colorant combinations with at most three chromatic colorants having non-zero values.

8. The apparatus according to claim 1 wherein the color model has sufficient flexibility to accurately predict both the first and second sets of measured colors.

9. The apparatus according to claim 1 wherein the color model comprises a plurality of local color submodels combined to form a single color model for the entire colorant space.

10. The apparatus according to claim 9 wherein adjacent submodels are adapted to reduce discontinuity in predicted color at boundaries between submodels.

11. The apparatus according to claim 9 wherein at least some of the submodels incorporate nonlinear modeling techniques.

12. The apparatus according to claim 10 wherein the nonlinear modeling technique comprises a multi-dimensional spline technique.

13. An apparatus for creating colorant combination recipes for target colors for a printer configured with a plurality of process colorants, the apparatus comprising:

a color measurement device operative to identify device-independent color coordinates for printed test patches;

a color model generator operative to generate a color model for the printer in one iteration based on colorant combination and color coordinate pairs;

a controller operative to:
  obtain a set of target colors to be printed wherein a target color is associated with a target color coordinate defined in a device-independent color space;
  obtain test chart data including test patches to be reproduced by the printer; and
  wherein a test patch specifies a combination of colorant tints for the printer;

wherein the distribution of test patches in colorant space comprise:
  a sparser distribution in areas of colorant space wherein the colorant combinations produce colors that are not close to any of the target colors, or wherein the colorant combinations are of a nature undesirable for use as a color recipe, or wherein the color response is linear or weakly non-linear; and
  a denser distribution in areas of colorant space wherein the colorant combinations produce a color that is close to at least one of the target colors, and wherein the colorant combinations are of a nature desirable for use as a color recipe, and wherein the color response is markedly non-linear;

operate the printer to produce a printed test chart from the test chart data;

measure color coordinates from test patches of the printed test chart;

initiate generation of a color model based on the measured colors and the test chart data; and create colorant combination recipes for the set of target colors based on target color coordinates and the color model.

* * * * *